US008888062B2

(12) United States Patent
Novin

(10) Patent No.: US 8,888,062 B2
(45) Date of Patent: Nov. 18, 2014

(54) DISPLAY MOUNTING APPARATUS

(75) Inventor: Eugene Novin, Blue Bell, PA (US)

(73) Assignee: Southco, Inc., Concordville, PA (US)

( * ) Notice: Subject to any disclaimer, the term of this patent is extended or adjusted under 35 U.S.C. 154(b) by 236 days.

(21) Appl. No.: 11/692,165

(22) Filed: Mar. 27, 2007

(65) Prior Publication Data
US 2007/0252056 A1 Nov. 1, 2007

Related U.S. Application Data

(60) Provisional application No. 60/786,544, filed on Mar. 27, 2006.

(51) Int. Cl.
A47F 5/00 (2006.01)
F16M 11/12 (2006.01)
F16M 11/20 (2006.01)
F16M 11/38 (2006.01)
H04N 5/64 (2006.01)
F16M 11/10 (2006.01)
F16M 11/04 (2006.01)
F16M 13/02 (2006.01)

(52) U.S. Cl.
CPC ............ F16M 11/38 (2013.01); F16M 11/12 (2013.01); F16M 11/2092 (2013.01); H04N 5/64 (2013.01); F16M 11/2014 (2013.01); F16M 11/10 (2013.01); F16M 11/04 (2013.01); F16M 13/02 (2013.01); F16M 2200/068 (2013.01); Y10S 248/917 (2013.01); Y10S 248/919 (2013.01); Y10S 248/922 (2013.01); Y10S 248/918 (2013.01); Y10S 248/921 (2013.01); Y10S 248/923 (2013.01); Y10S 248/924 (2013.01); Y10S 248/92 (2013.01)
USPC ...... 248/281.11; 248/917; 248/919; 248/922; 248/280.11; 248/371; 248/297.11; 248/299.1; 248/324; 248/918; 248/921; 248/923; 248/924; 248/274.1; 248/276.1; 248/282.1; 248/920; 361/679.01; 361/679.02; 361/679.06

(58) Field of Classification Search
USPC ............. 361/681; 248/917, 919, 922, 280.11, 248/281.11, 371, 297.11, 299.1, 276.1, 248/223.41, 220.21, 286.1, 918, 920, 921, 248/923, 924
See application file for complete search history.

(56) References Cited

U.S. PATENT DOCUMENTS 2,233,882 A 3/1941 Bobek
3,955,241 A 5/1976 Little
(Continued)

FOREIGN PATENT DOCUMENTS

DE 4442642 6/1996
EP 1586803 10/2005
(Continued)

OTHER PUBLICATIONS

Omnimount product brochure, part # 63HDARM-UA, part # 54HDARM, part # 54HDARMUA, part # 63HDARM, part # 63HDARMUA, 3 pages, 2005. (obtained from www.omnimount.com on or prior to Mar. 13, 2006).

(Continued)

Primary Examiner — Nkeisha Smith
(74) Attorney, Agent, or Firm — RatnerPrestia

(57) ABSTRACT

The present invention is directed to a display mounting apparatus for mounting a flat screen television monitor or the like to a wall. The mounting apparatus provides four degrees of freedom for the flat screen display in lateral translation, tilt, swivel and pan directions. The combination of two two-link arms, counterbalancing torsion springs and friction mechanisms provides for ±20 degrees in the tilt and swivel directions.

83 Claims, 65 Drawing Sheets

(56) References Cited

U.S. PATENT DOCUMENTS

| | | |
|---|---|---|
| 4,236,272 A | 12/1980 | Gronbach et al. |
| 4,356,594 A | 11/1982 | Grosemans |
| 4,861,107 A | 8/1989 | Vidwans et al. |
| 4,928,914 A | 5/1990 | Snodell |
| 5,079,799 A | 1/1992 | Rude et al. |
| 5,127,617 A | 7/1992 | Bergetz |
| 5,201,896 A | 4/1993 | Kruszewski |
| 5,231,734 A | 8/1993 | Rude |
| 5,251,859 A | 10/1993 | Cyrell et al. |
| 5,405,117 A | 4/1995 | Davis |
| 5,487,524 A | 1/1996 | Bergetz |
| 5,491,874 A | 2/1996 | Lowry et al. |
| 5,564,163 A | 10/1996 | Lowry et al. |
| 5,566,048 A | 10/1996 | Esterberg et al. |
| 5,697,125 A | 12/1997 | Gannon |
| 5,752,293 A | 5/1998 | Lowry et al. |
| 5,771,539 A * | 6/1998 | Wahlstedt et al. ............... 16/285 |
| 5,771,540 A | 6/1998 | Carpenter et al. |
| 5,787,549 A | 8/1998 | Soderlund |
| 5,790,910 A | 8/1998 | Haskin |
| 5,832,987 A | 11/1998 | Lowry et al. |
| 5,934,636 A | 8/1999 | Cyrell |
| 5,975,195 A | 11/1999 | Lowry et al. |
| 6,102,348 A * | 8/2000 | O'Neill ..................... 248/289.11 |
| 6,102,350 A | 8/2000 | Cyrell |
| 6,125,030 A | 9/2000 | Mola et al. |
| 6,141,831 A | 11/2000 | Novin et al. |
| 6,182,330 B1 | 2/2001 | Novin et al. |
| 6,301,748 B1 | 10/2001 | Su-Man |
| 6,347,433 B1 | 2/2002 | Novin et al. |
| 6,367,756 B1 | 4/2002 | Wang |
| 6,467,129 B1 | 10/2002 | Bae |
| 6,530,123 B1 | 3/2003 | Wahlstedt |
| 6,588,062 B2 | 7/2003 | Novin et al. |
| D478,088 S | 8/2003 | Hamouz |
| D488,708 S | 4/2004 | Lam et al. |
| D489,599 S | 5/2004 | Lam |
| 6,775,884 B2 | 8/2004 | Su-Man |
| D497,537 S | 10/2004 | O'Keene et al. |
| 6,871,384 B2 | 3/2005 | Novin et al. |
| D505,858 S | 6/2005 | O'Keene |
| 6,905,101 B1 | 6/2005 | Dittmer |
| 6,915,995 B2 | 7/2005 | Gillespie |
| 7,028,961 B1 | 4/2006 | Dittmer et al. |
| 7,055,215 B1 | 6/2006 | Ligtenberg et al. |
| 7,065,834 B2 | 6/2006 | Lowry |
| 7,079,874 B2 | 7/2006 | Pontoppidan et al. |
| D530,595 S | 10/2006 | Lam et al. |
| 7,152,836 B2 | 12/2006 | Pfister et al. |
| 7,175,152 B2 | 2/2007 | Dittmer |
| 7,178,775 B2 | 2/2007 | Pfister et al. |
| D537,706 S | 3/2007 | Ly Hau et al. |
| D538,140 S | 3/2007 | Ly Hau et al. |
| D538,141 S | 3/2007 | Stenhouse et al. |
| D538,632 S | 3/2007 | Ly Hau et al. |
| D538,633 S | 3/2007 | Ly Hau et al. |
| D539,123 S | 3/2007 | Ly Hau et al. |
| D539,125 S | 3/2007 | Ly Hau et al. |
| D539,126 S | 3/2007 | Stenhouse et al. |
| D539,127 S | 3/2007 | Ly Hau et al. |
| D539,128 S | 3/2007 | Ly Hau et al. |
| D539,566 S | 4/2007 | Anderson |
| D539,636 S | 4/2007 | Bremmon |
| D539,637 S | 4/2007 | Ly Hau et al. |
| D540,154 S | 4/2007 | Bremmon |
| D540,332 S | 4/2007 | Dittmer et al. |
| D543,210 S | 5/2007 | Stenhouse et al. |
| D543,547 S | 5/2007 | Muday et al. |
| D543,548 S | 5/2007 | Muday et al. |
| 7,345,870 B2 * | 3/2008 | Shin ............................ 361/681 |
| 7,395,996 B2 * | 7/2008 | Dittmer .................... 248/291.1 |
| 7,398,950 B2 * | 7/2008 | Hung ........................ 248/276.1 |
| 7,487,943 B1 | 2/2009 | Gillespie |
| 2005/0152102 A1 | 7/2005 | Shin |
| 2007/0007413 A1 * | 1/2007 | Jung et al. ................. 248/284.1 |
| 2007/0023593 A1 * | 2/2007 | Fedewa ........................ 248/201 |
| 2007/0221807 A1 * | 9/2007 | Park ............................ 248/324 |
| 2008/0001048 A1 * | 1/2008 | Woo et al. ................. 248/276.1 |

FOREIGN PATENT DOCUMENTS

| | | |
|---|---|---|
| JP | 2004363788 | 12/2004 |
| KP | 1020050058738 A | 6/2005 |

OTHER PUBLICATIONS

Peerless product brochure, models PLA 2 and PLA 2S, 2 pages, 2003. (obtained from www.peerlessindustries.com on or prior to Mar. 13, 2006).

Sanus Systems product assembly instructions, Vision Mount VMAA Flat Panel Wall Mount, 8 pages, obtained from www.sanus.com on or prior to Mar. 13, 2006.

Sanus Systems product assembly instructions, Vision Mount VMDD 26 Flat Panel Wall Mount, 8 pages, obtained from www.sanus.com on or prior to Mar. 13, 2006.

* cited by examiner

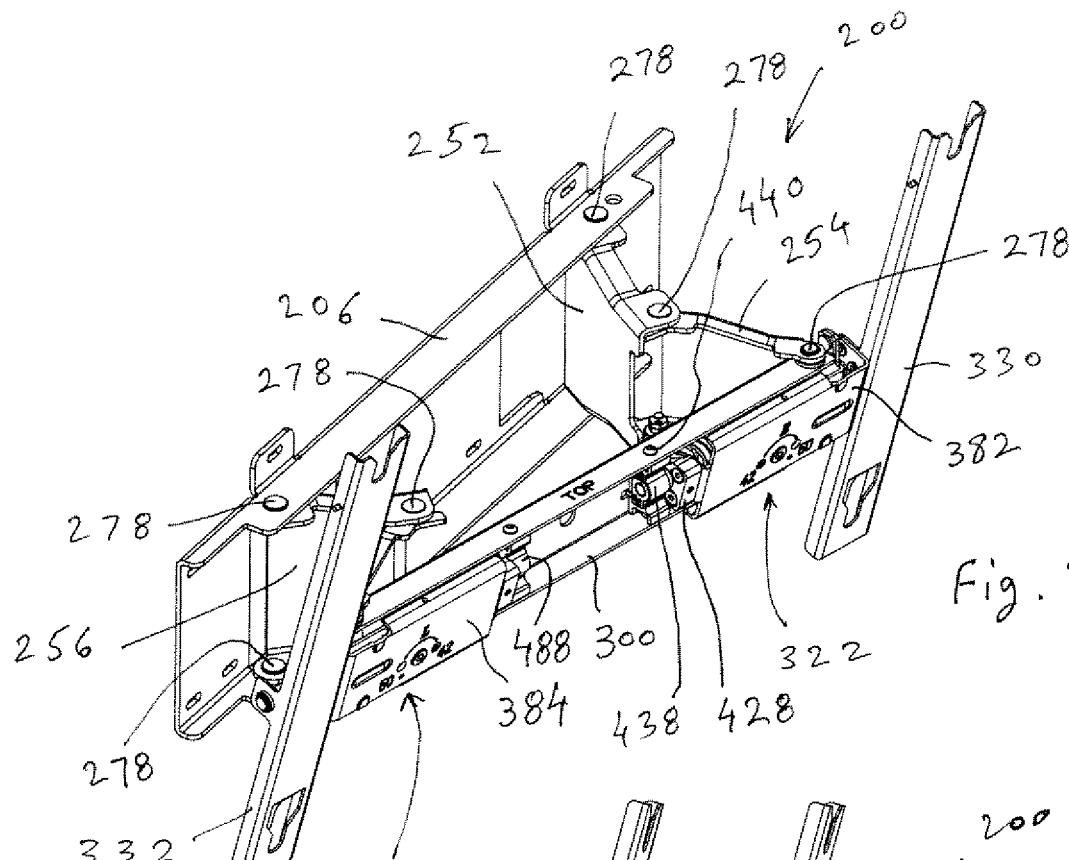
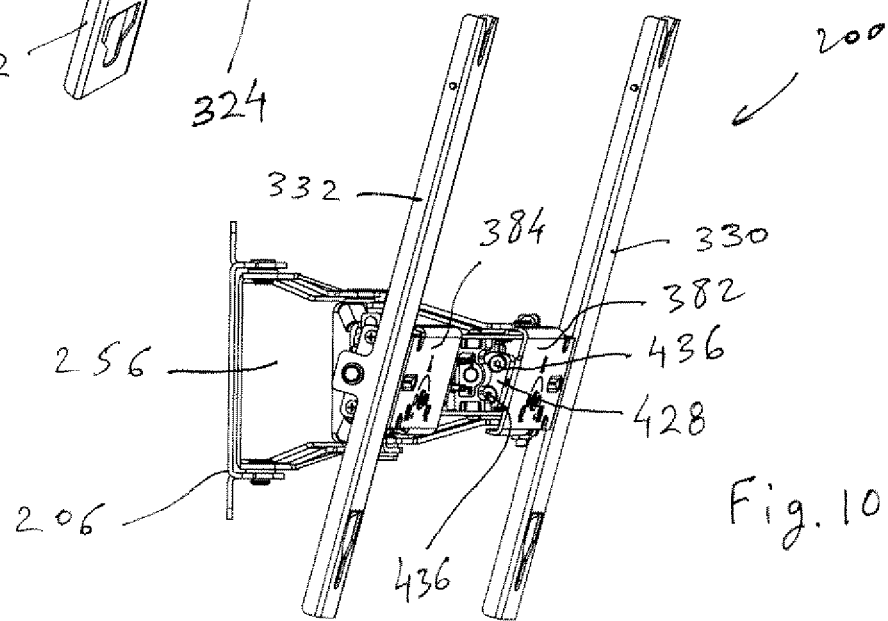

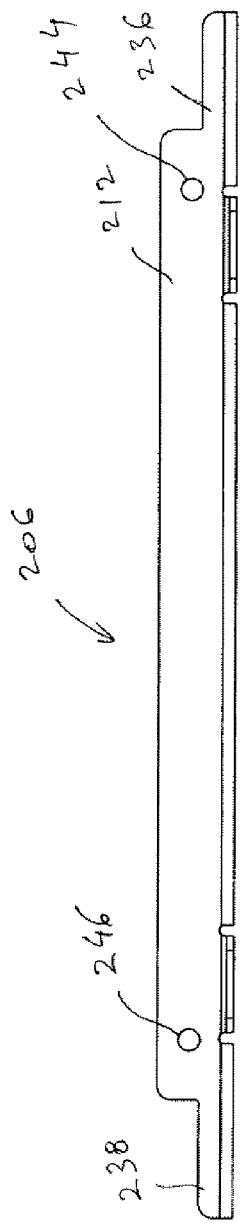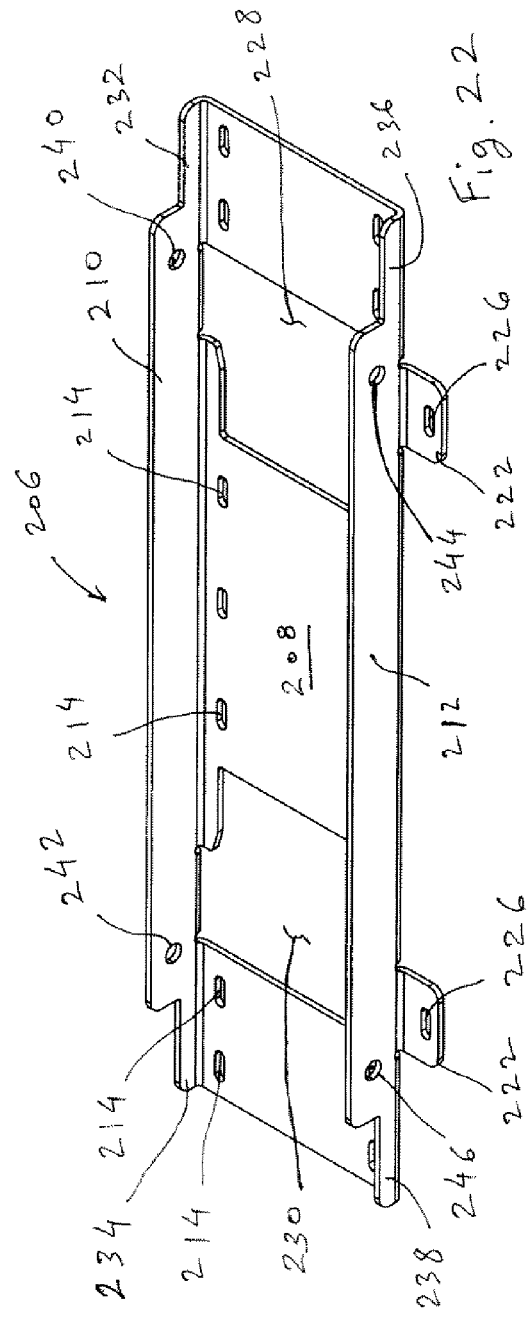

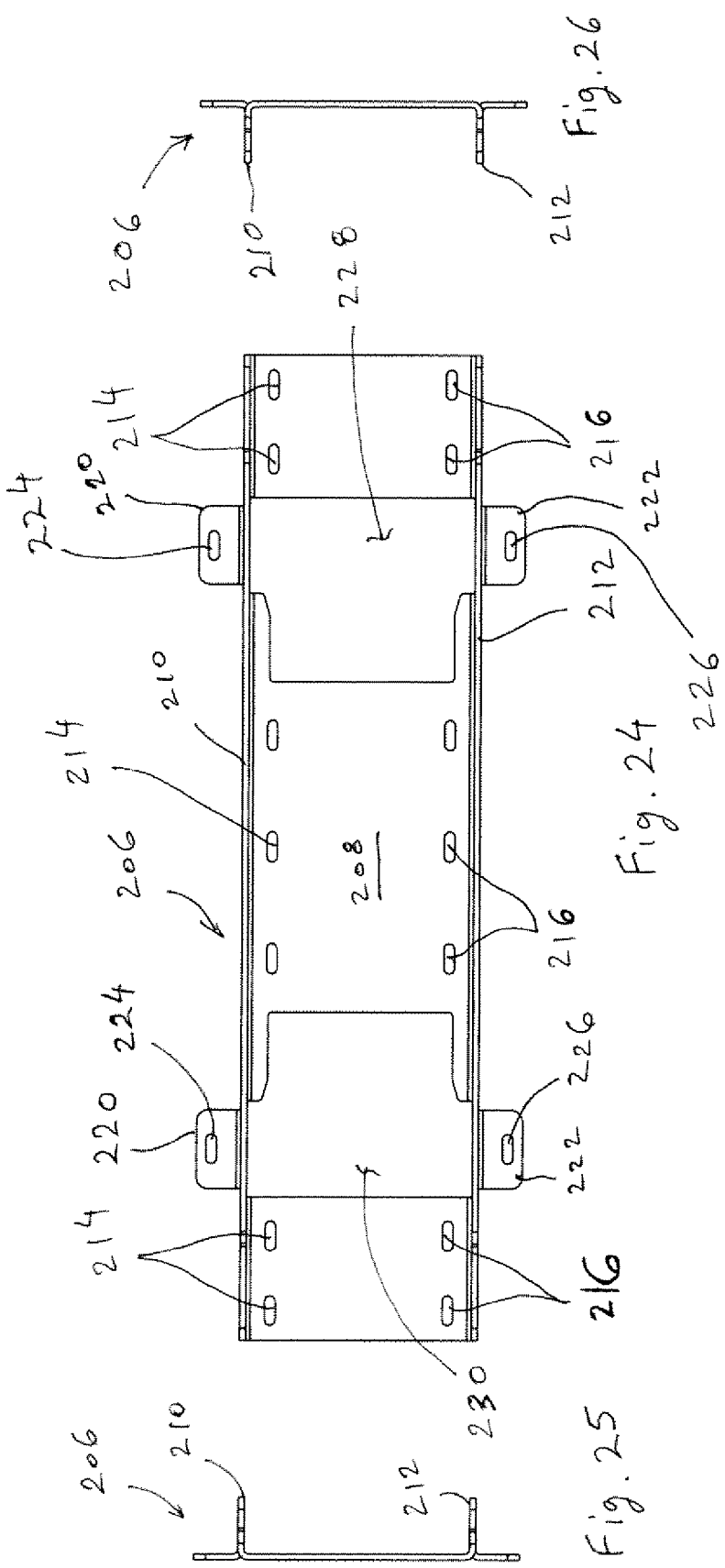

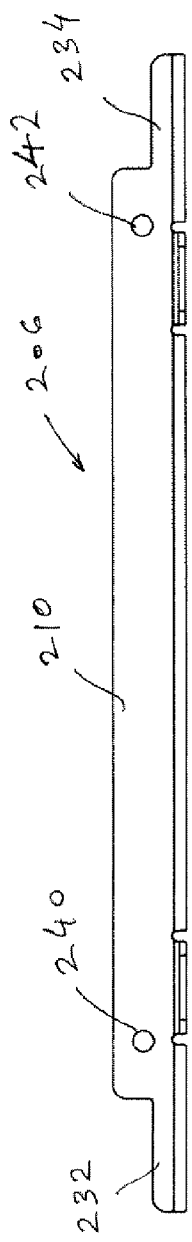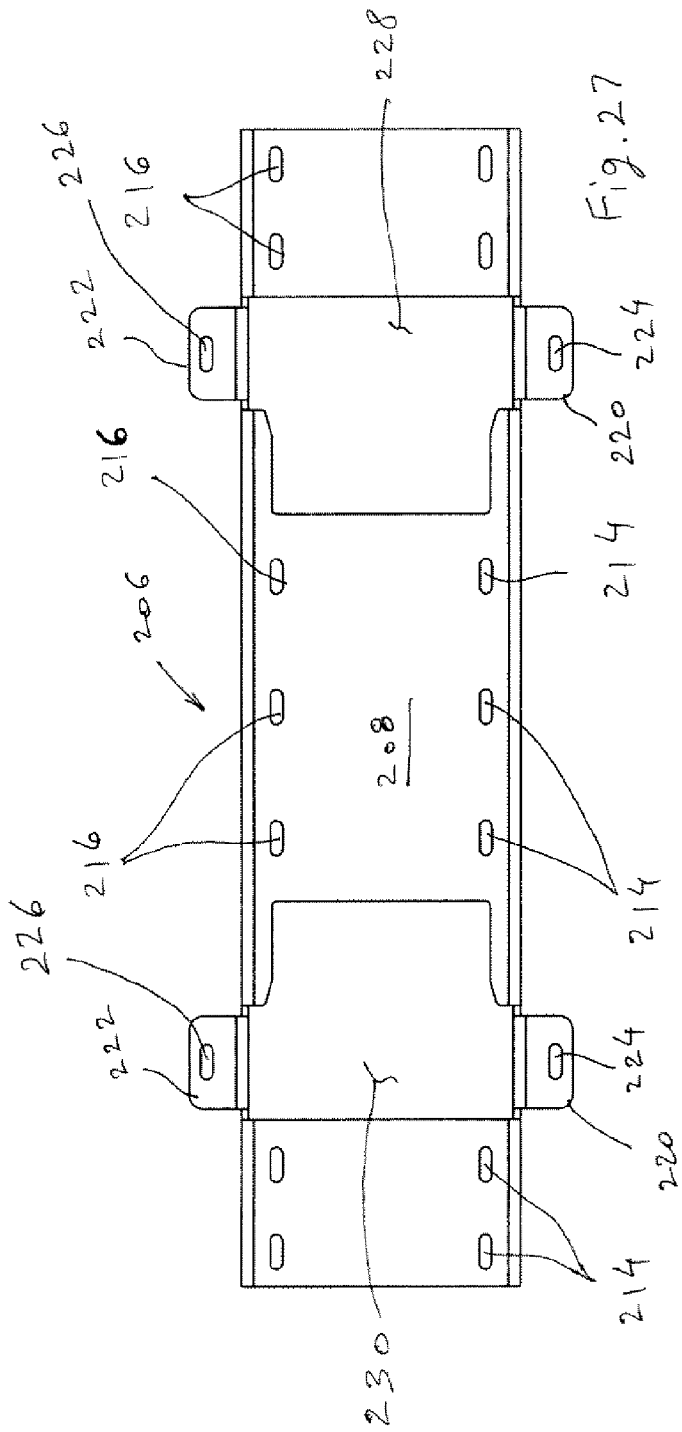

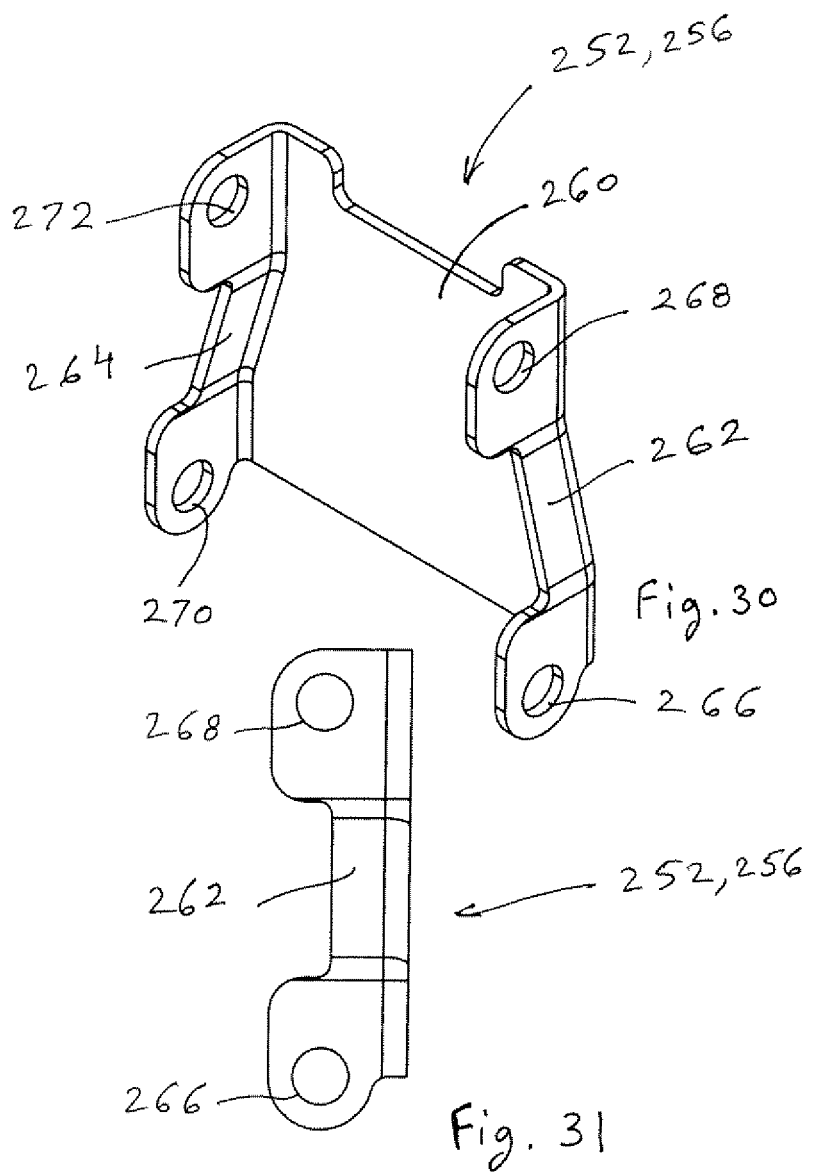

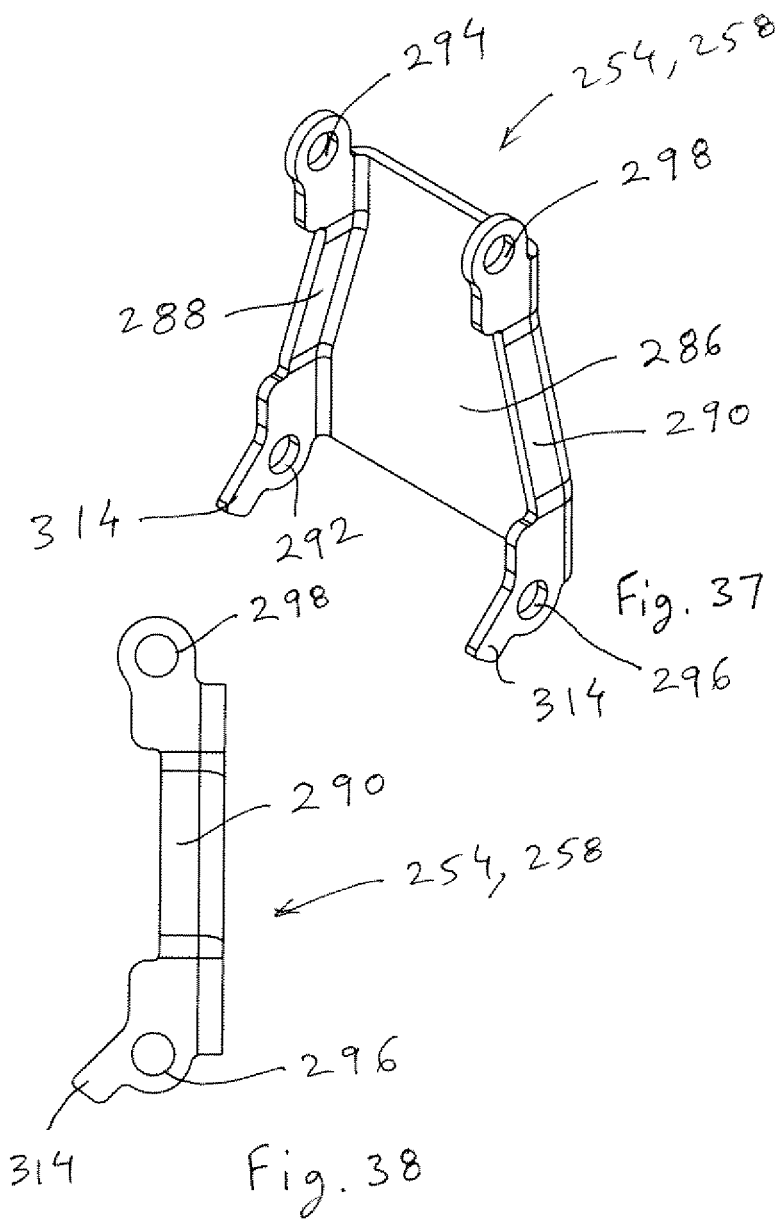

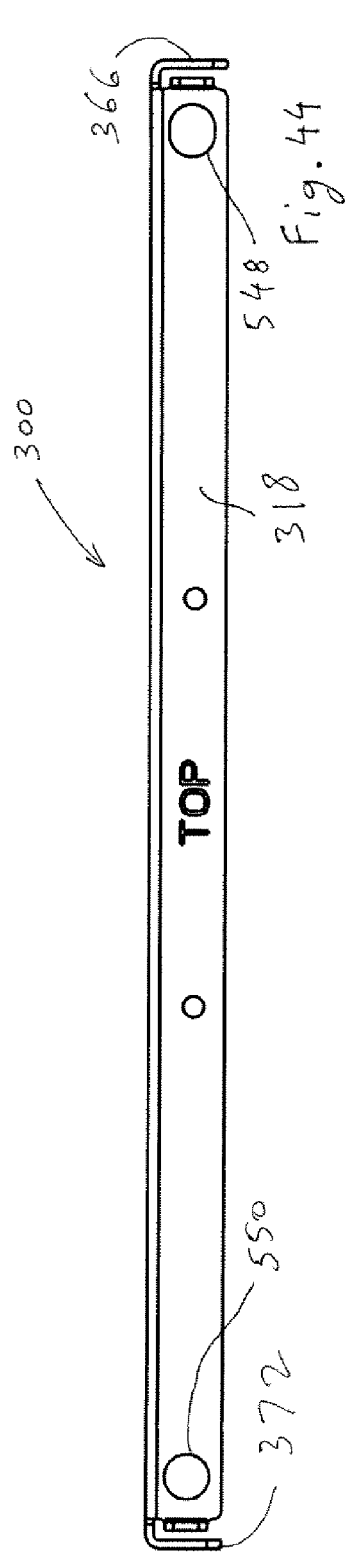
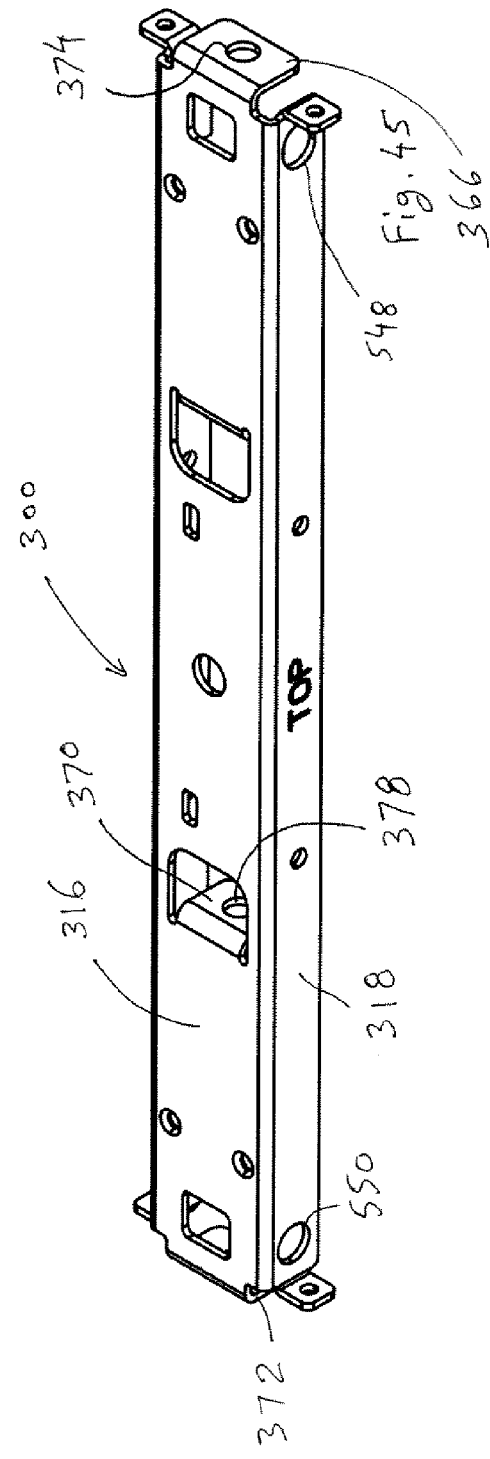

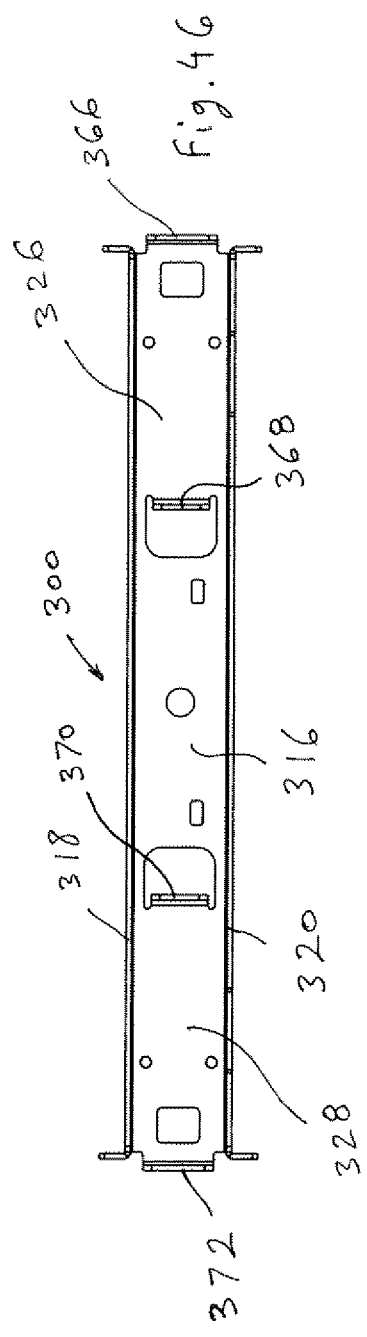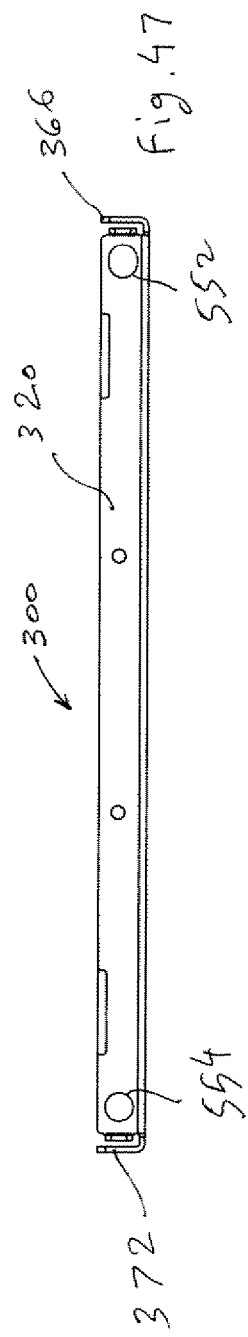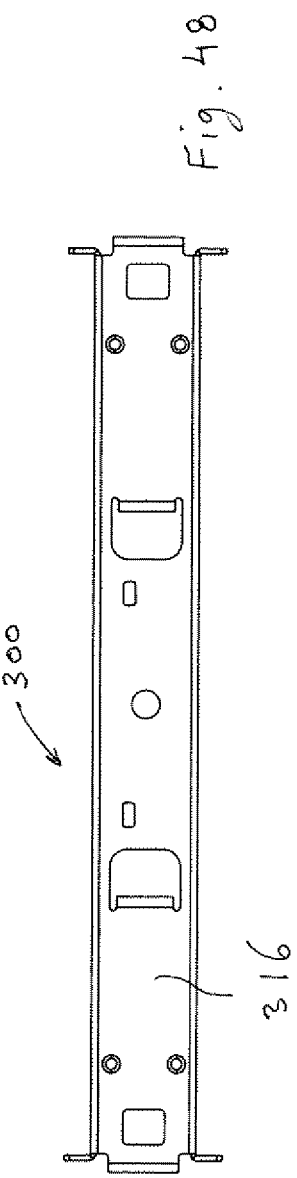

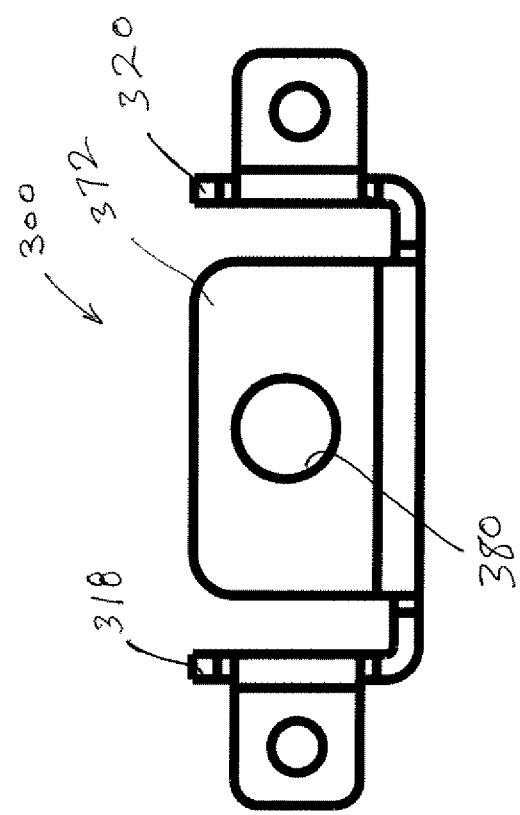

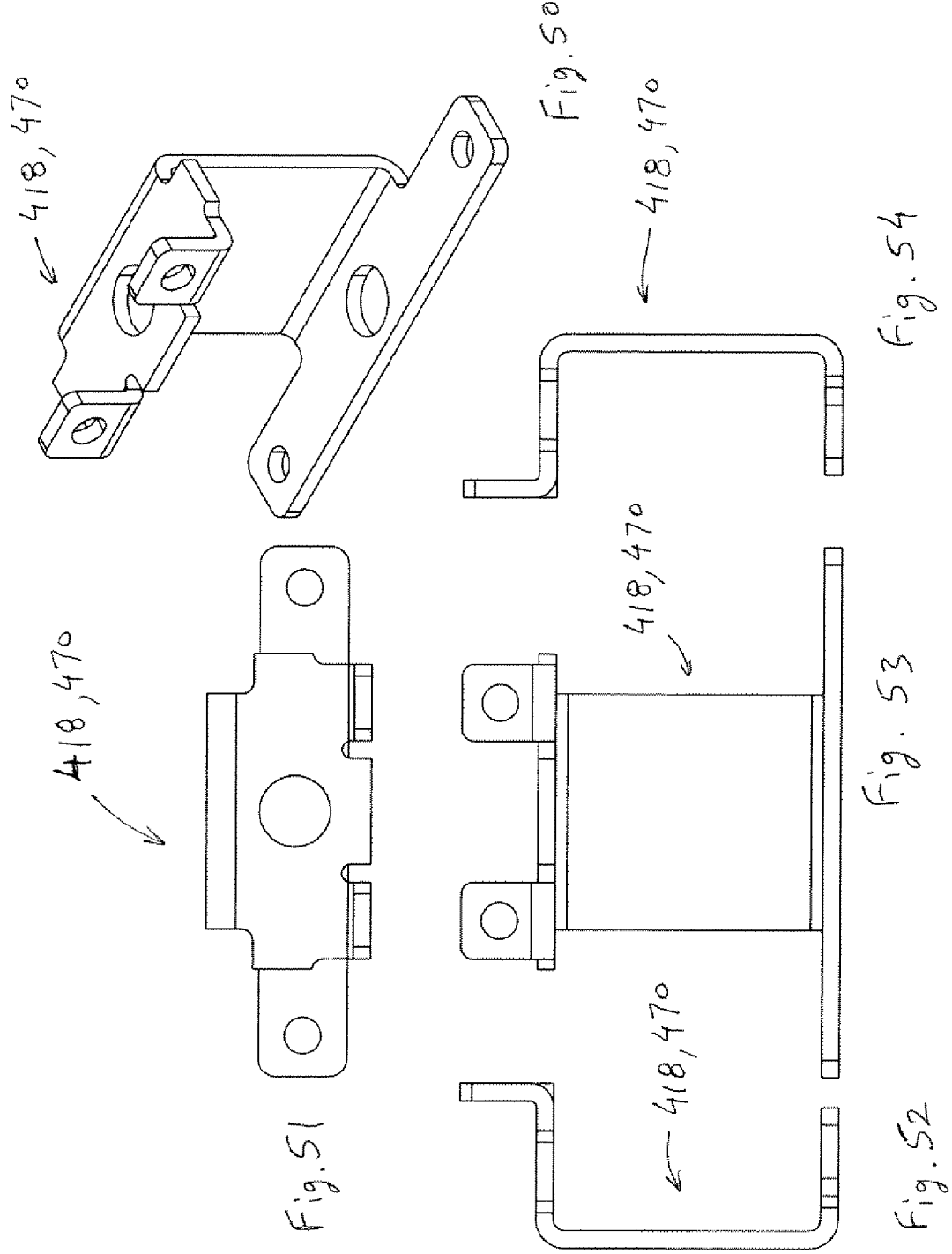

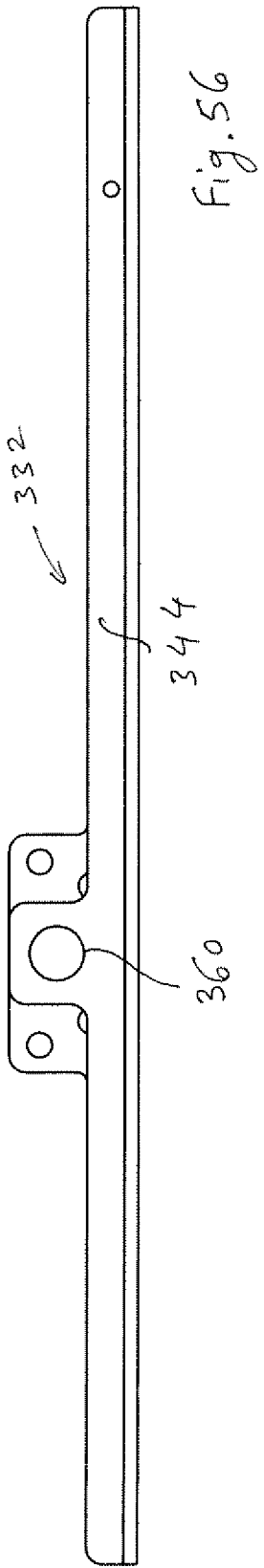
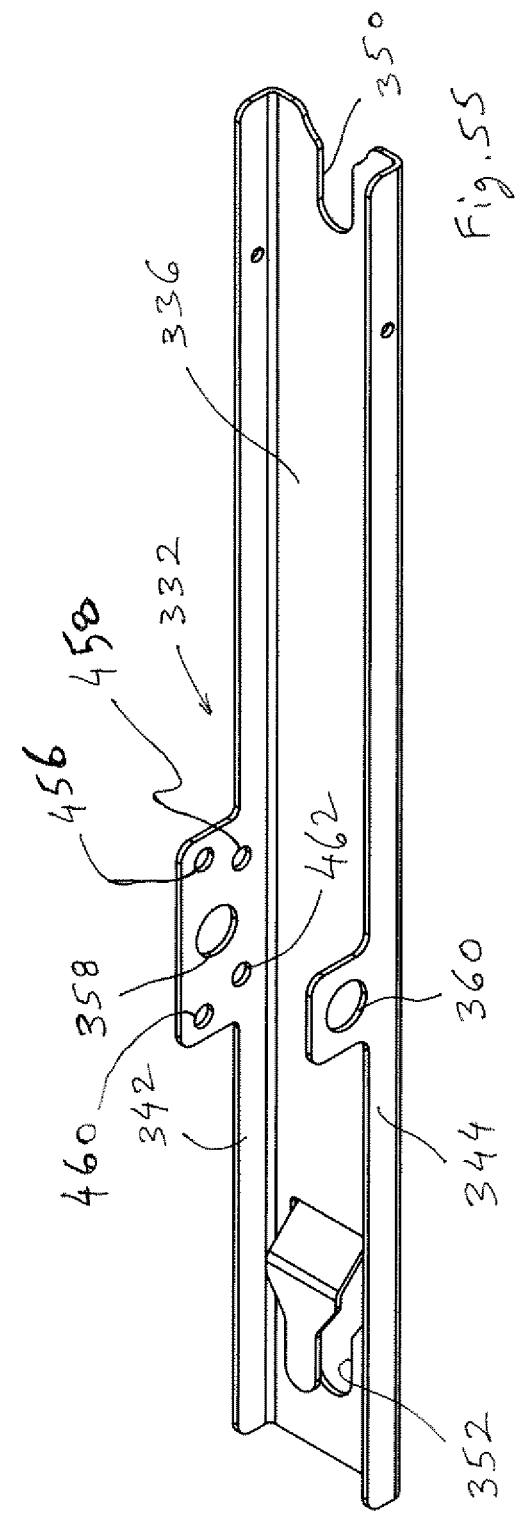

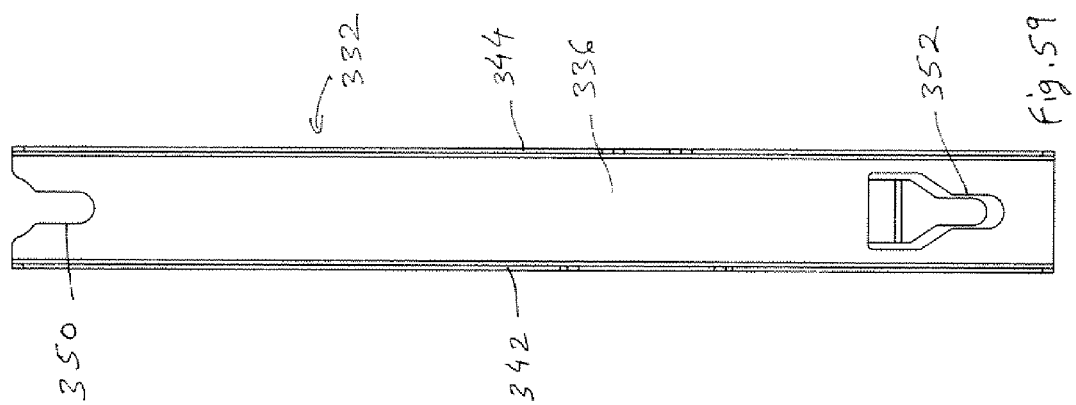
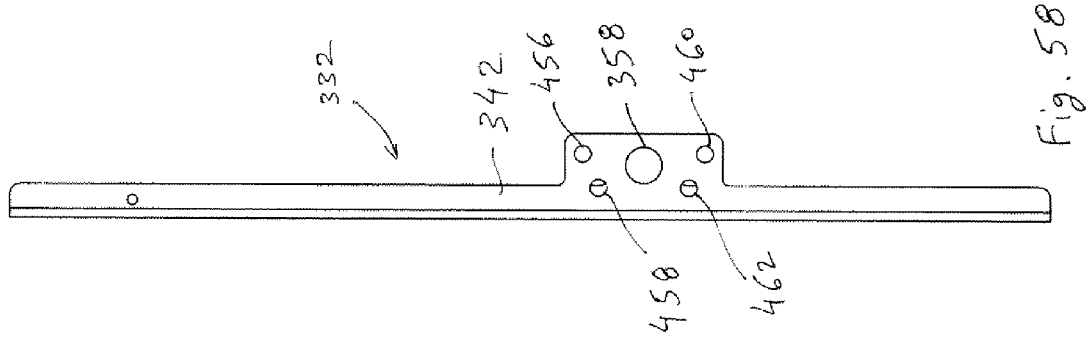
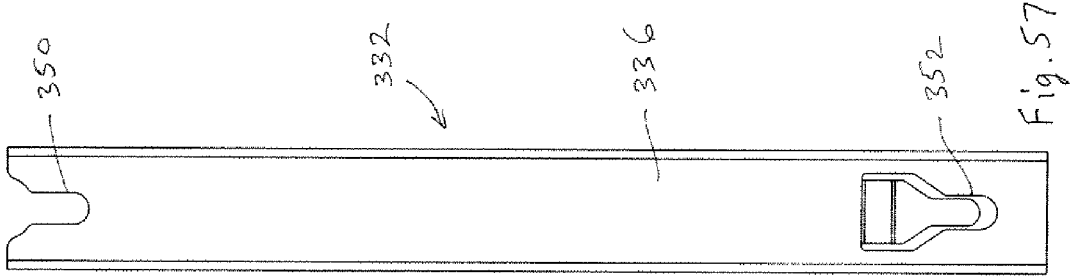

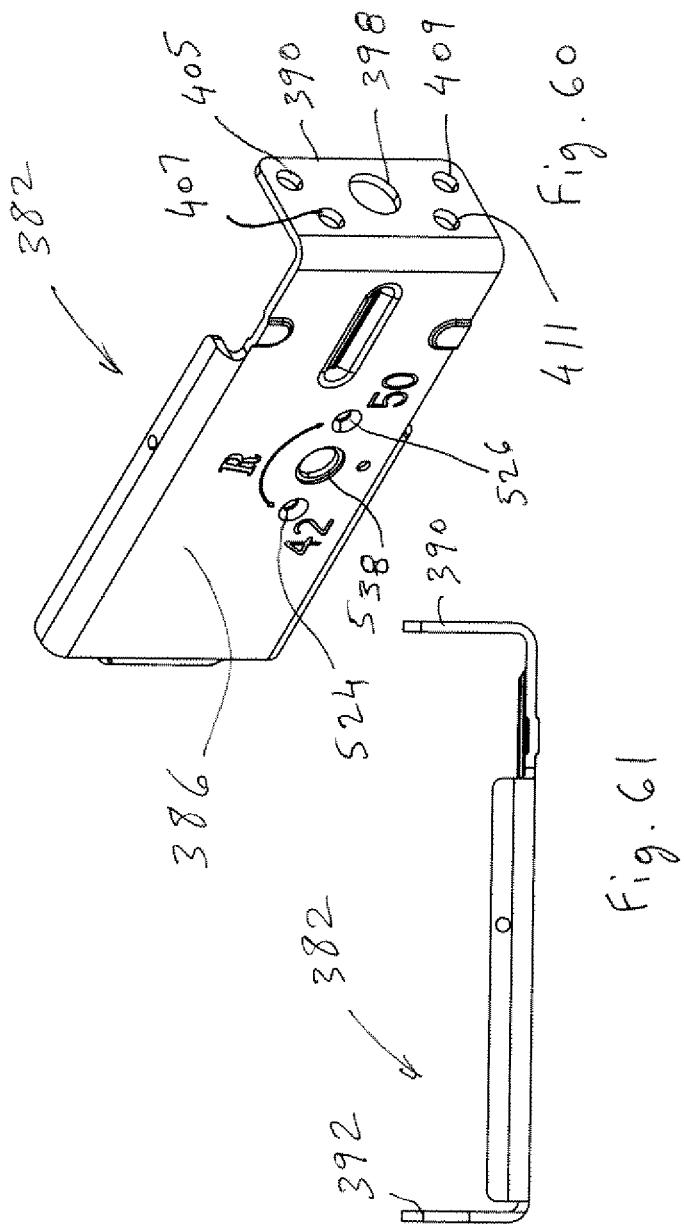

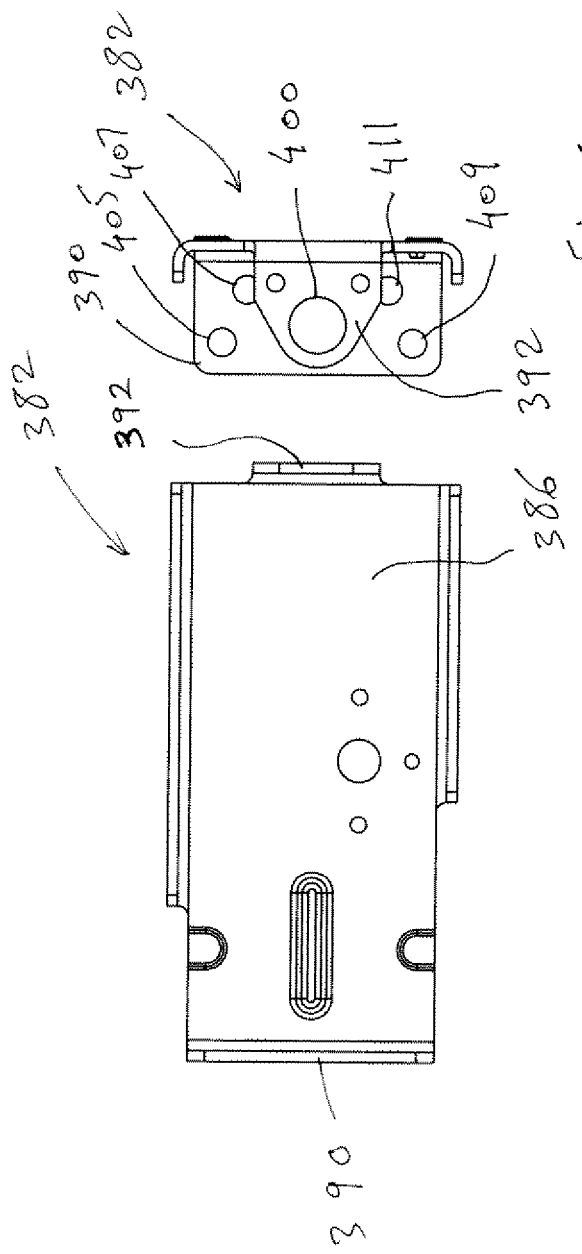

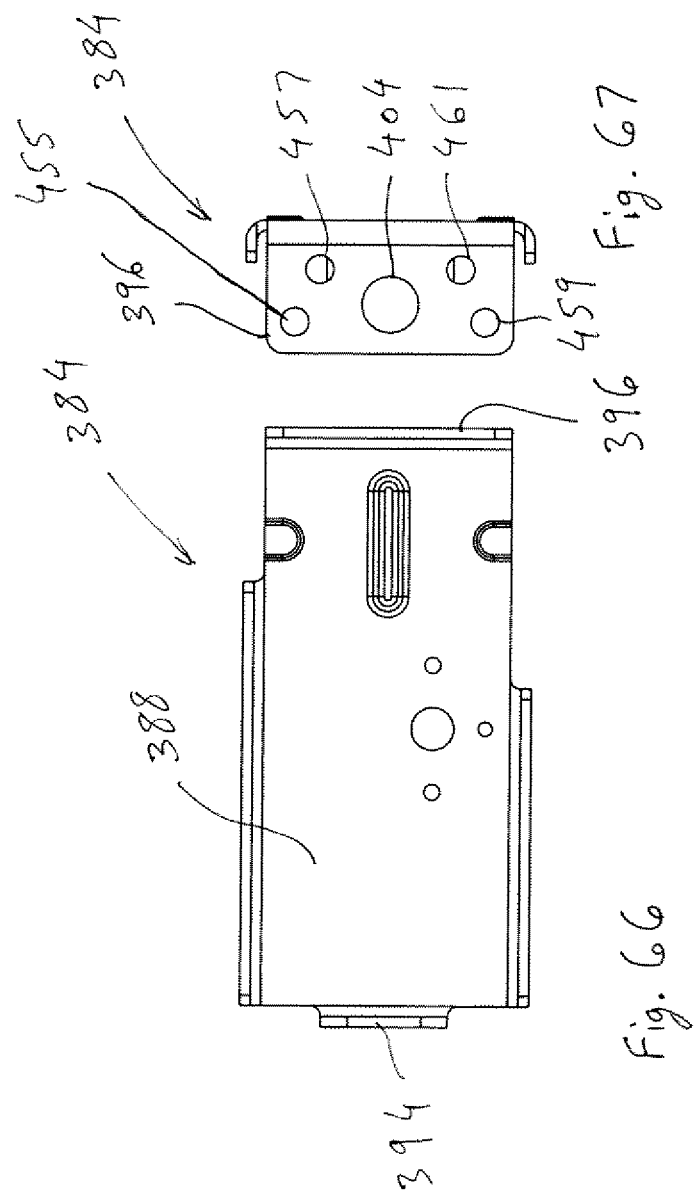

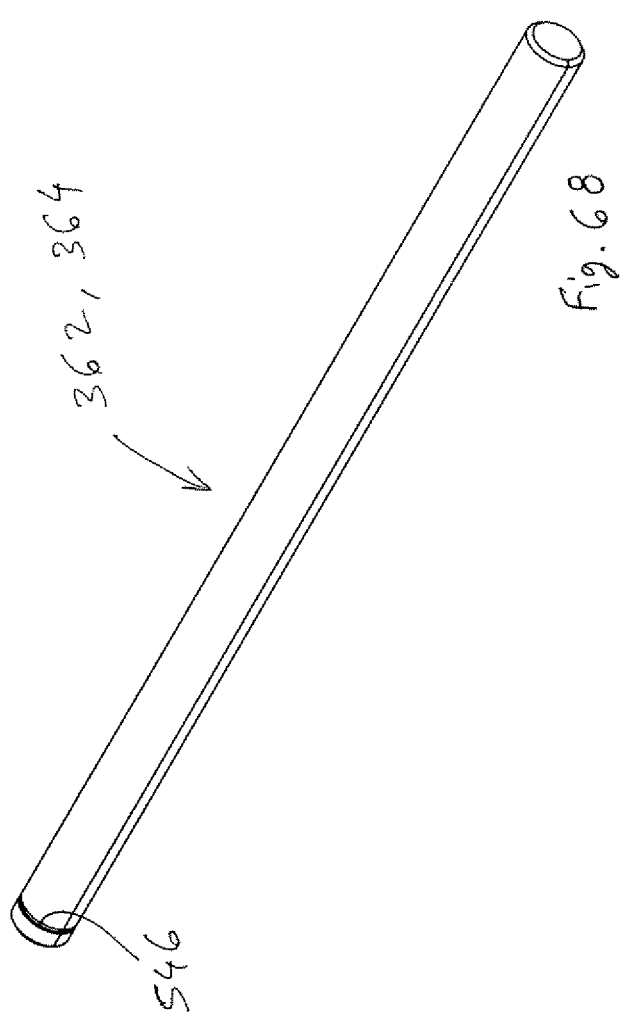
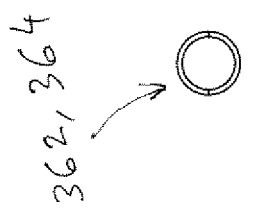

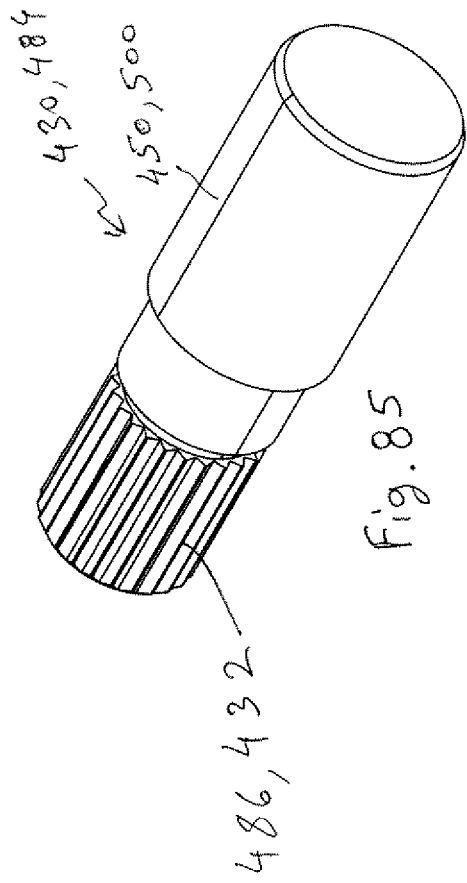
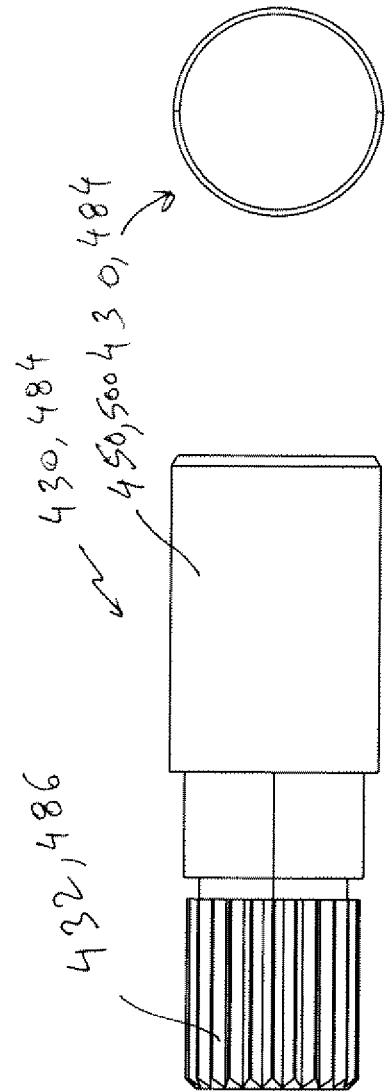
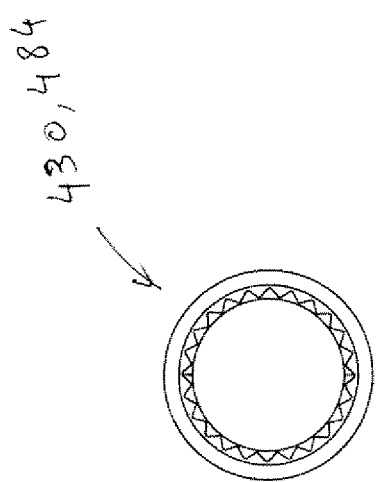
Fig. 85
Fig. 88
Fig. 87
Fig. 86

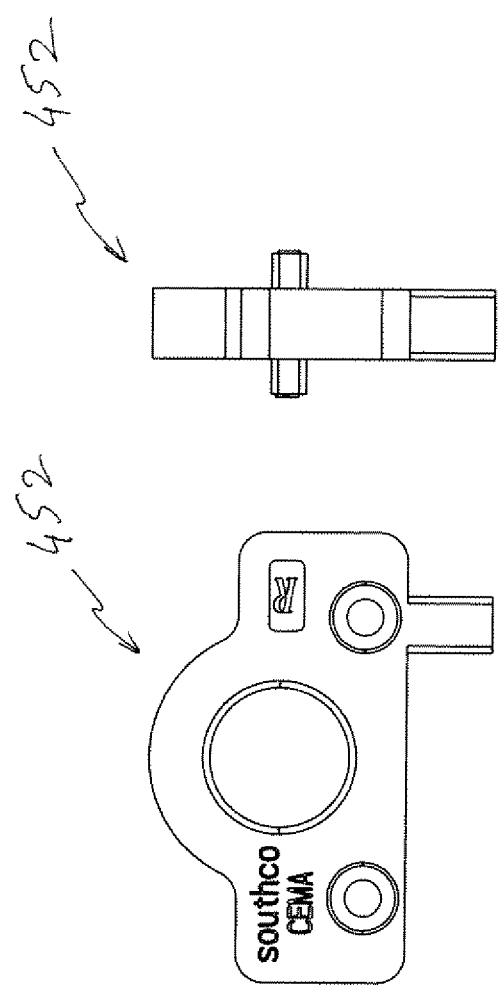

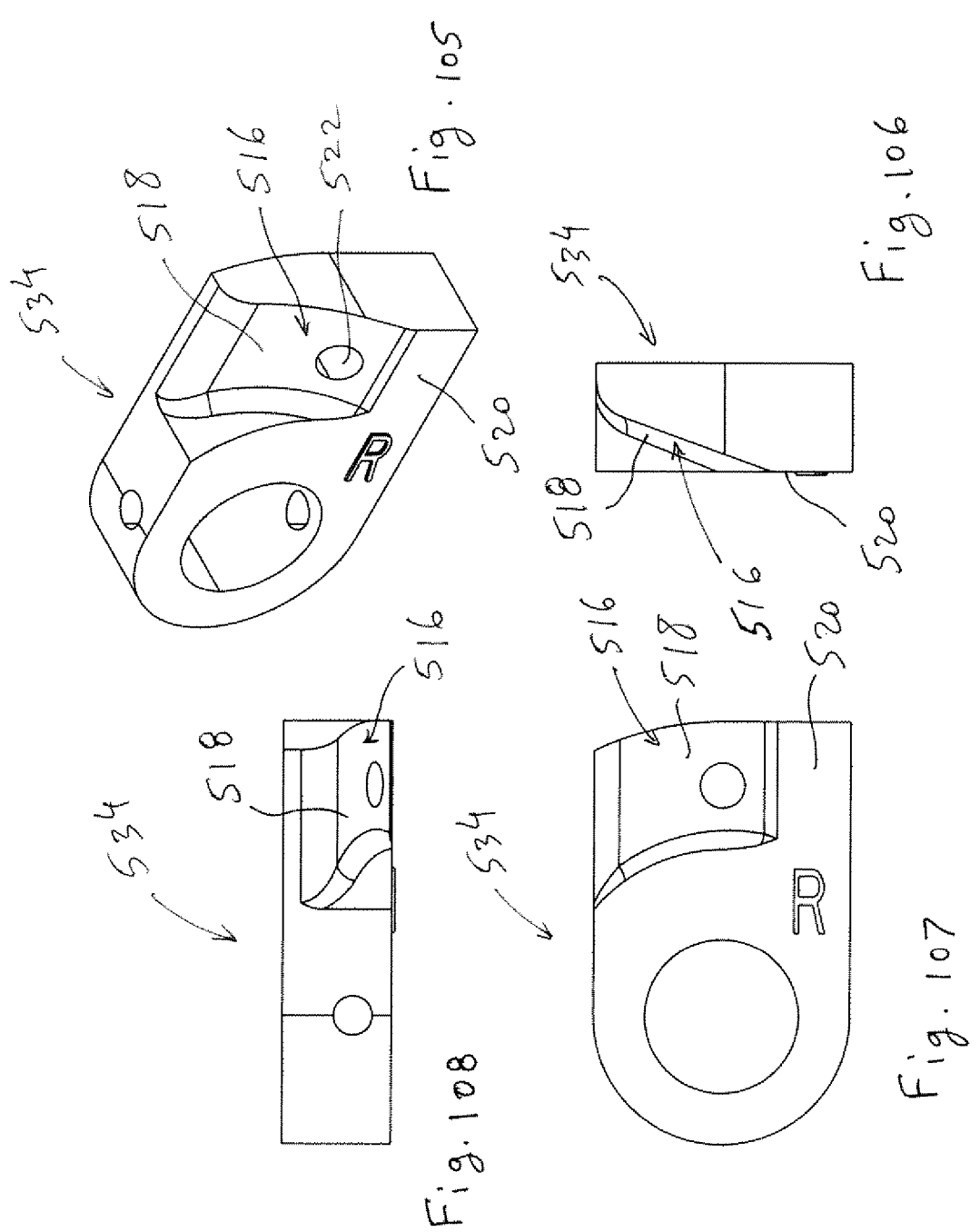

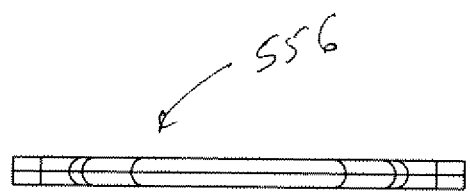
Fig. 118
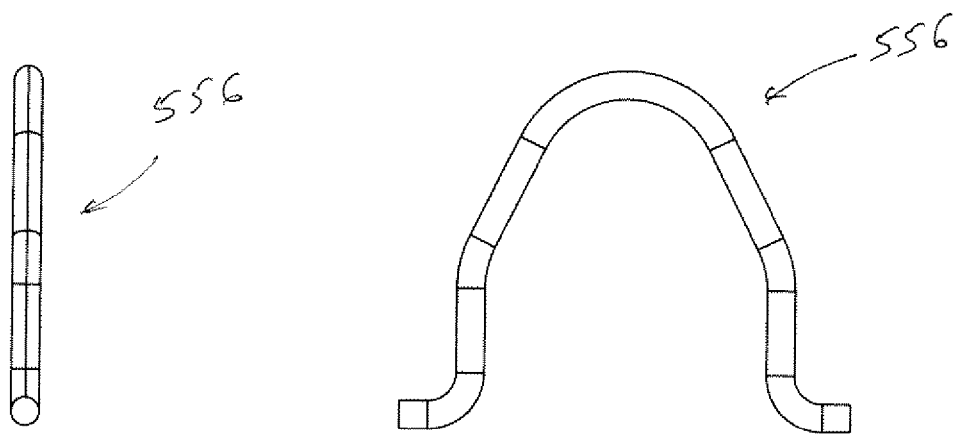
Fig. 116
Fig. 115
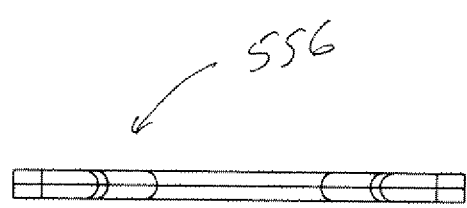
Fig. 117

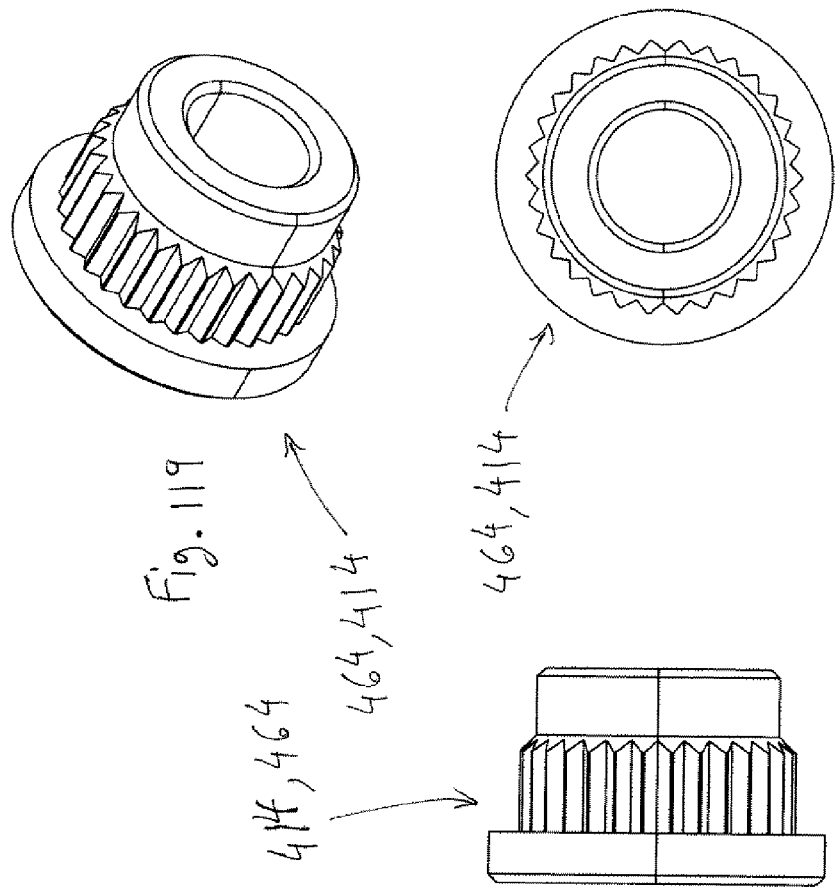
Fig. 119
Fig. 122
464,414
464,414
414,464
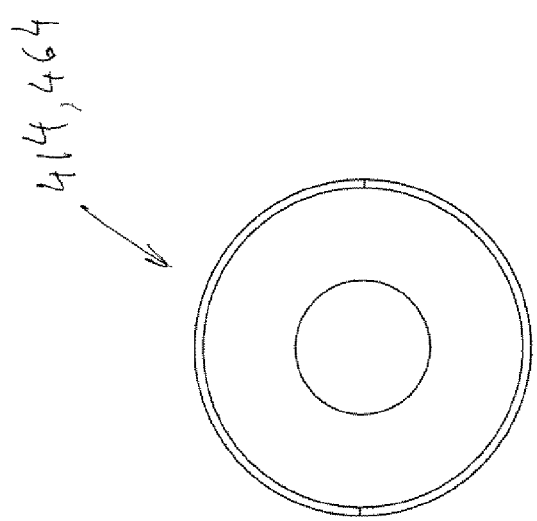
Fig. 121
414,464
Fig. 120

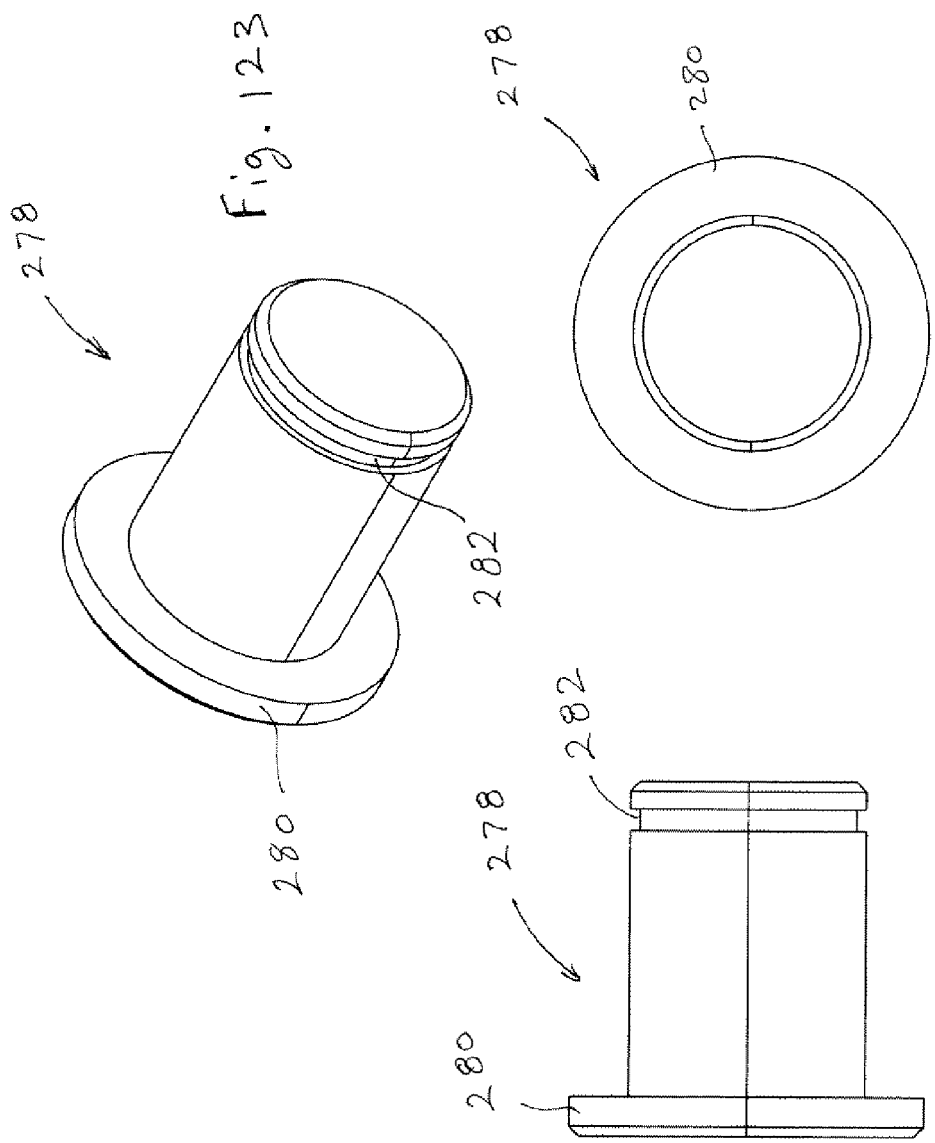

DISPLAY MOUNTING APPARATUS

BACKGROUND OF THE INVENTION

1. Field of the Invention

The present invention is directed to a display mounting apparatus for mounting a flat screen television monitor or the like to a wall.

2. Discussion of the Prior Art

Many display mounting apparatuses for mounting flat screen or flat panel displays to a wall are known in the prior art. However, most of the prior art display mounting apparatuses require the user to reach behind the display and loosen some clamping mechanism before he or she can adjust the position of the display. None of the prior art display mounting apparatuses are seen to offer the advantages of the present invention that will become apparent from the detailed description of the invention provided below.

SUMMARY OF THE INVENTION

The present invention is directed to a display mounting apparatus for mounting a flat screen television monitor or the like to a wall. The mounting apparatus provides four degrees of freedom for the flat screen display in lateral translation, tilt, swivel and pan directions. The combination of two arms that can assume any position between a fully collapsed position and a fully extended position, counterbalancing torsion springs and friction mechanisms provides for ±20 degrees in the tilt and swivel directions. In the illustrated example, two two-link arms are used. To improve counter balance performance, the geometry of the display support brackets of the display mounting apparatus ensures that the center of gravity of the display is positioned above the horizontal axis of tilt rotation throughout the entire range of tilt travel. This arrangement allows the moment of the display weight to increase to match the increasing force exerted by the torsion springs as the display is tilted downward. Thus, the moment exerted on the display by the torsion springs increases to match the increase in the moment due to the weight of the display as the display is tilted downward. The tilting rotation of the display is damped by frictional damping mechanisms. The frictional damping mechanisms are isolated from the weight load of the display by placing them outside the load carrying structure of the tilt mechanism. Thus, the weight of the display will not affect the operation or the wear properties of the frictional damping mechanism. The display mounting apparatus also has a weight adjustment mechanism to adjust the preload of the torsion springs to match the weight of the display supported by the display mounting apparatus of the present invention. The weight adjustment mechanism consists of a cam shaped as a wedge which allows for the preload adjustment of the torsion spring. Adjustment can be in discrete steps or varying continuously. Current design provides toggle between two sizes/weights of display but this feature could be designed to cover more sizes/weights of displays. To improve manufacturability, one of the pivot points or joints on one of the two-link arms is equipped with openings in the form of slots to allow compensation for stacked tolerances of multiple components. To maintain position within the slot, the pivot pin is axially loaded by use of friction devices to maintain position during operation. Some other joints of the two-link arms are also equipped with friction devices that produce friction by axial loading of the pivot joints, in order to enhance motion (feel) that is provided to the end user. The display is prevented from being accidentally dislodged from the display support brackets by the use of safety clips that provide protection from accidental disengagement of the display from the display mounting apparatus.

BRIEF DESCRIPTION OF THE DRAWINGS

FIGS. 8-11 are views of a display mounting apparatus according to the present invention showing the display support brackets of the display mounting apparatus in various orientations relative to the wall mounting bracket of the display mounting apparatus.

FIGS. 22-28 are views of the wall mounting bracket of the display mounting apparatus according to the present invention.

FIGS. 30-36 are views of the first link of the two-link arms of the display mounting apparatus according to the present invention.

FIGS. 37-43 are views of the second link of the two-link arms of the display mounting apparatus according to the present invention.

FIGS. 44-49 are views of the support beam of the display mounting apparatus according to the present invention.

FIGS. 50-54 are further views of the spacer bracket of the display mounting apparatus according to the present invention.

FIGS. 55-59 are views of the left display support bracket of the display mounting apparatus according to the present invention, the right display support bracket being a mirror image.

FIGS. 60-63 are views of the right tilting bracket of the display mounting apparatus according to the present invention.

FIGS. 64-67 are views of the left tilting bracket of the display mounting apparatus according to the present invention.

FIGS. 68-70 are views of the counterbalancing hinge rod of the display mounting apparatus according to the present invention.

FIGS. 85-88 are views of the rod of the frictional damping mechanism of the counterbalancing hinge of the display mounting apparatus according to the present invention.

FIGS. 96-97 are views of the right lid of the friction clip housing of the frictional damping mechanism of the counterbalancing hinge of the display mounting apparatus according to the present invention.

FIGS. 105-108 are views of the right cam for adjusting the torsion spring preload of the counterbalancing hinge of the display mounting apparatus according to the present invention.

FIGS. 113-118 are views of the safety clip of the display mounting apparatus according to the present invention.

FIGS. 119-122 are views of the threaded insert of the display mounting apparatus according to the present invention.

FIGS. 123-125 are views of the pivot pin of the joints of the two-link arms of the display mounting apparatus according to the present invention.

Figure 1:
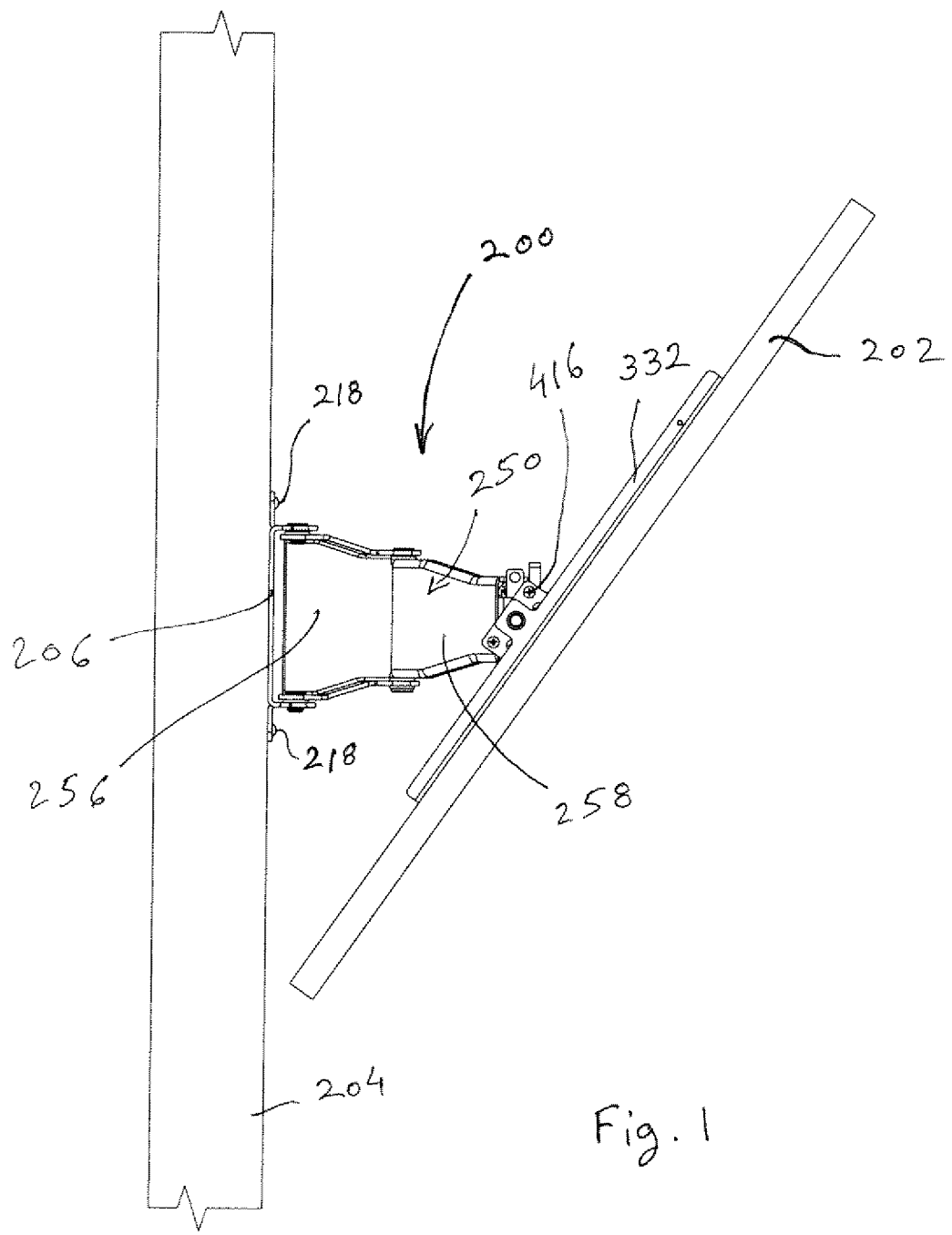
FIGS. 1-6 are environmental views of a display mounting apparatus according to the present invention.
Figure 2:
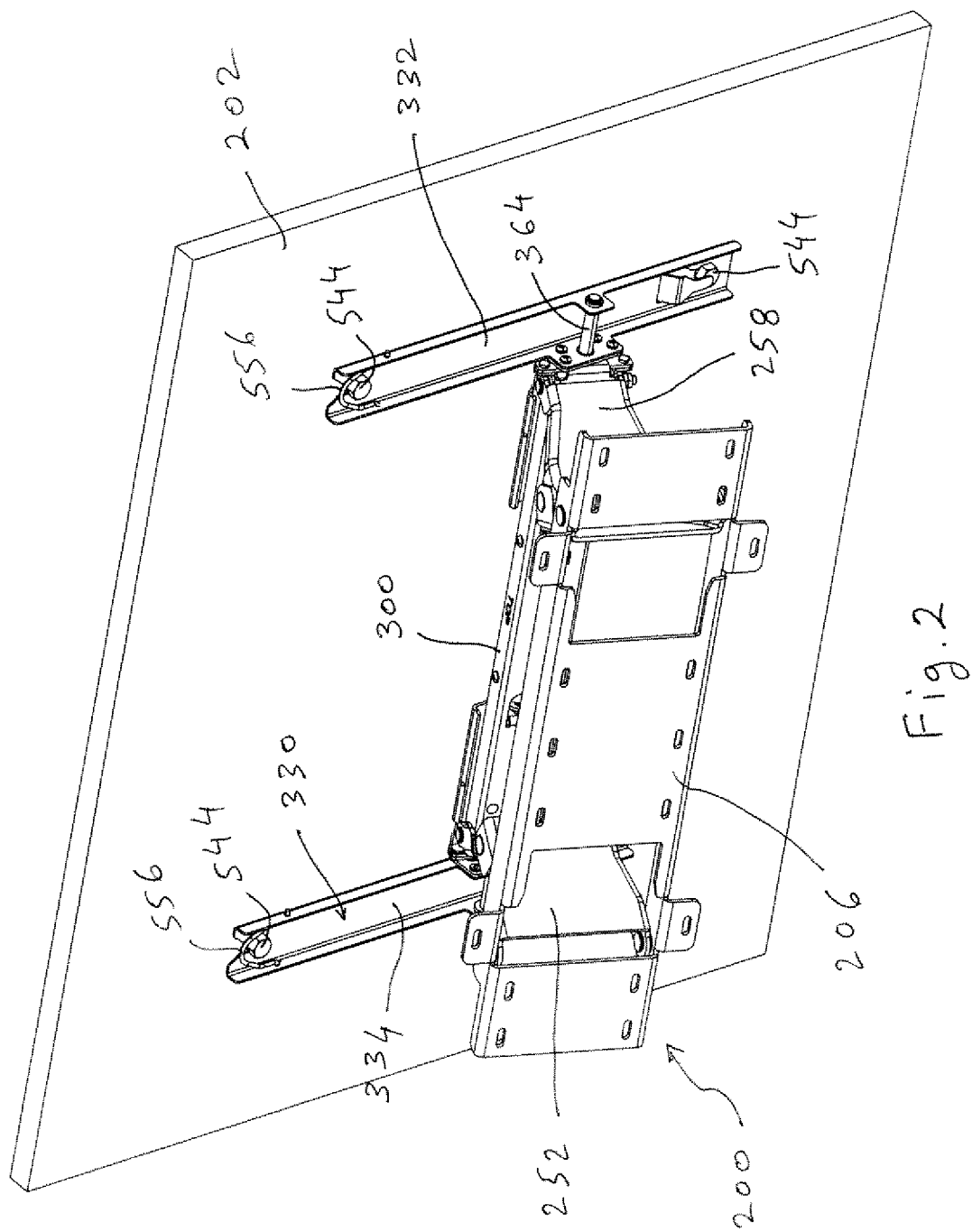
Figure 3:
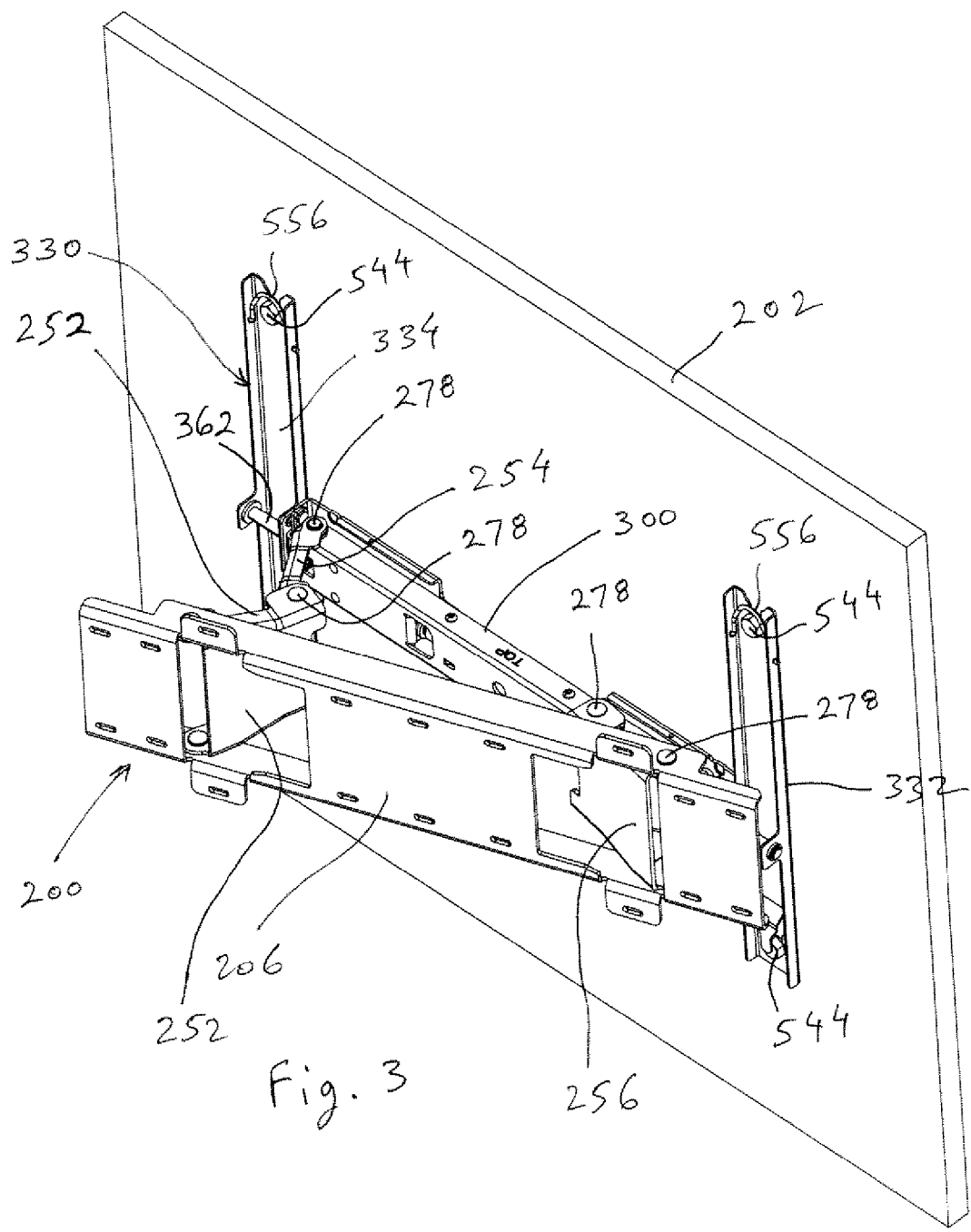
Figure 4:
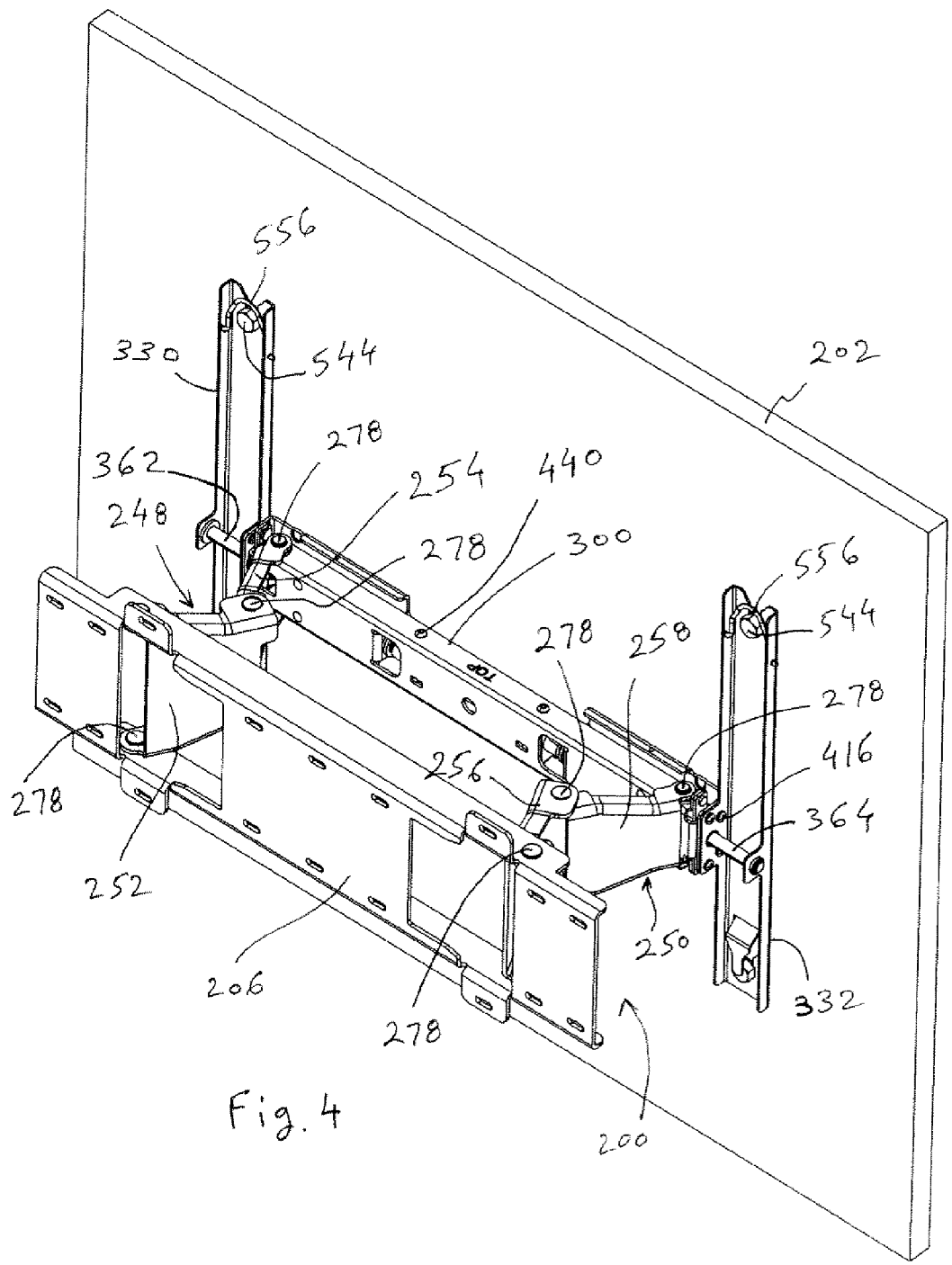

The same reference numerals are used consistently throughout the attached drawings. Where different reference numerals are used to refer to different parts that are structurally identical and a single set of close-up views illustrates the details of the structurally identical parts, reference numerals separated by a comma are used in the drawings to indicate that the illustration represents two different but structurally identical parts that have the same visual depiction.

DETAILED DESCRIPTION OF THE PREFERRED EMBODIMENTS

Figure 134:
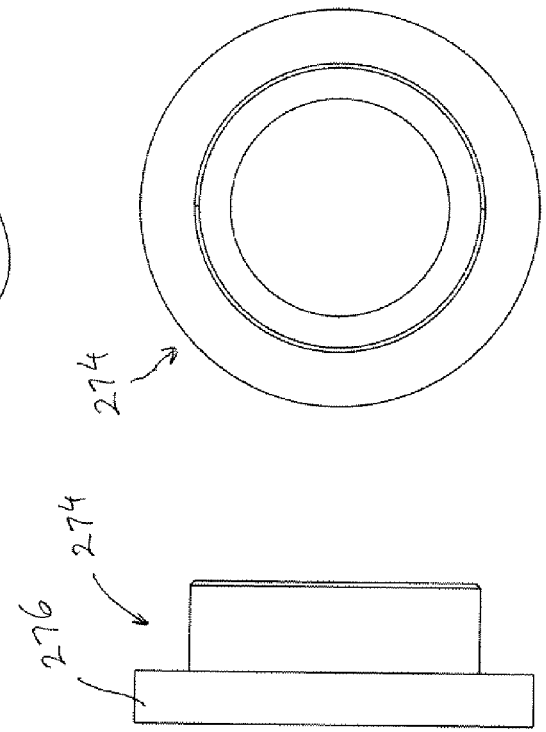
Figure 133:
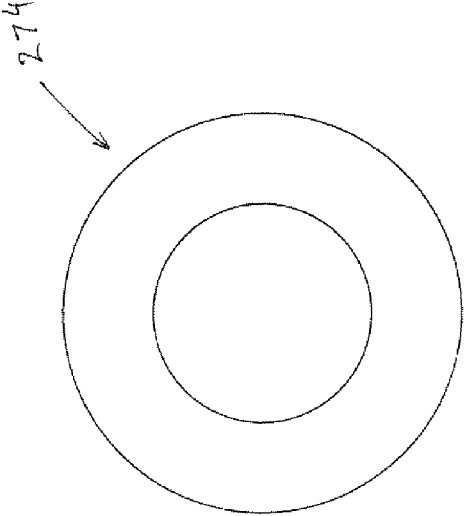
Figure 132:
Figure 135:
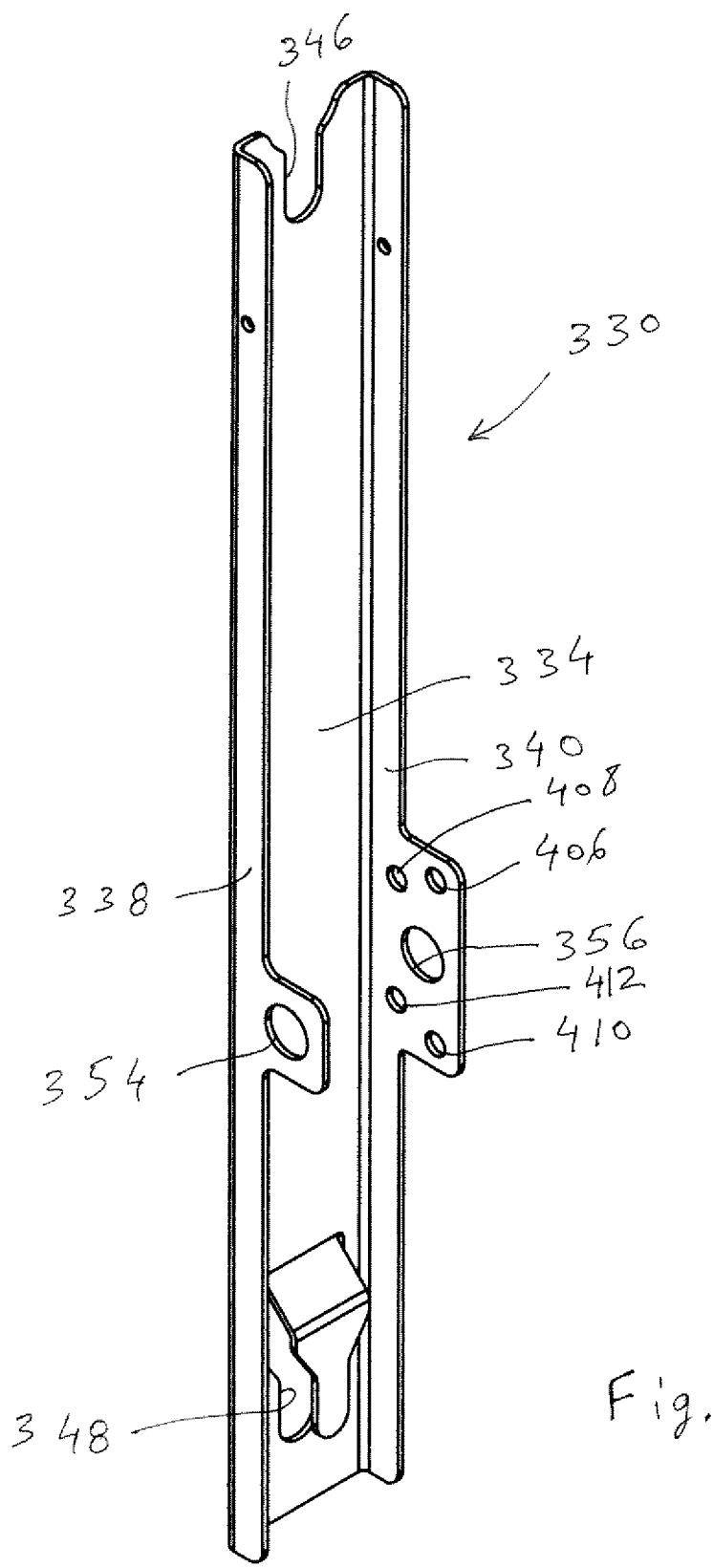
FIG. 135 is a perspective view of the right display support bracket of the display mounting apparatus according to the present invention.

Referring to FIGS. 1-134, the preset invention is directed to a display mounting apparatus 200 for mounting a flat screen TV (television) monitor, a flat panel TV or other type of monitor or the like to a wall. The monitors or displays with which the mounting apparatus 200 may be suitably used include, but are not limited to, flat panel TVs, monitors, and displays that use plasma and/or Liquid Crystal Display (LCD) technology. Referring to FIG. 1, the mounting apparatus 200 can be seen supporting a display 202 on a vertical wall 204.

The mounting apparatus 200 includes a wall mounting bracket 206 for mounting the apparatus 200 to the wall 204 or other similar surface. The wall mounting bracket 206 is in the form of an elongated channel having a back plate 208 and two sidewalls 210, 212 extending from either side of the back plate 208. The back plate 208 of the wall mounting bracket 206 has a first plurality of slots 214 distributed along the length of the back plate 208 near the sidewall 210, and the back plate 208 of the wall mounting bracket 206 also has a second plurality of slots 216 again distributed along the length of the back plate 208 but near the other sidewall 212. The sidewalls 210, 212 of the wall mounting bracket 206 project in parallel from either side of the back plate 208 and are essentially perpendicular to the back plate 208 of the wall mounting bracket 206. The sidewalls 210, 212 extend substantially along the length of the back plate 208 of the wall mounting bracket 206. The first and second pluralities of slots 214, 216 are provided so that fasteners, for example the screws 218, can be placed through the slots 214, 216 to mount or attach the wall mounting bracket 206 to, for example, the wall 204. The fact that the slots 214, 216 are provided in a plurality locations along the length of the wall mounting bracket 206 allows flexibility in positioning the mounting fasteners 218 such that they are aligned with, for example, a wall stud (not shown) to ensure that the weight of the mounting apparatus 200 and the TV monitor 202 are properly supported given that the position of the wall studs relative to a desired position for attaching the mounting apparatus 200 may vary from one wall to another wall. Four lateral flanges 220, 222 projecting from the base of the sidewalls 210, 212, respectively, in the plane of the back plate 208 of the wall mounting bracket 206 are also provided with slots 224, 226 again for use with mounting fasteners 218 for providing even more options and flexibility with respect to attaching the wall mounting bracket 206 to a wall such as wall 204. Any well know fasteners, for example, such as screws or bolts may be used in conjunction with the wall mounting apparatus 200 for mounting the wall mounting apparatus to a wall.

The back plate 208 of the wall mounting bracket 206 has two rectangular cut outs 228, 230 the function of which is explained below. The wall mounting bracket 206 is mounted to the wall 204 such that its longest dimension extends in the horizontal direction. Each of the sidewalls 210, 212 of the wall mounting bracket 206 has cut back portions 232, 234, 236, and 238 near each of its ends. Each of the sidewalls 210, 212 of the wall mounting bracket 206 is provided with a pair of openings 240, 242 and 244, 246, respectively. Each of the pair of openings 240, 242 in the first sidewall 210 is spaced apart from the other by some distance, and in the illustrated example each is located near a respective one of the cut back portions 232, 234 at the ends of the sidewall 210. Similarly, each of the openings 244, 246 in the second sidewall 212 is spaced apart from the other and in the illustrated example each is located near a respective cut back portion 236, 238 at a respective end of the second sidewall 212. The holes or openings 240, 244 in the sidewalls 210, 212, respectively, are in registry with one another, and similarly the openings 242, 246 in the sidewalls 210, 212, respectively, are in registry with one another.

The wall mounting apparatus 200 further includes a first two-link arm 248 and a second two-link arm 250. The first two-link arm 248 includes a first link 252 and a second link 254. Similarly, the second two-link arm 250 includes a first link 256 and a second link 258. The first link 252 of the first two-link arm 248 is pivotally connected to the wall mounting bracket 206 near one end of the wall mounting bracket 206. In the illustrated example, the first link 252 of the first two-link arm 248 is pivotally connected to the wall mounting bracket 206 near the cut back portions 232, 236 of the sidewalls 210, 212. The second link 254 of the first two-link arm 248 is pivotally connected to the first link 252 of the first two-link arm 248 at a distance from the pivotal connection between the first link 252 and the mounting bracket 206 measured along the length of the first fink 252. Similarly, the first link 256 of the second two-link arm 250 is pivotally attached to the wall mounting bracket 206 at a distance from the pivotal connection between the first link 252 of the first two-link arm 248 and the mounting bracket 206 measured along the length of the wall mounting bracket 206. In the illustrated example, the first link 256 of the second two-link arm 250 is pivotally connected to the wall mounting bracket 206 near the other end of the wall mounting bracket 206, in other words near the cut back portions 234, 238 of the sidewalls 210, 212. The second link 258 of the second two-link arm 250 is pivotally attached to the first link 256 of the second two-link arm 250 at a distance from the pivotal connection between the first link 256 and the mounting bracket 206 measured along the length of the first link 256.

The first link 252 of the first two-link arm 248 and the first link 256 of the second two-link arm 250 are structurally identical. Each of the first links 252, 256 has a back plate 260 that has a smaller width near the pivotal connection of the first link 252, 256 to the corresponding second link 254, 258 as compared to width of the back plate 260 near the pivotal connection of the first link 252, 256 to the wall mounting bracket 206. Each of the first links 252, 256 has a first sidewall 262 that extends along one side of the back plate 260, and each of the first links 252, 256 has a second sidewall 264 that extends along the other side of the back plate 260. The first and second sidewalls 262, 264 are each substantially perpendicular to the back plate 260. The first sidewall 262 has a hole 266 near one end and a hole 268 near the other end. The second sidewall 264 has a hole 270 near one end and a hole 272 near the other end. The holes 266 and 270 are in registry with one another, and similarly the holes 268 and 272 are in registry with one another. The sidewalls 262, 264 of each of the first links 252, 256 fit between the sidewalls 210, 212 of the mounting bracket 206 such that the holes 266, 270 of the first link 252 of the first arm 248 register with the holes 240, 244, respectively, and such that the holes 270, 266 of the first link 256 of the second arm 250 register with the holes 242, 246, respectively.

The holes 266, 270 of the first link 252 of the first arm 248 are larger than the holes 240, 244, respectively, of the mounting bracket 206. Similarly, the holes 270, 266 of the first link 256 of the second arm 250 are larger than the holes 242, 246, respectively, of the mounting bracket 206. Each bushing 274 is tubular with a hollow bore and an annular flange 276. One bushing 274 is inserted into the hole 266 of the first link 252 of the first arm 248 such that the flange 276 of the bushing is positioned between the first sidewall 262 of the first link of the first arm 248 and the sidewall 210 of the mounting bracket 206 and the bore of the bushing registers with the hole 240. Then a pivot pin 278 is positioned through the bore of the bushing 274 and the hole 240. The pivot pin 278 has a head 280 and a retaining ring groove 282. A retaining ring 284 is engaged to the retaining ring groove of the pivot pin to secure the pivot pin in place.

A second bushing 274 is inserted into the hole 270 of the first link 252 of the first arm 248 such that the flange 276 of the second bushing is positioned between the second sidewall 264 of the first link of the first arm 248 and the sidewall 212 of the mounting bracket 206 and the bore of the second bushing registers with the hole 244. Then a second pivot pin 278 is positioned through the bore of the second bushing 274 and the hole 244. A second retaining ring 284 is engaged to the retaining ring groove of the second pivot pin 278 to secure the second pivot pin in place. Thus, one end of the first link 252 of the first arm 248 is pivotally joined to the mounting bracket 206. Using the same procedure and another two bushings 274, another two pivot pins 278, and another two retaining rings 284, one end of the first link 256 of the second arm 250 is pivotally joined to the mounting bracket 206.

The second link 254 of the first two-link arm 248 and the second link 258 of the second two-link arm 250 are structurally identical. Each of the second links 254, 258 has a back plate 286 that has a smaller width near the pivotal connection of the second link 254, 258 to the support beam 300 as compared to width of the back plate 286 near the pivotal connection of the second link 254, 258 to the corresponding first link 252, 256. Each of the second links 254, 258 has a first sidewall 288 that extends along one side of the back plate 286, and each of the second links 254, 258 has a second sidewall 290 that extends along the other side of the back plate 286. The first and second sidewalls 288, 290 are each substantially perpendicular to the back plate 286. The first sidewall 288 has a hole 292 near one end and a hole 294 near the other end. The second sidewall 290 has a hole 296 near one end and a hole 298 near the other end. The holes 292 and 296 are in registry with one another, and similarly the holes 294 and 298 are in registry with one another. The sidewalls 288, 290 of each of the second links 254, 258 fit between the sidewalls 262, 264 of the respective one of the first links 252, 256 such that the holes 292, 296 of the second link 254 of the first arm 248 register with the holes 268, 272, respectively, of the first link 252 of the first arm 248, and such that the holes 292, 296 of the second link 258 of the second arm 250 register with the holes 268, 272, respectively, of the first link 256 of the second arm 250. The pivotal joint between the first and second links of both of the first and second two-link arms are provided with means to produce a frictional drag on the relative pivotal movement in a pivotal joint.

The holes 268, 272 of the first link 252 of the first arm 248 are larger than the holes 292, 296, respectively, of the second link 254 of the first two-link arm 248. Similarly, the holes 268, 272 of the first link 256 of the second two-link arm 250 are larger than the holes 292, 296, respectively, of the second link 258 of the second two-link arm 250. One bushing 274 is inserted into the hole 268 of the first link 252 of the first arm 248 such that the flange 276 of the bushing is positioned between the first sidewall 262 of the first link of the first arm 248 and the first sidewall 288 of the second link 254 of the first two-link arm 248 and the bore of the bushing registers with the hole 292. Then a pivot pin 278 is positioned through the bore of the bushing 274 and the hole 292 and a retaining ring 284 is engaged to the retaining ring groove of the pivot pin to secure the pivot pin in place.

Another bushing 274 is inserted into the hole 272 of the first link 252 of the first arm 248 such that the flange 276 of this bushing is positioned between the second sidewall 264 of the first link 252 of the first arm 248 and the second sidewall 290 of the second link 254 of the first two-link arm 248 and the bore of this bushing registers with the hole 296. Then a pivot bolt 302 is positioned through the bore of the bushing 274 and the hole 296. The bolt 302 has a threaded portion 304. A concavo-convex spring washer 306, known as a "belville" washer, is placed around the threaded portion of the bolt. A threaded nut 308 is engaged to the threaded portion of the bolt and tightened to produce an axial load with the help of the spring washer just described in order to generate friction in the pivot joint. A second threaded nut 310 is used as a jam nut to lock the nut 308 in place. The means to produce a frictional drag on the relative pivotal movement in a pivotal joint comprises the spring washer 306, the bolt 302 and the nuts 308, 310. The bolt 302 has a large diameter portion that completely fills the bore of the bushings 274 and the holes 296, 298 and thus eliminates any play in the pivot joint just like the pivot pin 278. Thus, one end of the first link 252 of the first arm 248 is pivotally joined to one end of the second link 254 of the first two-link arm 248. Using the same procedure and construction one end of the second link 258 of the second arm 250 is pivotally joined to one end of the first link 256 of the second arm 250. The annular flanges of the bushings 274 eliminate axial play between the links of the arms 248, 250 and between the links and the mounting bracket 206 and between the links and the support beam 300.

The projections 314 limit the rotation of the second link 254, 258 relative to the respective first link 252, 256 of each arm 248, 250 in order to prevent the arms 248, 250 from locking up or over rotating, which would lead a user to have to reach behind the display and reset the angle of the joints in the arms 248, 250 so that the arms will fold down properly.

The second link 254 of the first two-link arm 248 is pivotally attached to the support beam 300 and the second link 258 of the second two-link arm 250 is also pivotally attached to the same support beam 300. The pivotal attachment between the second link 254 of the first two-link arm 248 and the support beam 300 is located at a distance apart from the pivotal attachment between the second link 254 of the first two-link arm 248 and the first link 252 of the first two-link arm 248. Similarly, the pivotal attachment between the second link 258 of the second two-link arm 250 and the support beam 300 is located at a distance apart from the pivotal attachment between the second link 258 of the second two-link arm 250 and the first link 256 of the second two-link arm 250. Also, the pivotal attachment between the second link 254 of the first two-link arm 248 and the support beam 300 is located at a distance apart from the pivotal attachment between the second link 258 of the second two-link arm 250 and the support beam 300. Each of the first and second two-link arms 248, 250 can assume a continuous variety of positions between a fully collapsed position and a fully extended position. With both arm 248, 250 in the fully collapsed or folded position, the first links 252, 256 are nested in the mounting bracket 206, the second links 254, 258 are nested in their respective first links 252, 256, and the support beam 300 is nested in the second links 254, 258 and consequently in the mounting bracket 206.

Figure 5:
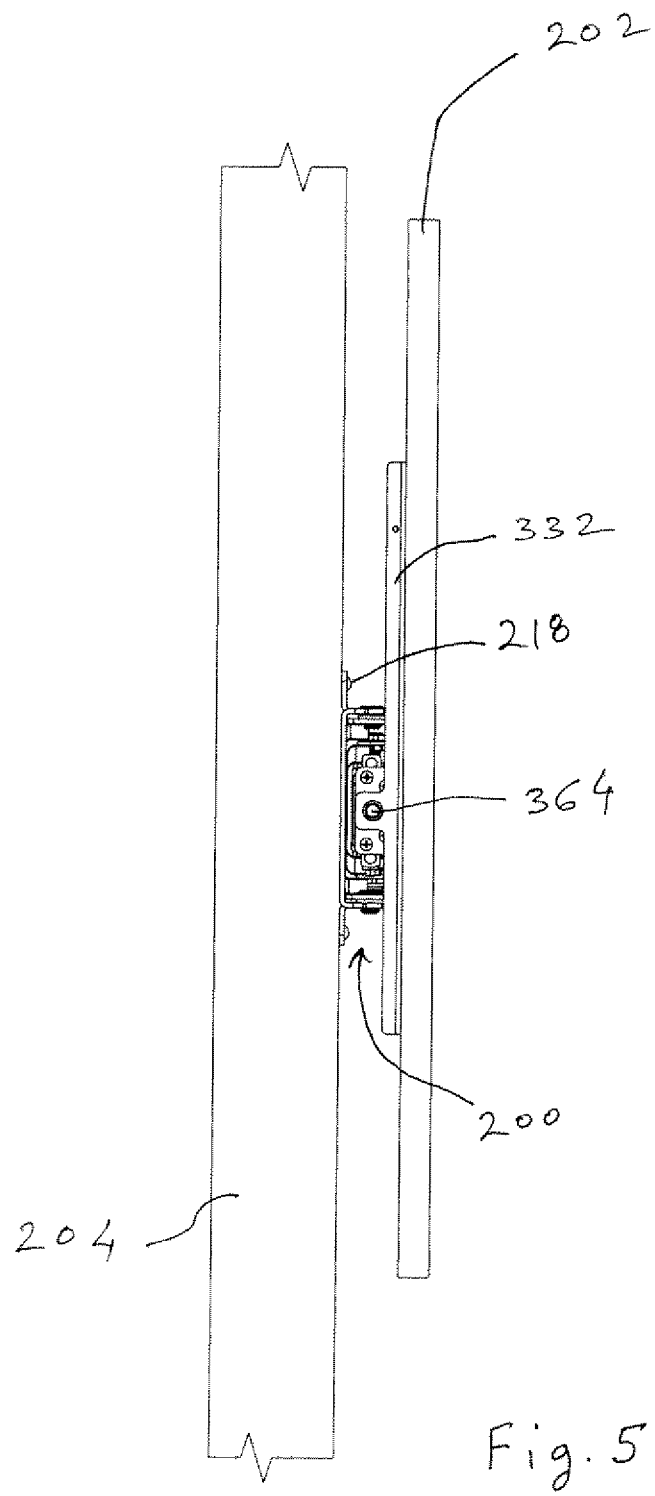
Figure 6:
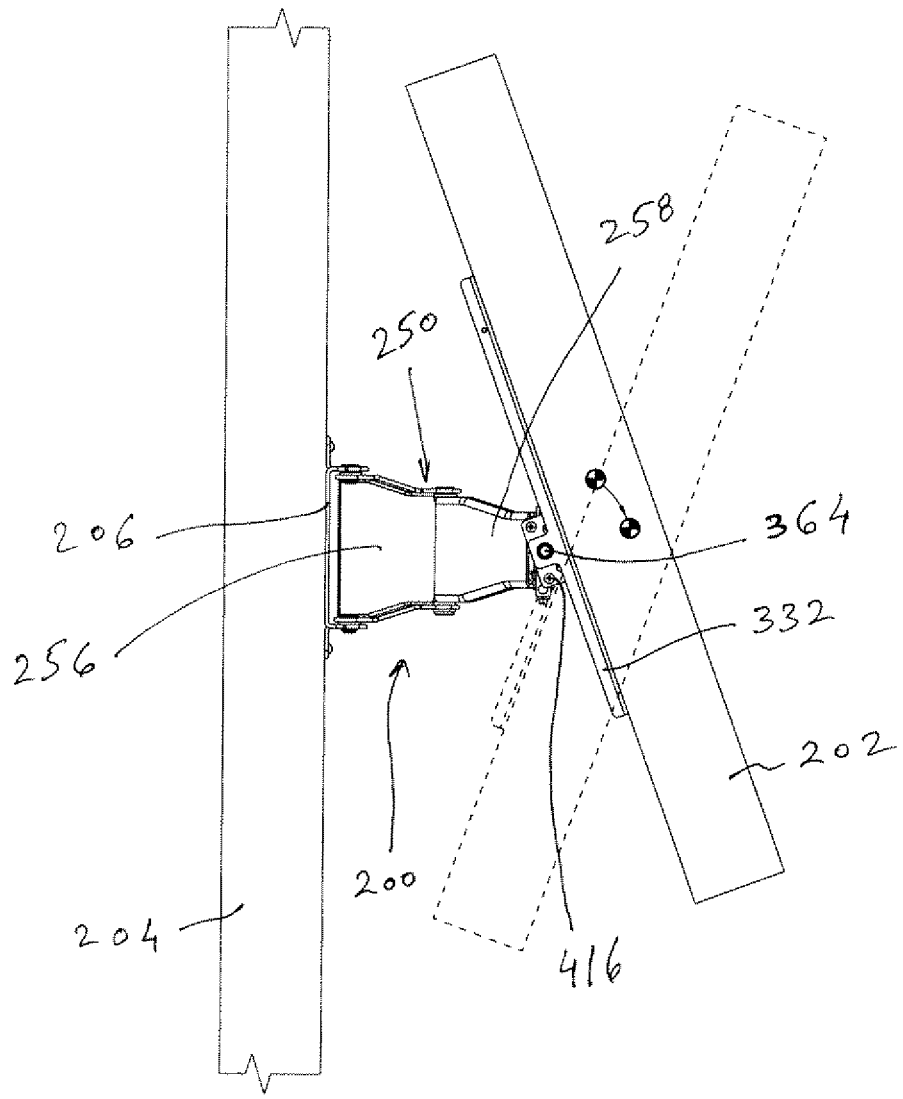
Figure 7:
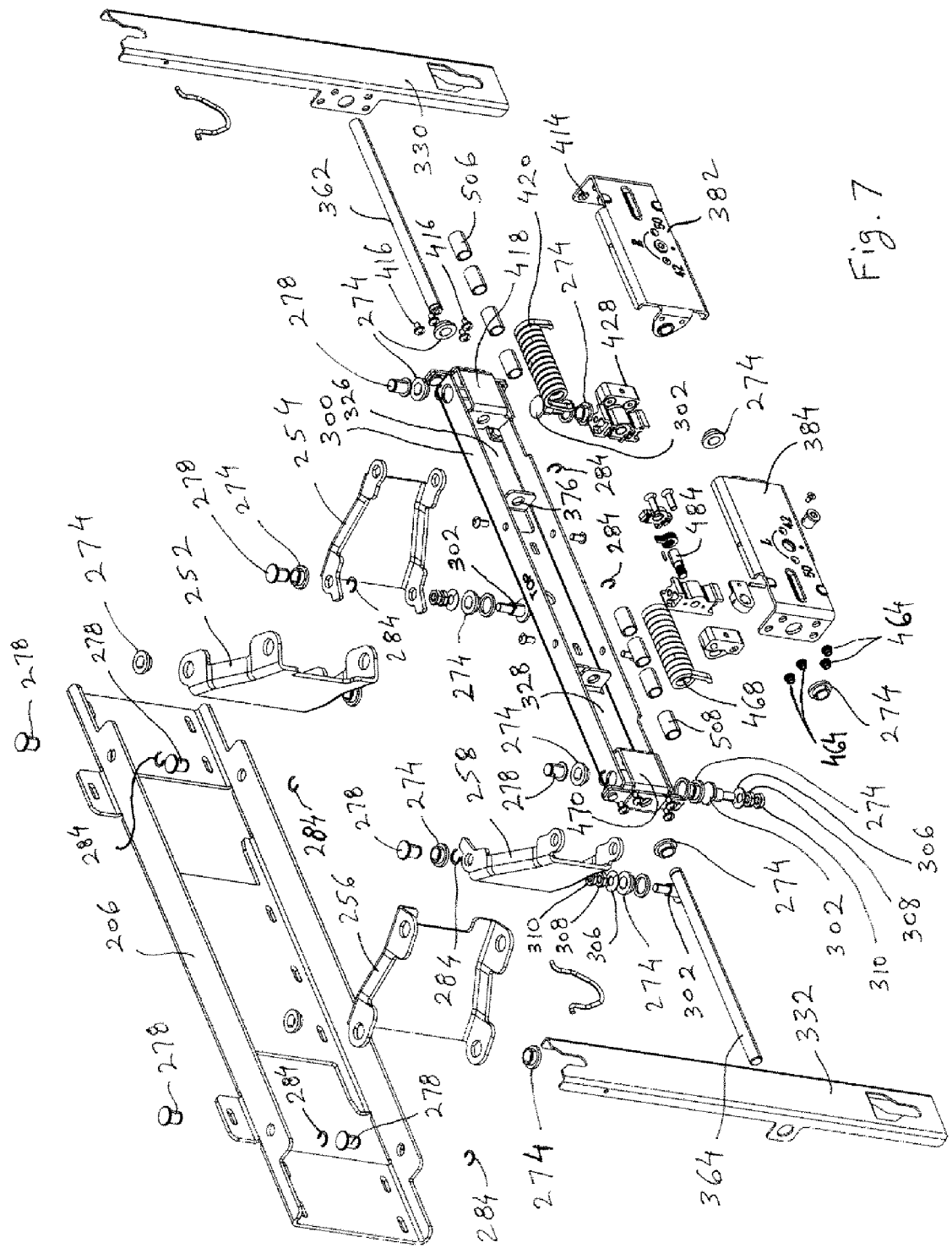
FIG. 7 is an exploded view of a display mounting apparatus according to the present invention.
Figure 8:
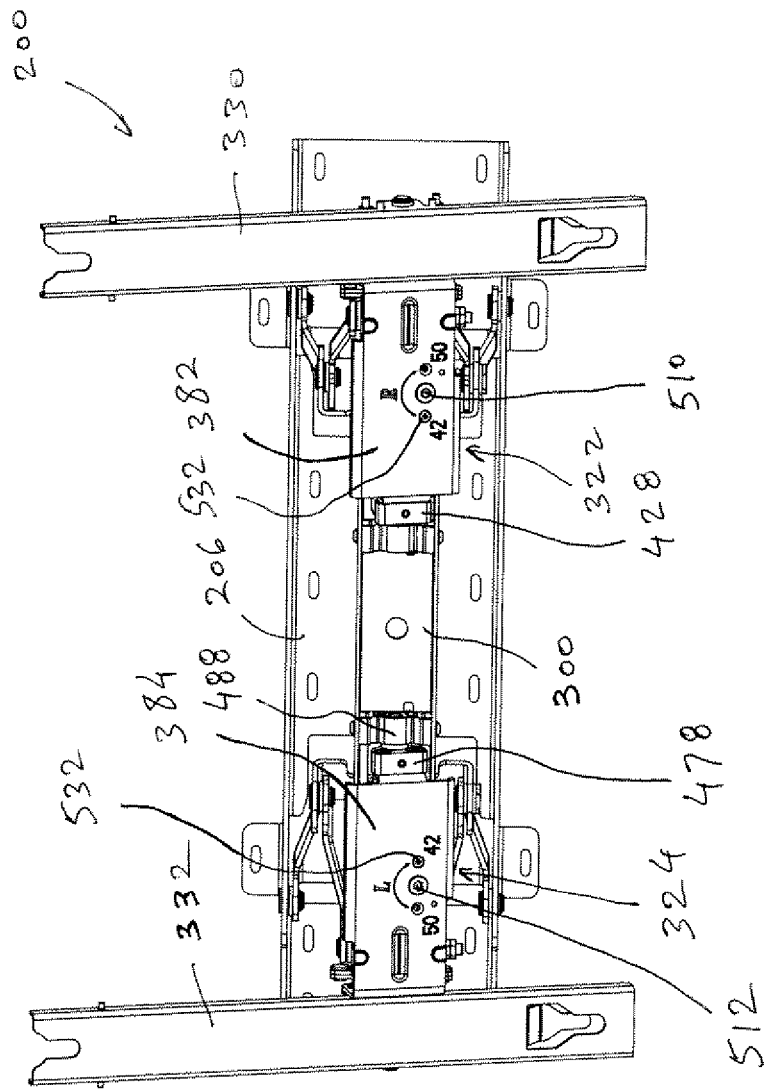
Figure 11:
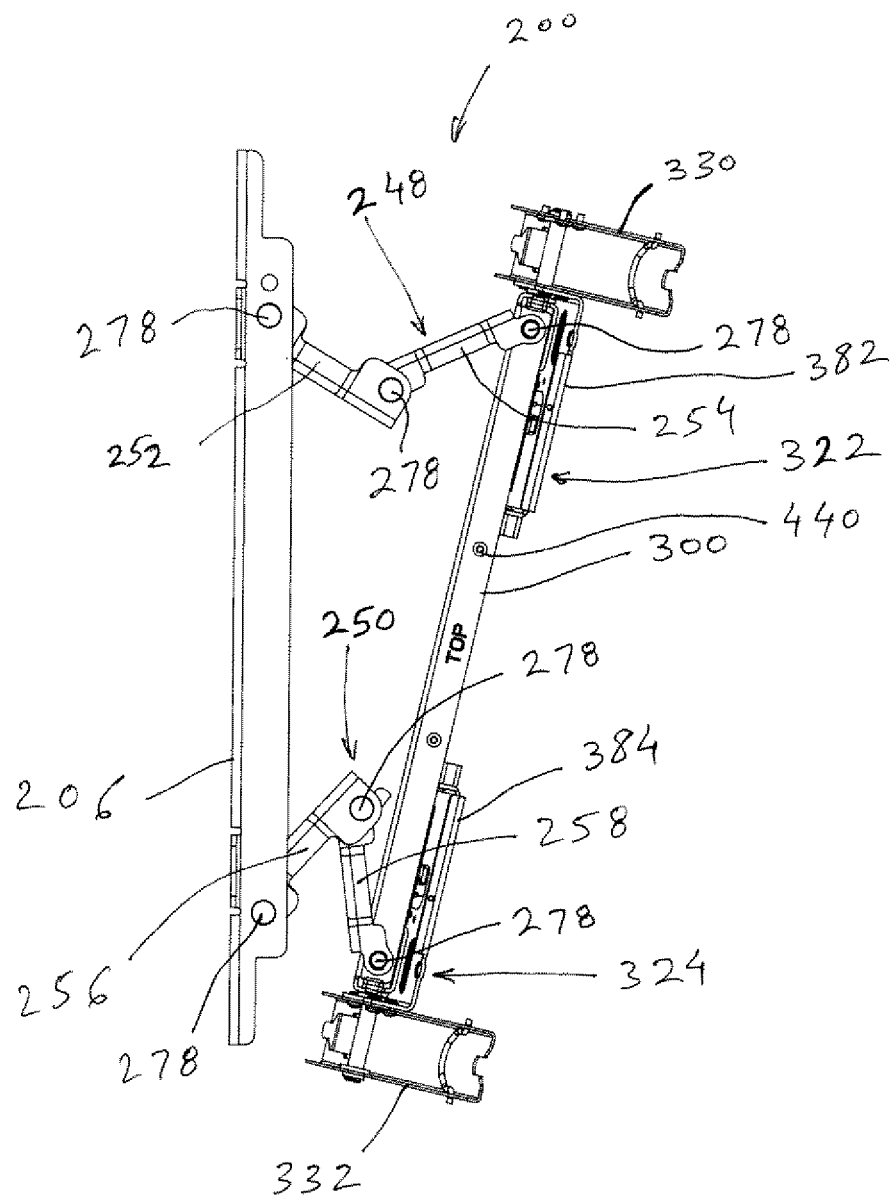
Figure 12:
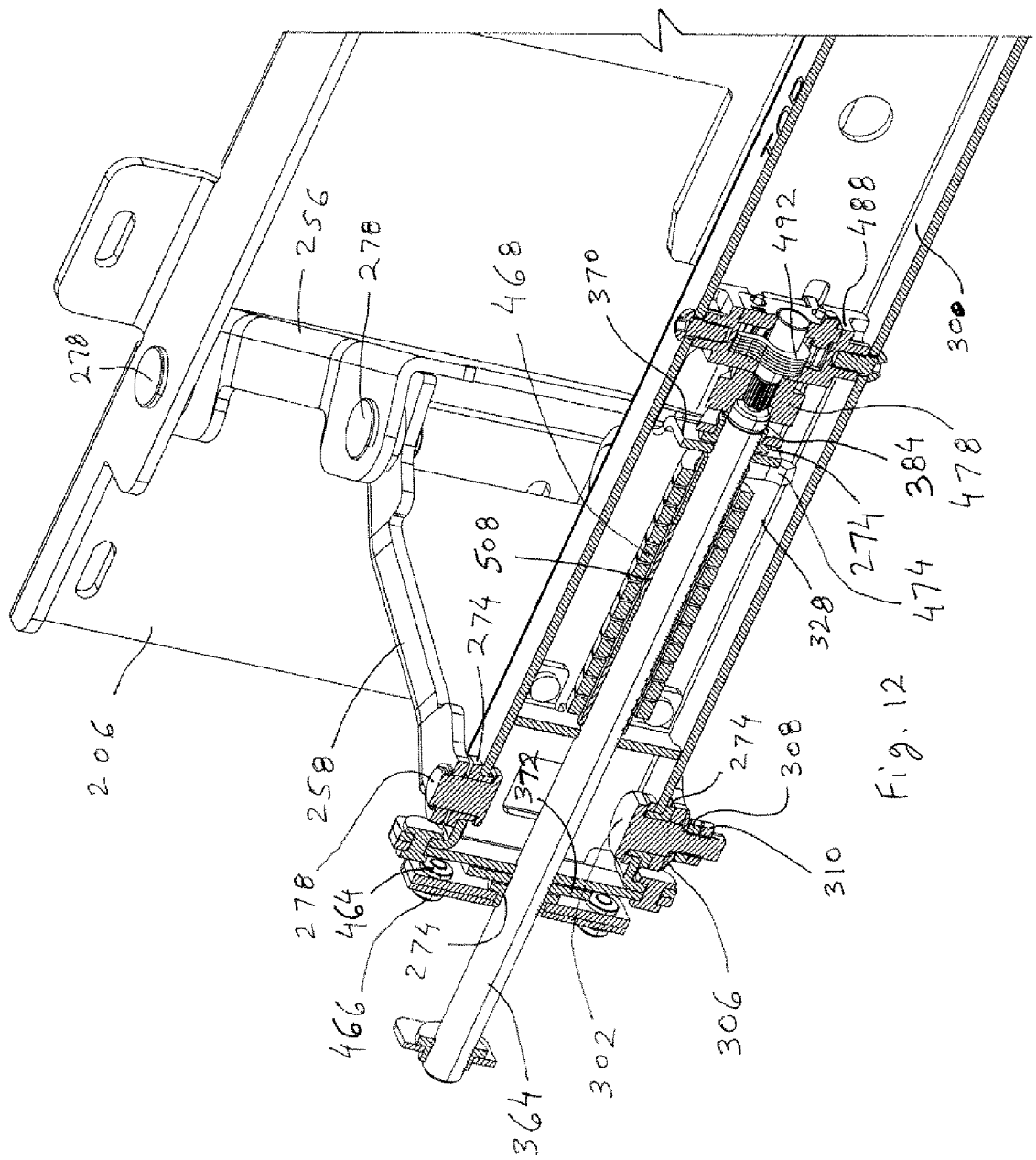
FIG. 12 is a partial cross sectional view of the left counterbalancing hinge of the display mounting apparatus according to the present invention.
Figure 13:
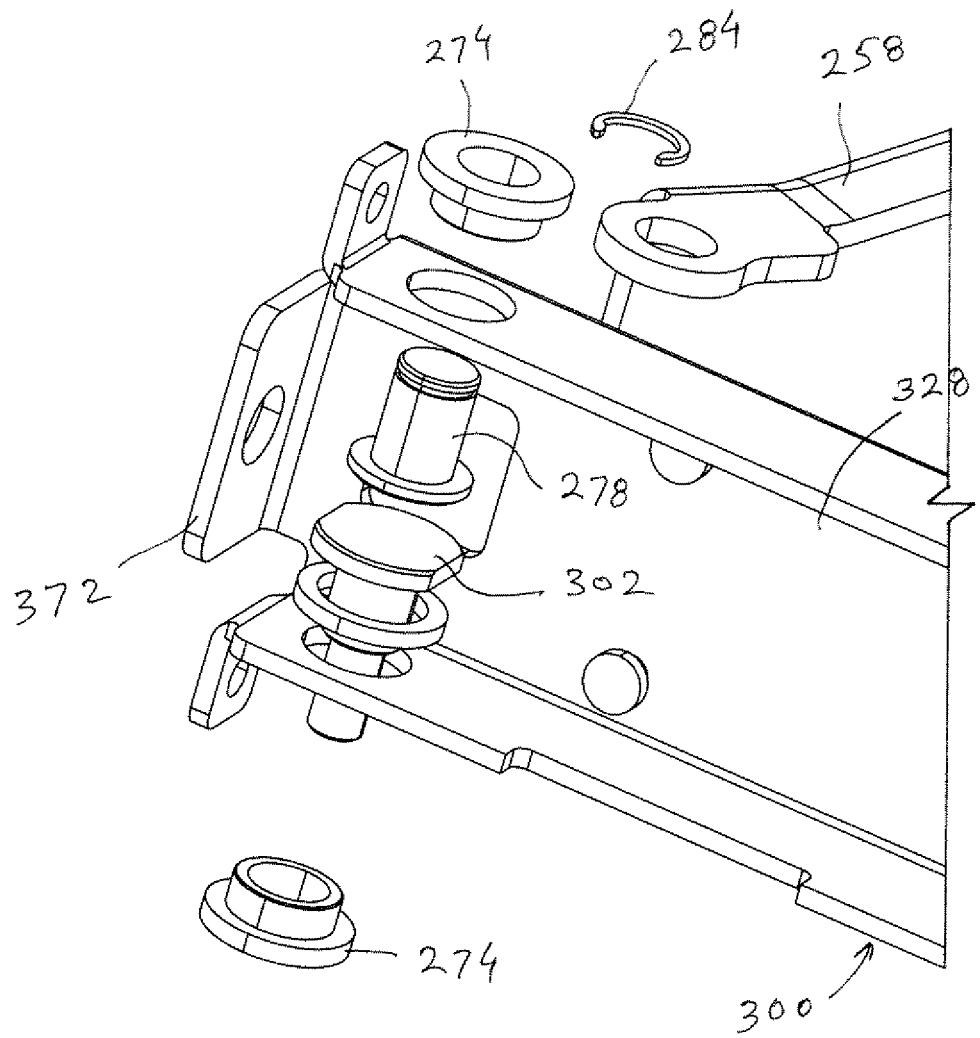
FIG. 13 is a fragmentary exploded view of the pivotal connection of the second link of the left two-link arm with the support beam of the display mounting apparatus according to the present invention.
Figure 14A:
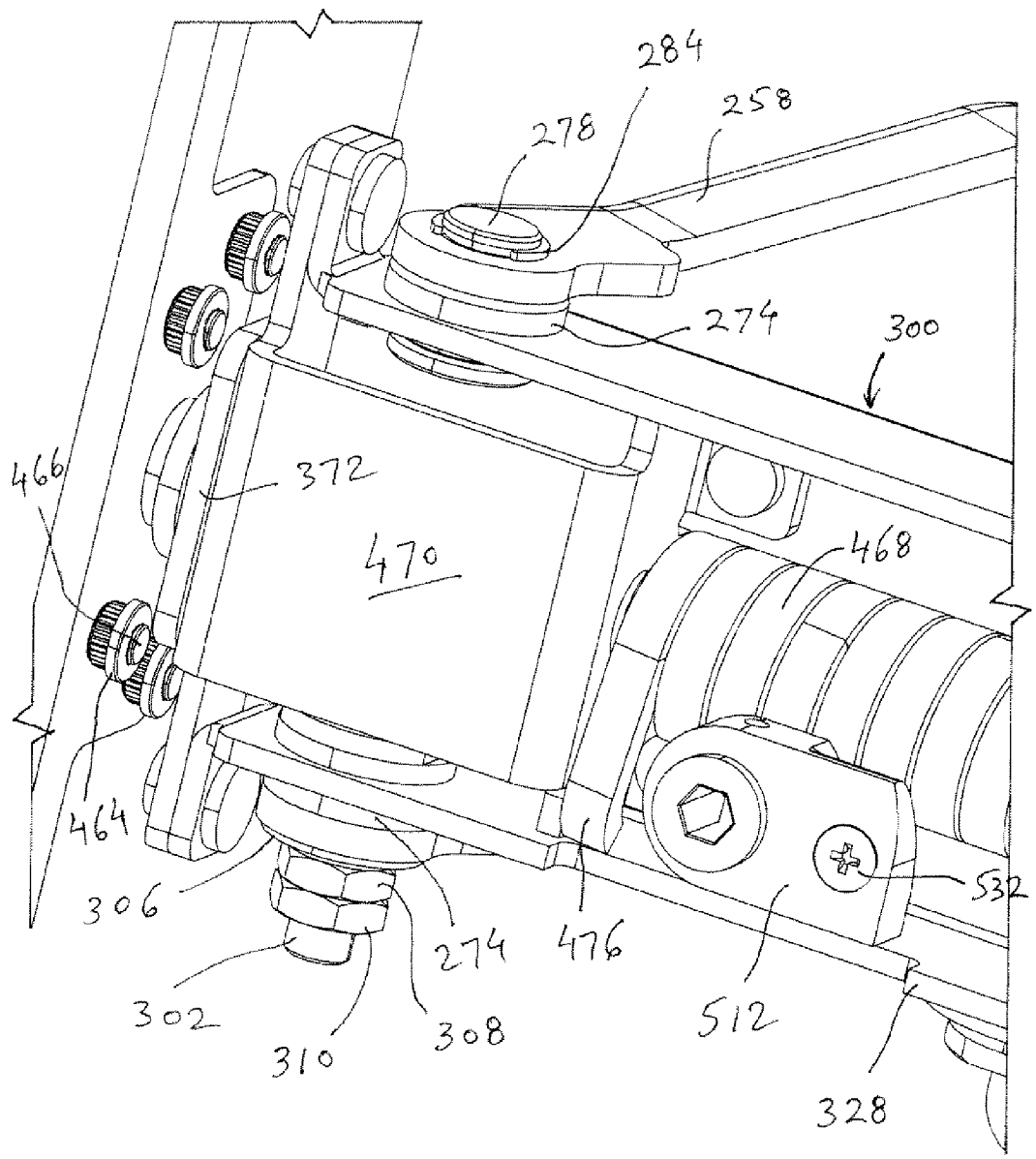
FIGS. 14A-14B are fragmentary views showing the details of the left counterbalancing hinge of the display mounting apparatus according to the present invention.
Figure 14B:
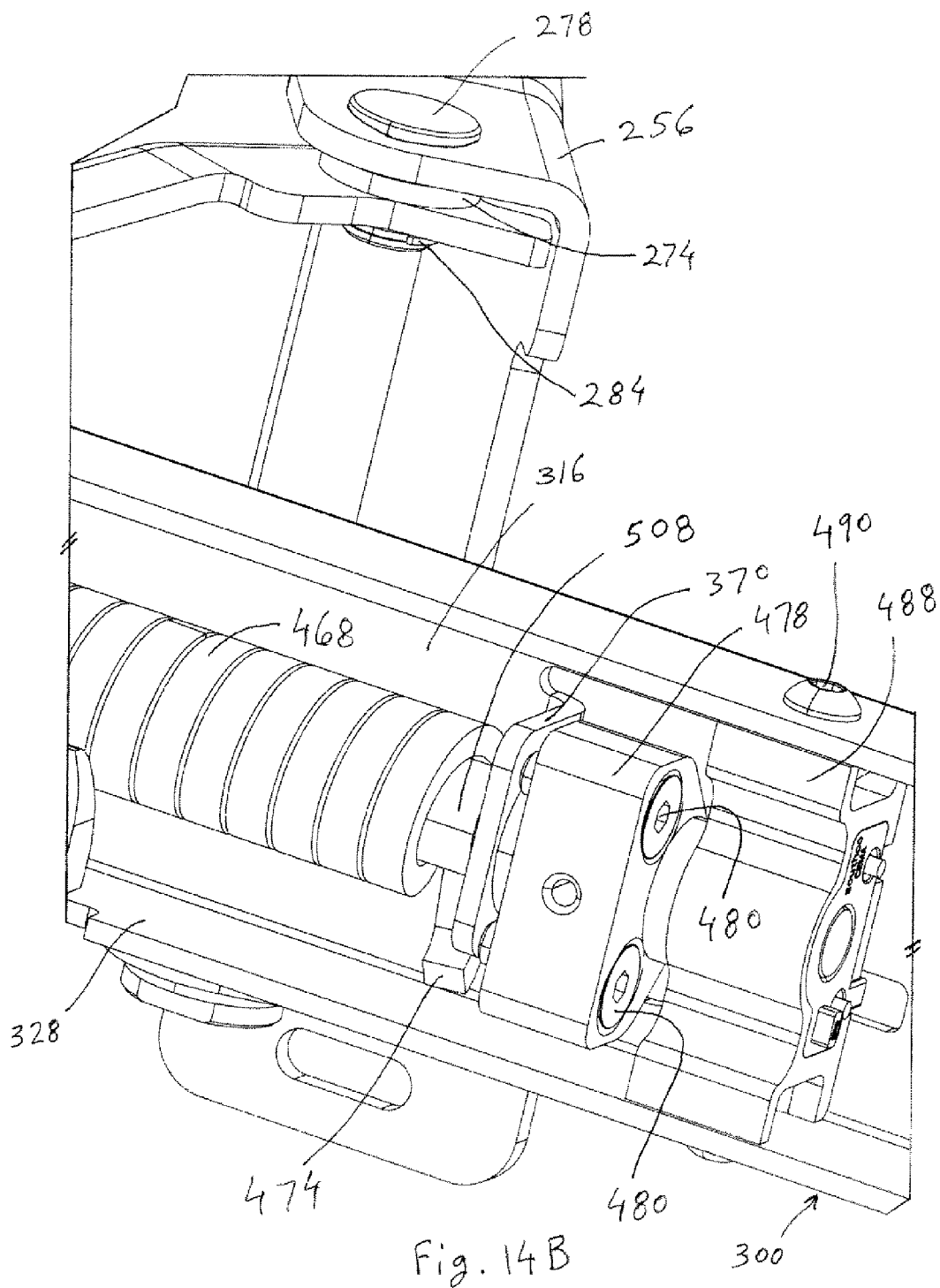

The first two-link arm 248 and the second two-link arm 250 move independently of one another. When both the first and second two-link arms 248, 250 are in their fully collapsed configurations the support beam 300 lies flat as close as possible to the back plate 208 of the wall mounting bracket 206. In fact the support beam 300 would only be apart from the back plate 208 of the mounting bracket 206 a distance approximately equal to the thickness of the back plate 286 of the second links 254, 258. With the support beam 300 in this position, portions of the first links 252, 256 of the first and second two-link arms 248, 250 is received in a respective one of the rectangular cut outs 228, 230 in the back plate 208 of the wall mounting bracket 206. This arrangement allows the two-link arms 248, 250 to collapse to a minimized distance from the wall 204. Furthermore, the second link 254, 258 of each two-link arm 248, 250 is received or collapses into the first link 252, 256 of each of the two-link arms 248, 250, thus, minimizing the distance between the support beam 300 and the wall 204 when the two-link arms 248, 250 are in the fully collapsed configuration and the support beam 300 is in its retracted position relative to the wall 204 as shown in FIG. 5. When the first and second two-link arms 248, 250 are in their fully extended position, as shown in FIGS. 1, 2, 4, and 6, the support beam 300 is at its maximum distance away from the wall 204. When one of the two-link arms 248, 250 is closer to the fully collapsed position relative to the other two-link arm the support beam 300 and consequently the TV monitor 202 supported by the wall mounting apparatus 200 will be tilted with one of its sides closer to the wall 204 than the other as illustrated in FIGS. 3 and 9-11. The illustrated embodiment provides for the support beam 300 and consequently the TV monitor 202 to be tilted or swiveled about a vertical axis to a maximum of 20° degrees to each side relative to the wall 204. The lower part of the pivotal attachments between the first link 252, 256 in each two-link arm 248, 250 and the second link 254, 258 in each two-link arm is provided with a means to produce a frictional drag on the relative pivotal movement in a pivotal joint as was previously described. The means to produce a frictional drag on the relative pivotal movement in a pivotal joint imparts a frictional drag that affects the entire joint movement even though it may be applied to one half of the joint.

The pivotal attachment between each of the second links 254, 258 of the two-link arms 248, 250 and the support beam 300 is also provided with means for a producing a frictional drag on the relative pivotal movement in a pivotal Joint that is structurally identical to the means described in relation to the pivotal attachments in each arm 248, 250 between the first links 252, 256 and the second links 254, 258 and that produces a frictional drag on the pivotal motion of the support beam 300 relative to the second links 254, 258 of the two two-link arms 248, 250. This frictional drag prevents unintended movements of the TV monitor 202, so that the TV monitor will remain in the desired position selected by the user and the movement of the TV monitor to the desired position will be controlled more effectively by the user. In the illustrated embodiment, the frictional drag is provided by concavo-convex spring washers 306 that are tightened against the sidewalls of the various links in the arms 248 and 250 at some of the pivot joints to create frictional resistance to the pivotal movement of the various links. The support beam 300 is in the form of an elongated rectangular channel having a back plate 316 and sidewalls 318, 320 projecting from either side of the back plate 316. The sidewalls 318, 320 of the support beam 300 are parallel to one another and in combination with the back plate 316 of the support beam define the cross section of the support beam which resembles an open rectangular channel.

The display mounting apparatus 200 includes a pair of counterbalancing tilting mechanisms or hinges 322, 324 that allow the TV monitor 202 to be tilted or pivotally moved about an axis that is horizontal and extends in the same direction as the longitudinal axis of the support beam 300. Each of the first and second tilting mechanisms 322, 324 is supported by an end portion 326, 328, respectively, of the support beam 300.

The display mounting apparatus 200 also includes a pair of display support brackets 330, 332 that allowed attachment of the TV monitor 202 to the display mounting apparatus 200. Each of the support brackets 330, 332 is attached to and supported by a respective one of the first and second tilting mechanisms 322, 324. Each of the support brackets 330, 332 is in the form of an elongated channel with a back plate 334, 336 and two sidewalls, 338, 340 in the case of support bracket 330 and 342, 344 in the case of support bracket 332. The back plate 334, 336 of each support bracket 330, 332 has a pair of slots, 346, 348 and 350, 352 respectively, to receive hooks or studs in the back of the TV monitor 202 in order to support the TV monitor on the wall 204. Each of the support brackets 330, 332 is provided with a pair of axially aligned holes, 354, 356 and 358, 360 respectively, that allow a rod 362, 364 that forms part of the respective tilting mechanism to pass through the respective pair of holes 354, 356 or 358, 360 in order to support the weight of the support bracket 330, 332 and approximately half the weight of the TV monitor 202 supported by the support brackets. Each end portion 326, 328 of the support beam 300 is provided with a pair of flanges 366, 368 and 370, 372 that extend into the cross-sectional area of the channel defined by the back plate 316 and the sidewalls 318, 320 of the support beam 300. Each pair of flanges 366, 368 and 370, 372 are in registry with one another and each of these flanges is provided with a hole 374, 376, 378, 380 that is in registry at least with the hole in the other flange of the pair. In the illustrated example, all the holes 374, 376, 378, 380 are aligned along a common center axis. Each rod 362, 364 of the tilting mechanism extends through a respective pair of holes, 374, 376 or 378, 380, in the respective pair of flanges 366, 368 or 370, 372 and is thereby supported on the support beam 300. Each tilting mechanism 322, 324 also includes a tilting bracket 382, 384, respectively, that has a back plate 386, 388 and two end flanges, 390, 392 and 394, 396 respectively.

Each of the end flanges 390, 392, 394, 396 is provided with an opening 398, 400, 402, 404, respectively, for the respective rod 362, 364 of the respective tilting mechanism. The two flanges 366, 368 of the end portion 326 of the support beam 300 fit between the end flanges 390, 392 of the tilting bracket 382. The end flanges 390, 392 of the tilting bracket 382 are provided with holes 398, 400 that are in registry with one another. The rod 362 of the tilting mechanism 322 extends through the holes 398, 400 in the end flanges 390, 392 of the tilting bracket 382 and through the holes 374, 376 in the flanges 366, 368 of the support beam 300 to pivotally connect the tilting bracket 382 to the end portion 326 of the support beam 300. Thus, the axis of rotation of the tilting bracket 382 is coincident with the axis of rotation of the support bracket 330 that cooperatively with the support bracket 332 holds the TV monitor 202.

Four holes 406, 408, 410, 412 in the side wall 340 of the support bracket 330 that is adjacent to the end flange 390 of the tilting bracket 382 are provided that register with four corresponding threaded inserts 414 provided in four corresponding holes 405, 407, 409, 411 in the end flange 390 of the tilting bracket 382. Four screws 416 are positioned through each of the holes 406, 408, 410, 412 and engaged to the threaded inserts 414 in the end flange 390 of the tilting bracket 382 to attach the support bracket 330 to the tilting bracket 382 such that the support bracket 330 and the tilting bracket 382 pivotally move about the axis of rotation defined by the rod 362 together as a unit.

The tilting mechanism 322 also includes a torsion spring 420 that is positioned between the flanges 366, 368 of the end portion 326 of the support beam 300. The spacer bracket 418 axially fixes the position of the torsion spring 420 such that the torsion spring is properly positioned along the rod 362 to ensure proper operation. The spacer bracket 418 also provides additional support to the rod 362. The rod 362 of the tilting mechanism 322 passes through the coils 422 of the torsion spring 420. The torsion spring 420 has a pair of arms 424, 426, one being provided at each end of the coiled portion 422 of the torsion spring 420. One of the arms 424 presses against the tilting bracket 382 and the other arm 426 presses against the back plate 316 of the support beam 300. The arms 424, 426 of the torsion spring 420 contact the tilting bracket 382 and the back plate 316 of the support beam 300, respectively, below the axis of rotation of the tilting bracket 382 and support bracket 330, i.e. below the longitudinal axis of the rod 362. The arms 424, 426 of the torsion spring 420 are biased to move apart from one another. This tends to bias the tilting bracket 382 and support bracket 330 to rotate or pivot in an upward direction when the display mounting apparatus 200 is mounted to the wall 204. Accordingly, the torsion spring 420 counterbalances the force of gravity on the TV monitor 202.

The tilting mechanism 322 also includes an adapter 428 that is attached by a pair of screws 436 to the end flange 392 of the tilting bracket 382 that is farthest from the support bracket 330. The adapter 428 rotates with the tilting bracket 382 as a unit. The adapter 428 has a fluted hole 434 that is positioned coaxially with the rod 362 of the tilting mechanism 322 and thus with the axis of rotation of the tilting bracket 382. The tilting mechanism 322 also includes a shaft 430 that has a fluted end portion 432 that is matingly engageable with the fluted hole 434 in the adapter 428. The fluted end portion 432 of the shaft 430 is inserted into the fluted hole 434 in the adapter 428 such that the shaft 430 and the adapter 428 rotate as a unit about an axis of rotation that is essentially coincident with the axis of rotation of the tilting bracket 382 and the support bracket 330. The shaft 430 extends into a friction clip housing 438 that is attached to the support beam 300 by screws 440 such that it is supported near the end portion 326 of the support beam 300. The friction clip housing 438 houses a plurality, in this example six, friction clips 442 that are supported by the housing 438 such that they cannot rotate relative to the housing 438. The friction clips 442 frictionally engage the shaft 430 and frictionally damp the rotational motion of the tilting bracket 382 and the support bracket 330. Each friction clip 442 is in the shape of a sickle having a stem 444 that extends into a slot 446 in the friction clip housing 438 such that the friction clip 442 will not rotate relative to the friction clip housing 438. Each sickle-shaped friction clip 442 has a C-shaped spring portion 448 that partially surrounds the smooth portion 450 of the shaft 430 and exerts a radial force around a substantial portion of the circumference of the smooth portion 450 of the shaft 430 to generate friction between the friction clip 442 and the outer surface of the smooth portion 450 of the shaft 430. Because the entire weight of the TV monitor, the support brackets 330, 332 and the tilting brackets 382, 384 are supported by the rods 362, 364 of the tilting mechanisms 322, 324, and because the rods 362, 364 are isolated from the friction clips, the friction clips 442 in the friction clip housing 438 do not bear any of the weight due to the TV monitor, the support brackets 330, 332 and the tilting brackets 382, 384, and the friction clips 442 only act to provide frictional damping of the rotational or tilting motion of the assembly including the tilting bracket 382 and the support bracket 330, and consequently the TV monitor 202, about a horizontal axis essentially coincident with the longitudinal axis of the rods 362, 364. In other words, because the shaft 430 is not directly connected to the rod 362 of the tilting mechanism 322 the friction clips 442 are isolated from the weight of the TV monitor and the weight of the assemblies including the tilting brackets 382, 384 and the support brackets 330, 332, the weight of all of which is cooperatively borne by the rods 362, 364 of the tilting mechanisms 322, 324. The friction clip housing 438 is provided with a cap 452 that closes off the friction clip housing 438 and keeps the friction clips 442 in their proper position. In the illustrated example, the cap 452 of the friction clip housing 438 is secured in place by a pair of pins 454 whose heads are spread out by crimping to secure the cap 452 to the friction clip housing 438. Alternatively, screws or other suitable fasteners may also be used for securing the cap 452 to the housing 438.

The two flanges 370, 372 of the end portion 328 of the support beam 300 fit between the end flanges 394, 396 of the tilting bracket 384. The end flanges 394, 396 of the tilting bracket 384 are provided with holes 402, 404 that are in registry with one another. The rod 364 of the tilting mechanism 324 extends through the holes 402, 404 in the end flanges 394, 396 of the tilting bracket 384 and through the holes 378, 380 in the flanges 370, 372 of the support beam 300 to pivotally connect the tilting bracket 384 to the end portion 328 of the support beam 300. Thus, the axis of rotation of the tilting bracket 384 is coincident with the axis of rotation of the support bracket 332 that cooperatively with the support bracket 330 holds the TV monitor 202.

Four holes 456, 458, 460, 462 in the side wall 342 of the support bracket 332 that is adjacent to the end flange 396 of the tilting bracket 384 are provided that register with four corresponding threaded inserts 464 provided in four corresponding holes 455, 457, 459, 461 in the end flange 396 of the tilting bracket 384. Four screws 466 are positioned through each of the holes 456, 458, 460, 462 and engaged to the threaded inserts 464 in the end flange 396 of the tilting bracket 384 to attach the support bracket 332 to the tilting bracket 384 such that the support bracket 332 and the tilting bracket 384 pivotally move about the axis of rotation defined by the rod 364 together as a unit.

The tilting mechanism 324 also includes a torsion spring 468 that is positioned between the flanges 370, 372 of the end portion 328 of the support beam 300. The spacer bracket 470 axially fixes the position of the torsion spring 468 such that the torsion spring is properly positioned along the rod 364 to ensure proper operation. The spacer bracket 470 also provides additional support to the rod 364. The rod 364 of the tilting mechanism 324 passes trough the coils 472 of the torsion spring 468. The torsion spring 468 has a pair of arms 474, 476, one being provided at each end of the coiled portion 472 of the torsion spring 468. One of the arms 476 presses against the tilting bracket 384 and the other arm 474 presses against the back plate 316 of the support beam 300. The arms 474, 476 of the torsion spring 468 contact the tilting bracket 384 and the back plate 316 of the support beam 300, respectively, below the axis of rotation of the tilting bracket 384 and support bracket 332, i.e. below the longitudinal axis of the rod 364. The arms 474, 476 of the torsion spring 468 are biased to move apart from one another. This tends to bias the tilting bracket 384 and support bracket 332 to rotate or pivot in an upward direction when the display mounting apparatus 200 is mounted to the wall 204. Accordingly, the torsion spring 468 counterbalances the force of gravity on the TV monitor 202.

The tilting mechanism 324 also includes an adapter 478 that is attached by a pair of screws 480 to the end flange 394 of the tilting bracket 384 that is farthest from the support bracket 332. The adapter 478 rotates with the tilting bracket 384 as a unit. The adapter 478 has a fluted hole 482 that is positioned coaxially with the rod 364 of the tilting mechanism 324 and thus with the axis of rotation of the tilting bracket 384. The tilting mechanism 324 also includes a shaft 484 that has a fluted end portion 486 that is matingly engageable with the fluted hole 482 in the adapter 478. The fluted end portion 486 of the shaft 484 is inserted into the fluted hole 482 in the adapter 478 such that the shaft 484 and the adapter 478 rotate as a unit about an axis of rotation that is essentially coincident with the axis of rotation of the tilting bracket 384 and the support bracket 332. The shaft 484 extends into a friction clip housing 488 that is attached to the support beam 300 by screws 490 such that it is supported near the end portion 328 of the support beam 300. The friction clip housing 488 houses a plurality, in this example six, friction clips 492 that are supported by the housing 488 such that they cannot rotate relative to the housing 488. The friction clips 492 frictionally engage the shaft 484 and frictionally damp the rotational motion of the tilting bracket 384 and the support bracket 332. Each friction clip 492 is in the shape of a sickle having a stem 494 that extends into a slot 496 in the friction clip housing 488 such that the friction clip 492 will not rotate relative to the friction clip housing 488. Each sickle-shaped friction clip 492 has a C-shaped spring portion 498 that partially surrounds the smooth portion 500 of the shaft 484 and exerts a radial force around a substantial portion of the circumference of the smooth portion 500 of the shaft 484 to generate friction between the friction clip 492 and the outer surface of the smooth portion 500 of the shaft 484. Because the entire weight of the TV monitor, the support brackets 330, 332 and the tilting brackets 382, 384 are supported by the rods 362, 364 of the tilting mechanisms 322, 324, and because the rods 362, 364 are isolated from the friction clips, the friction clips 492 in the friction clip housing 488 do not bear any of the weight due to the TV monitor, the support brackets 330, 332 and the tilting brackets 382, 384, and the friction clips 492 only act to provide frictional damping of the rotational or tilting motion of the assembly including the tilting bracket 384 and the support bracket 332, and consequently the TV monitor 202, about a horizontal axis essentially coincident with the longitudinal axis of the rods 362, 364. In other words, because the shaft 484 is not directly connected to the rod 364 of the tilting mechanism 324 the friction clips 492 are isolated from the weight of the TV monitor and the weight of the assemblies including the tilting brackets 382, 384 and the support brackets 330, 332, the weight of all of which is cooperatively borne by the rods 362, 364 of the tilting mechanisms 322, 324. The friction clip housing 488 is provided with a cap 502 that closes off the friction clip housing 488 and keeps the friction clips 492 in their proper position. In the illustrated example, the cap 502 of the friction clip housing 488 is secured in place by a pair of pins 504 whose heads are spread out by crimping to secure the cap 502 to the friction clip housing 488. Alternatively, screws or other suitable fasteners may also be used for securing the cap 502 to the housing 488.

It should be readily apparent from the description above that the support bracket 330, the tilting bracket 382, the adapter 428, and the shaft 430 tilt or pivotally move as a unit about the same axis that is essentially coincident with the longitudinal axis of the rod 362. Similarly, the support bracket 332, the tilting bracket 384, the adapter 478, and the shaft 484 tilt or pivotally move as a unit about the same axis that is essentially coincident with the longitudinal axis of the rod 364. Also, the longitudinal axes of the rod 362, the shaft 430, the rod 364, and the shaft 484 are all aligned along essentially the same axis that defines the tilt axis of the display 202.

Four cylindrical sleeves 506 are placed around the rod 362 and essentially cover the rod 362 within the end portion 326 of support beam 300 from the spacer bracket 418 to the flange 368. Similarly, four cylindrical sleeves 508 are placed around the rod 364 and essentially cover the rod 364 within the end portion 328 of support beam 300 from the spacer bracket 470 to the flange 370. The sleeves 506, 508 fill up the space between the rods 362, 364 and the coils 422, 472 of the torsion springs 420, 468 so that the springs 420, 468 are kept stationary relative to the rods 362, 364 and consequently relative to the support beam 300. The sleeves 506, 508 are preferably made of a plastic or other polymeric material.

Figure 15:
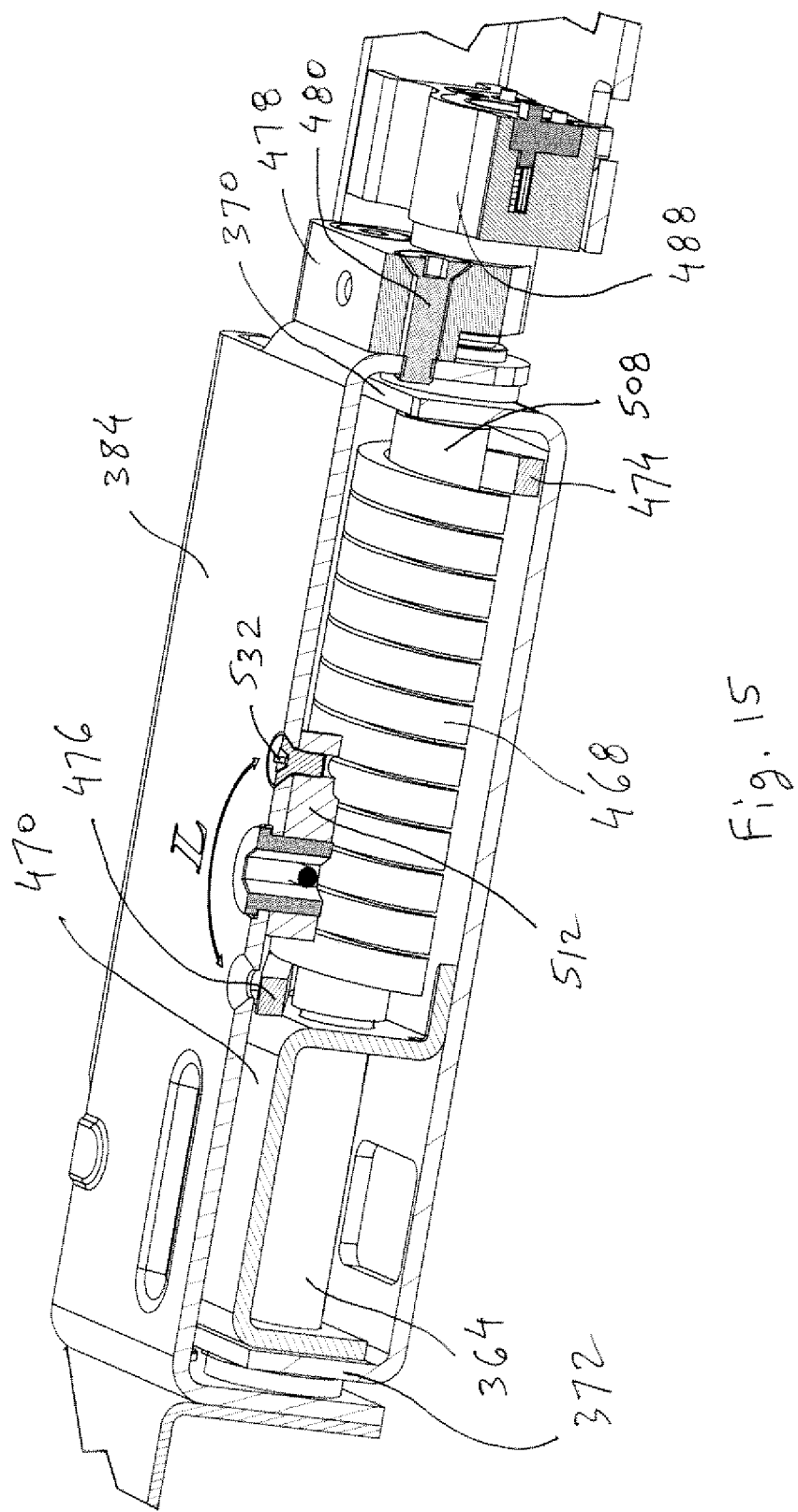
FIG. 15 is a partial cross sectional view of the left counterbalancing hinge of the display mounting apparatus according to the present invention showing the preload adjustment cam in the position corresponding to the lower torsion spring preload.
Figure 16:
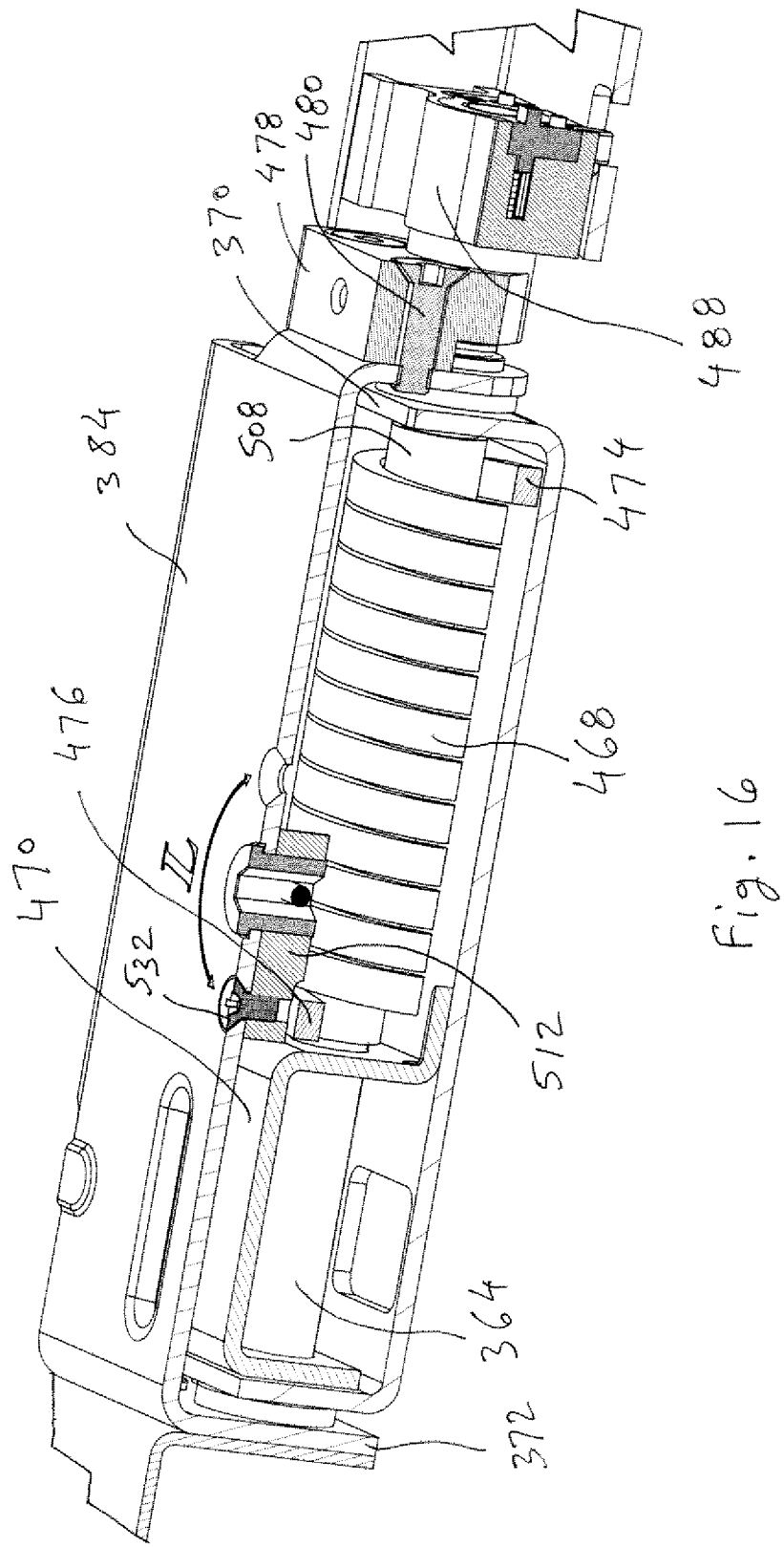
FIG. 16 is a partial cross sectional view of the left counterbalancing hinge of the display mounting apparatus according to the present invention showing the preload adjustment cam in the position corresponding to the higher torsion spring preload.
Figure 17:
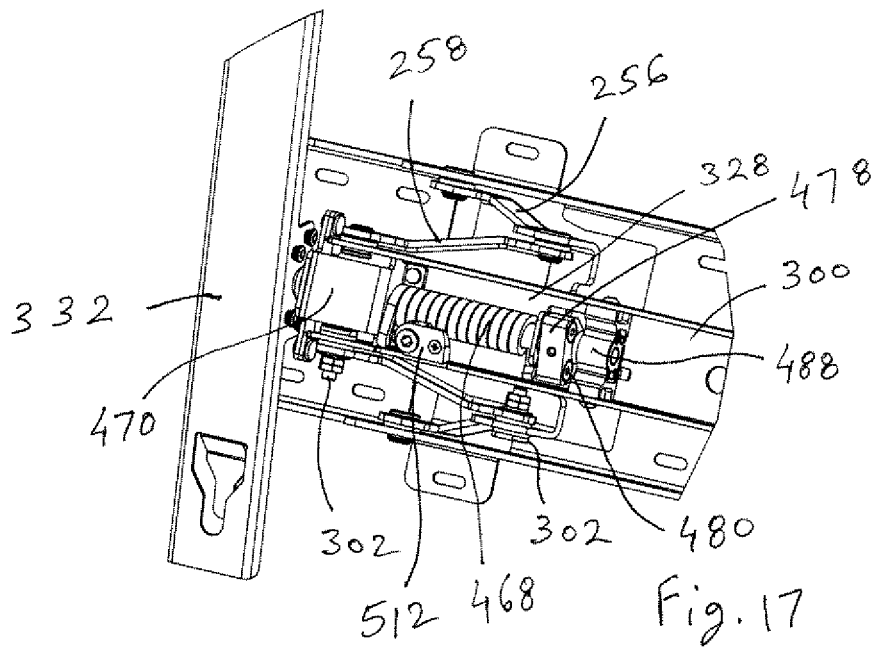
FIG. 17 is a fragmentary view of the left counterbalancing hinge of the display mounting apparatus according to the present invention showing the preload adjustment cam in the position corresponding to the lower torsion spring preload.
Figure 18:
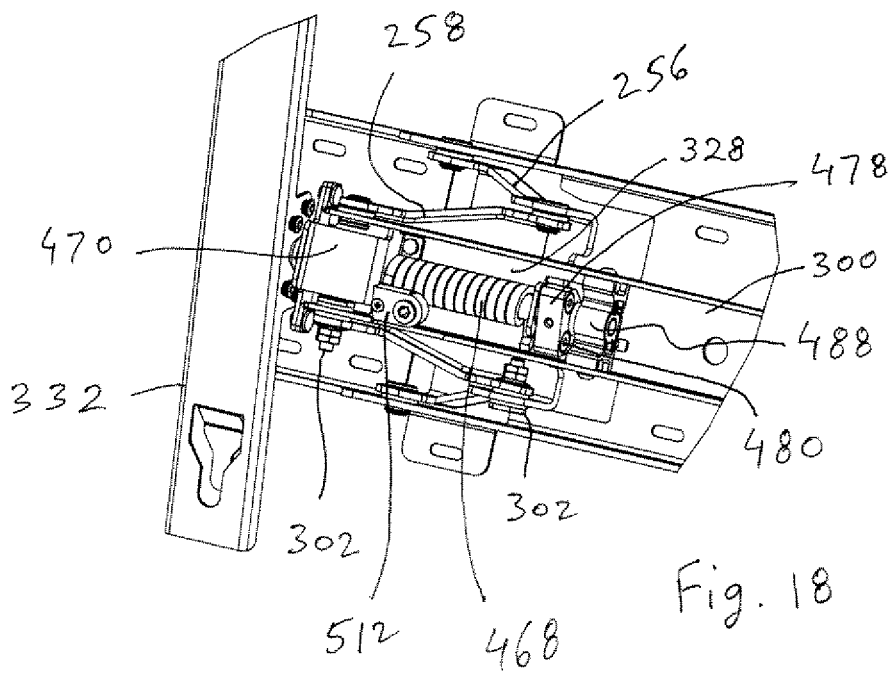
FIG. 18 is a fragmentary view of the left counterbalancing hinge of the display mounting apparatus according to the present invention showing the preload adjustment cam in the position corresponding to the higher torsion spring preload.
Figure 19:
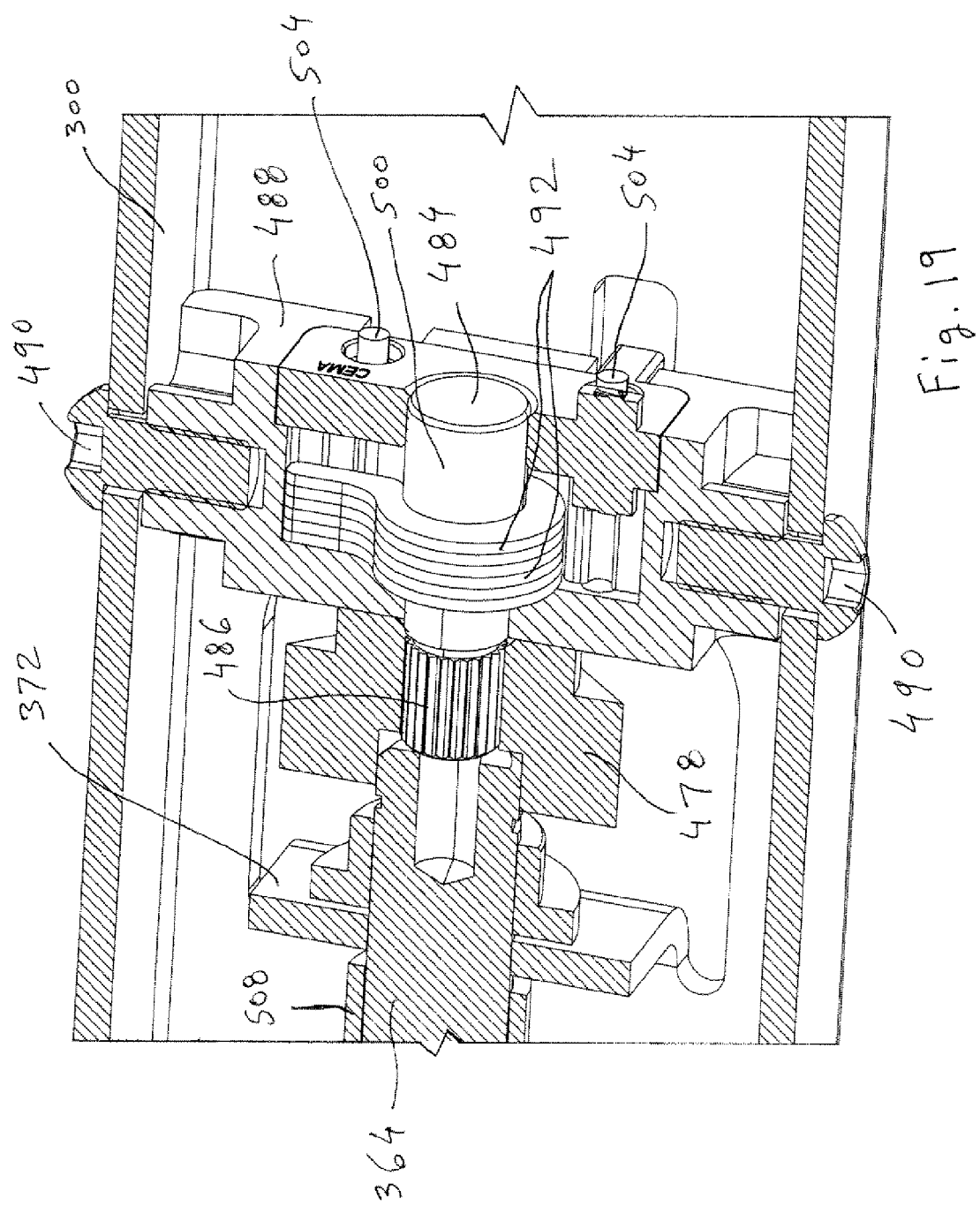
FIG. 19 is a partial cross sectional view of the frictional damping mechanism of the left counterbalancing hinge of the display mounting apparatus according to the present invention.
Figure 20:
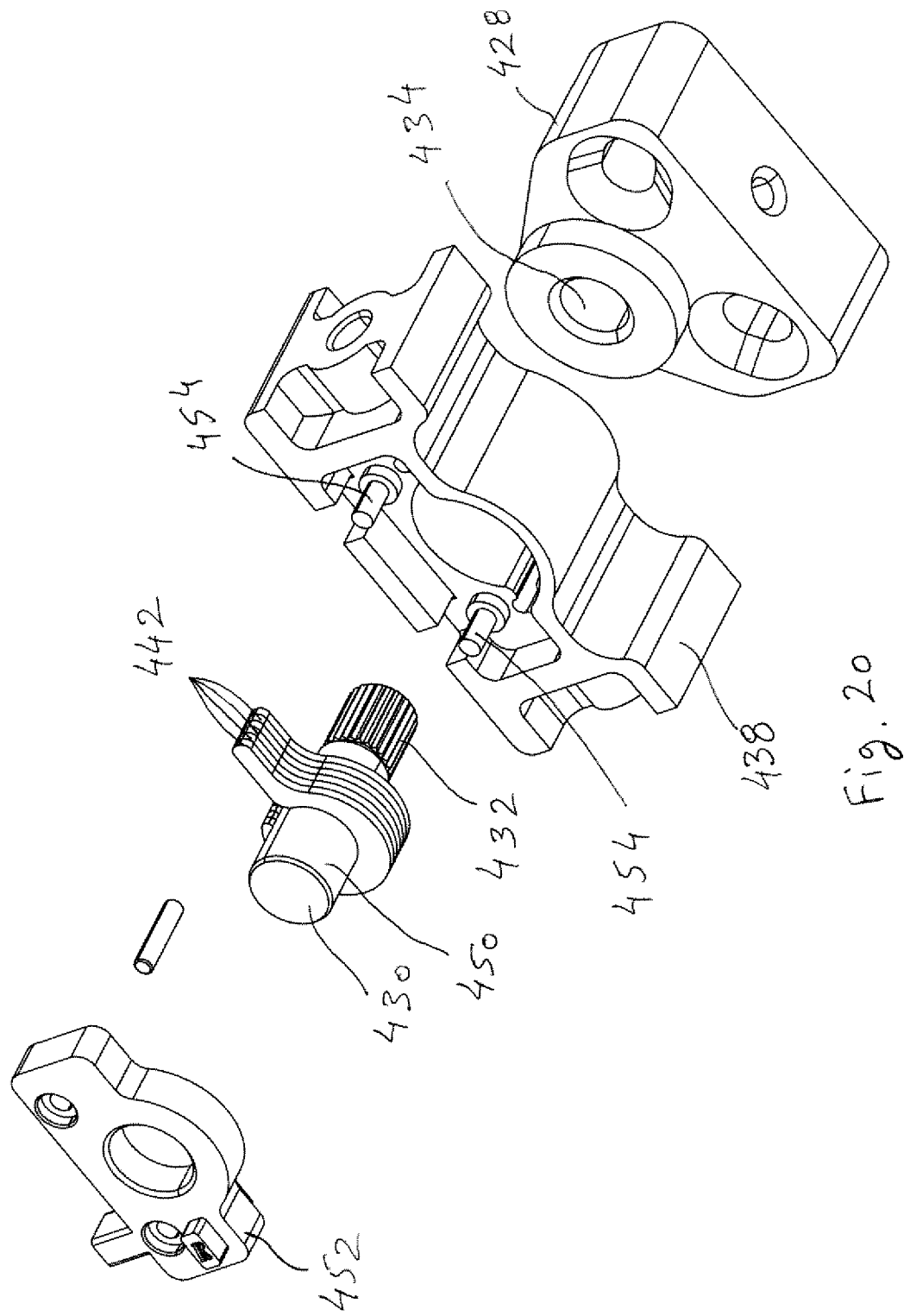
FIG. 20 is an exploded view of the frictional damping mechanism of the right counterbalancing hinge of the display mounting apparatus according to the present invention.
Figure 21:
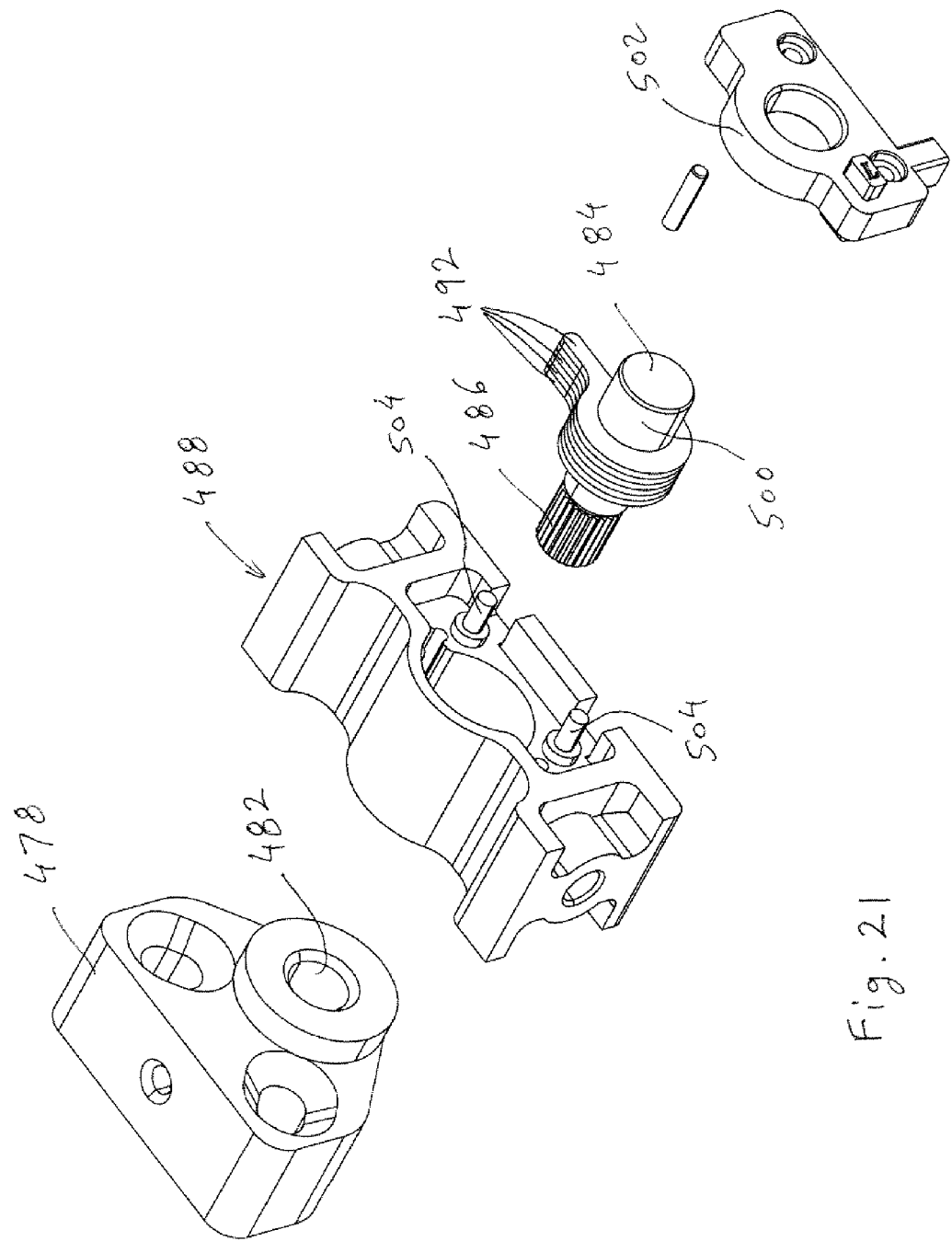
FIG. 21 is an exploded view of the frictional damping mechanism of the left counterbalancing hinge of the display mounting apparatus according to the present invention.
Figure 29:
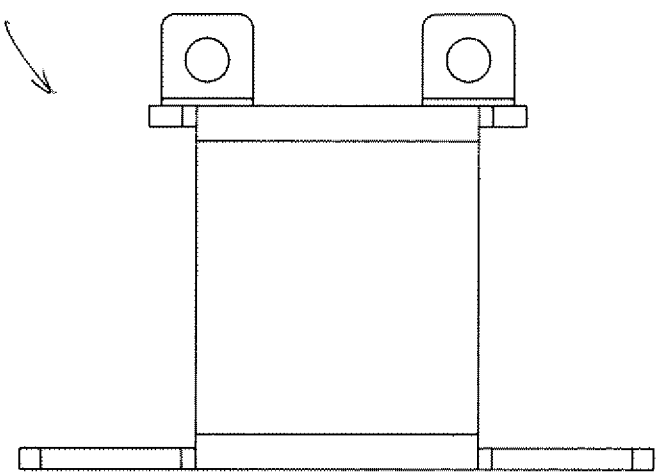
FIG. 29 is a front view of a spacer bracket of the display mounting apparatus according to the present invention.
Figure 32:
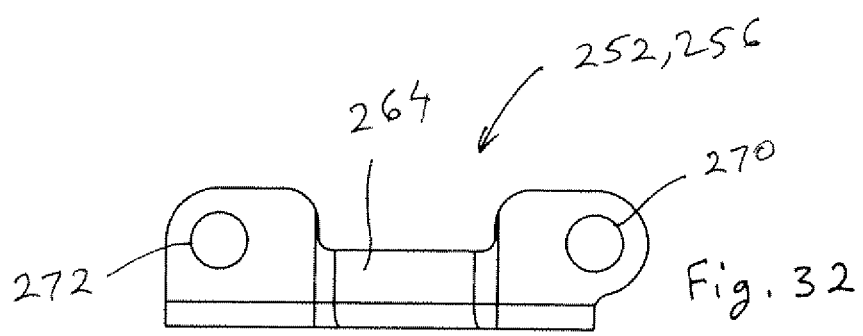
Figure 33:
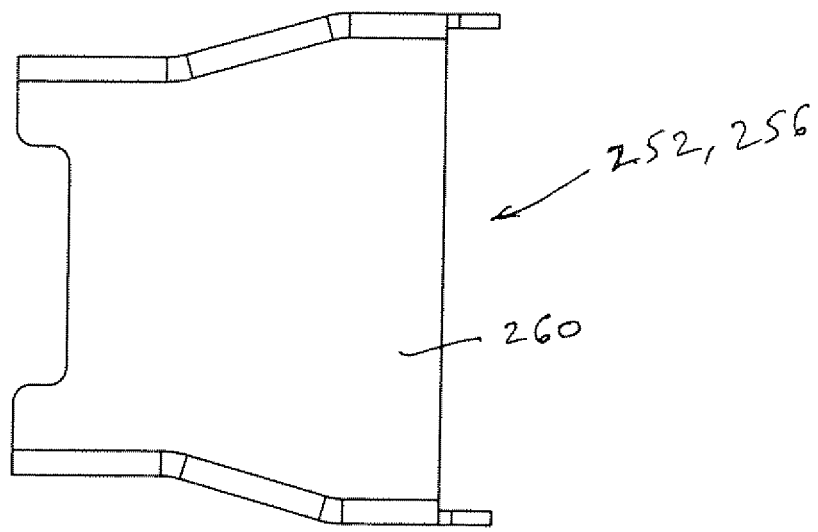
Figure 34:
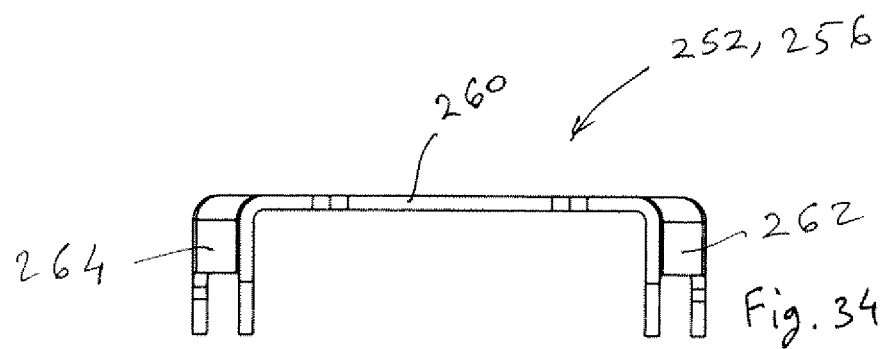
Figure 35:
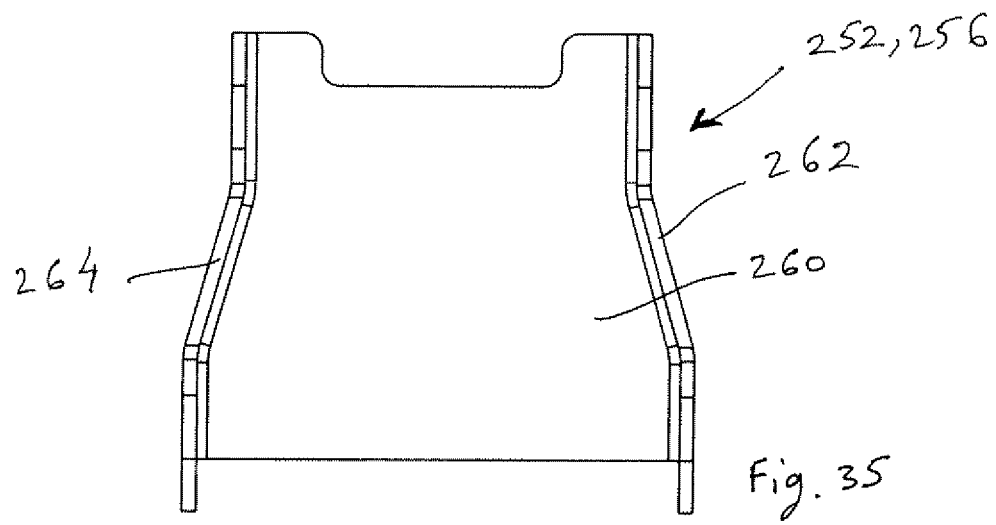
Figure 36:
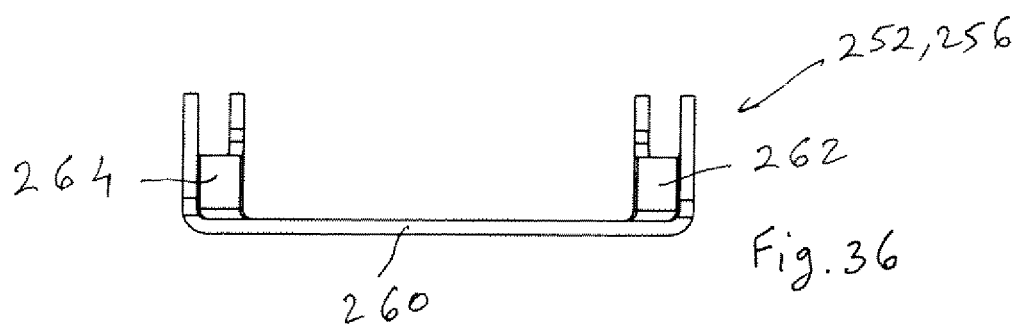
Figure 39:
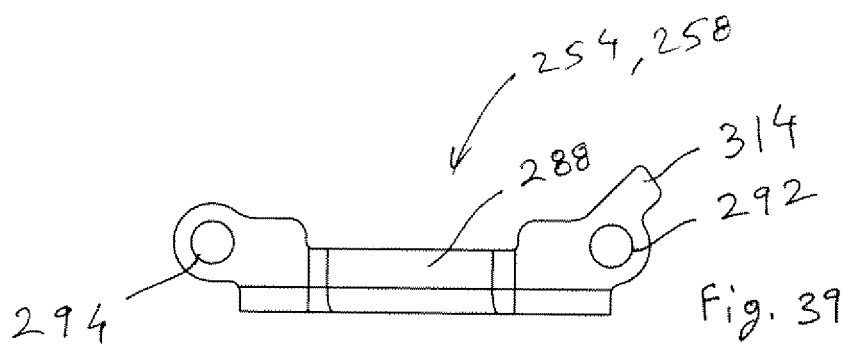
Figure 40:
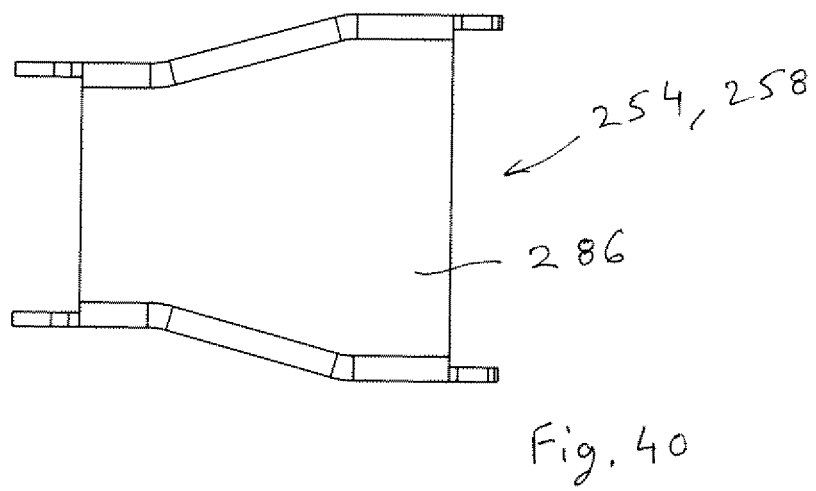
Figure 41:
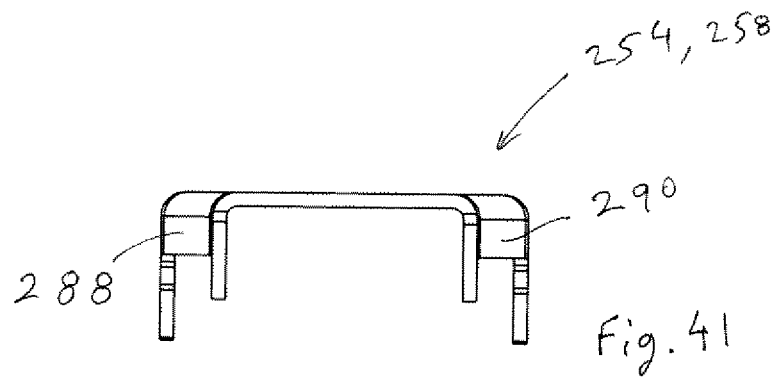
Figure 42:
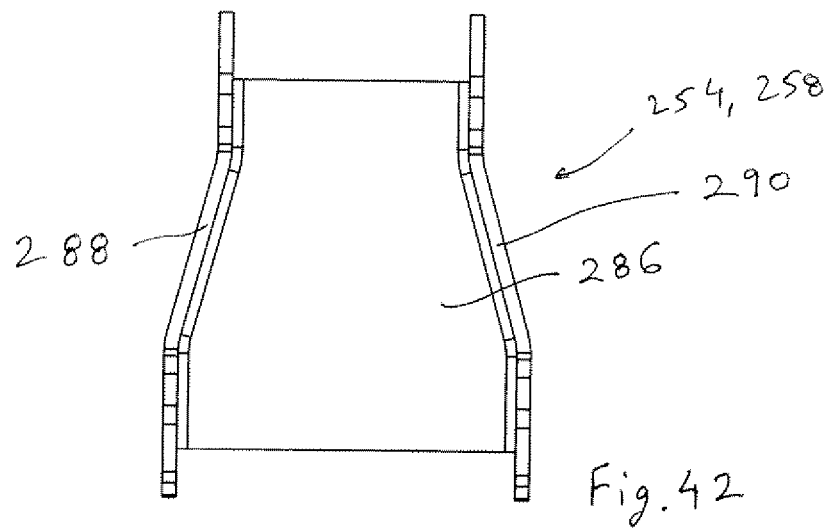
Figure 43:
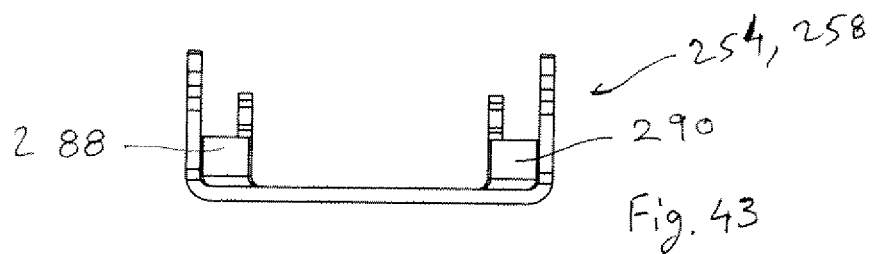
Figure 64:
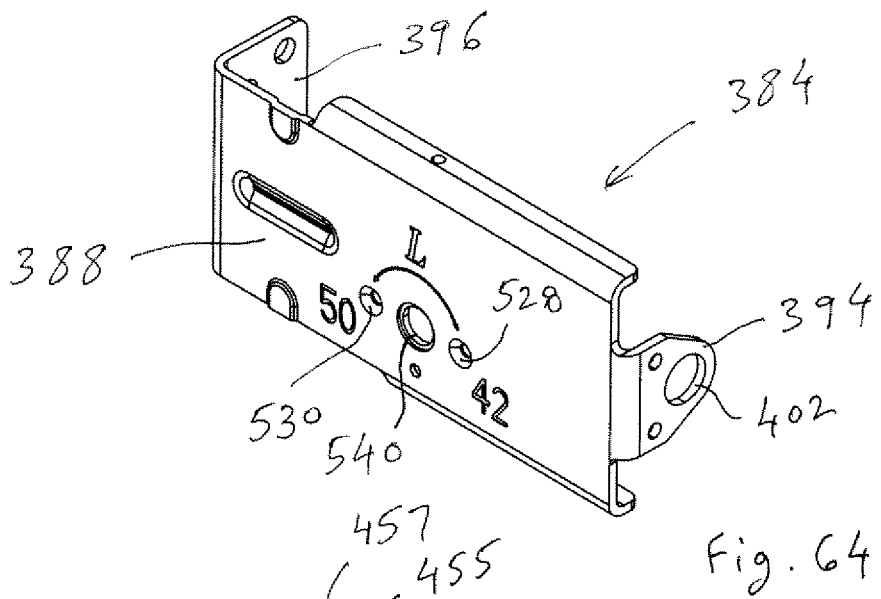
Figure 65:
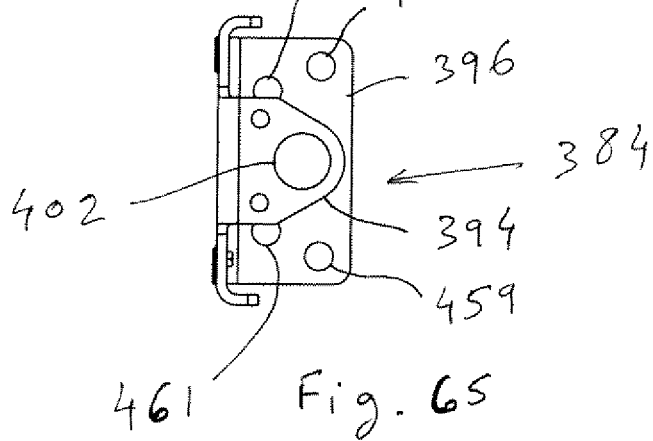
Figure 71:
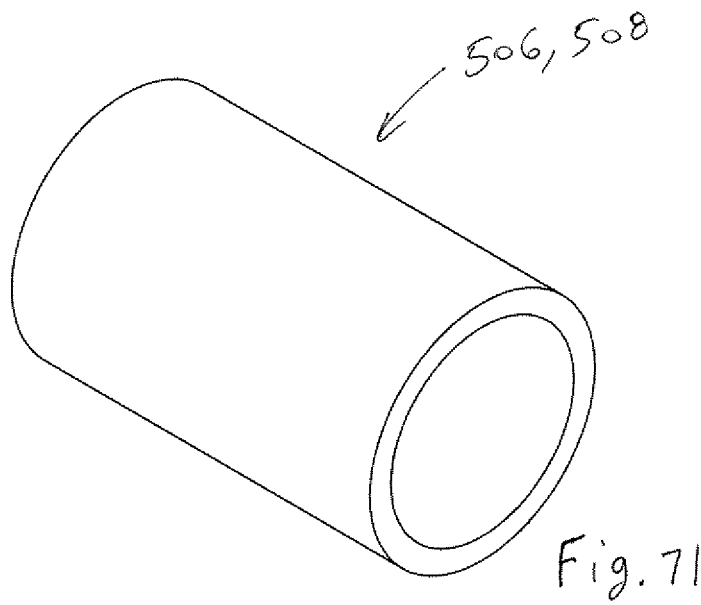
FIGS. 71-72 are views of the sleeve of the counterbalancing hinge rod of the display mounting apparatus according to the present invention.
Figure 72:
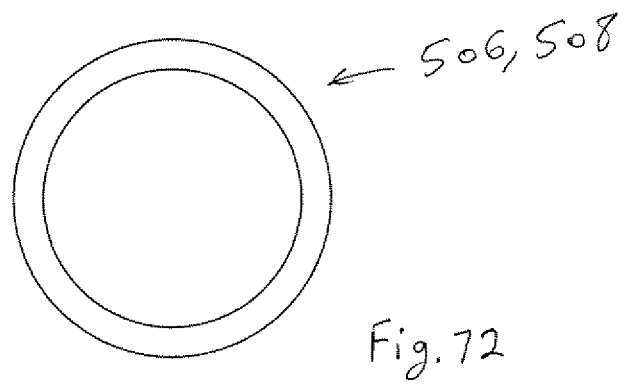
Figure 73:
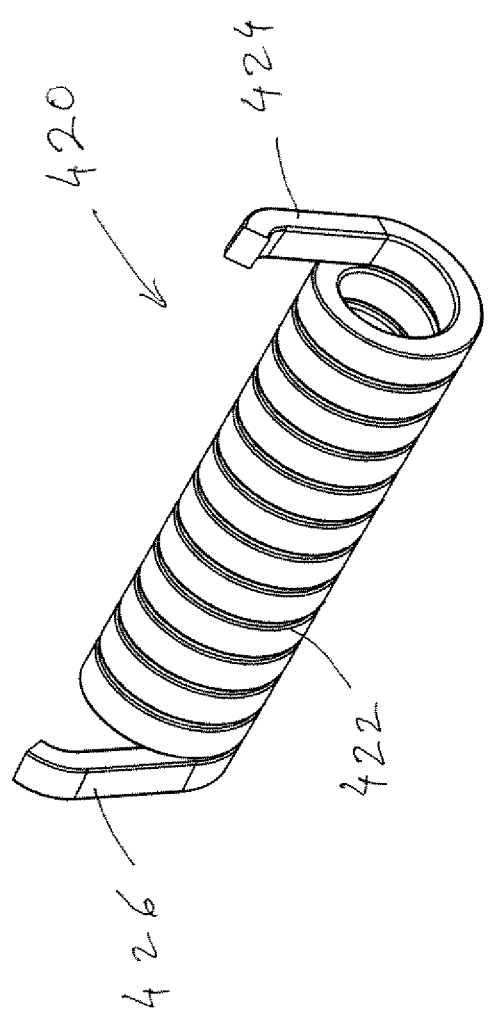
FIGS. 73-76 are views of the right torsion spring of the counterbalancing hinge of the display mounting apparatus according to the present invention.
Figure 74:
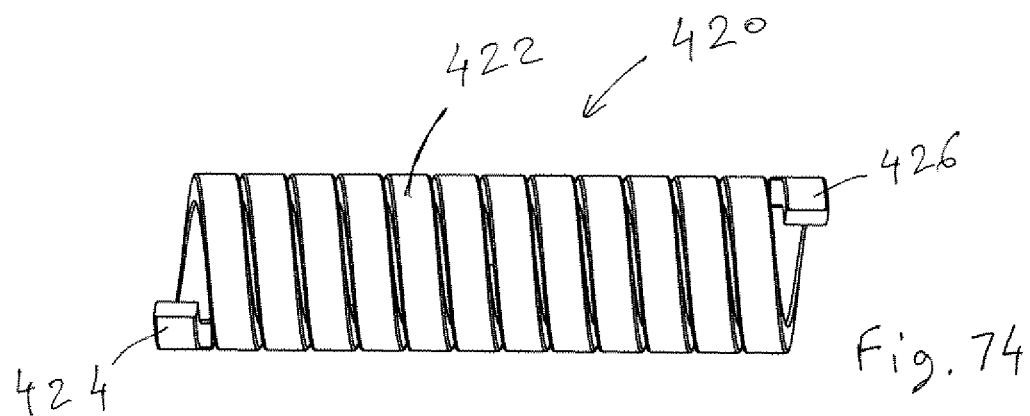
Figure 75:
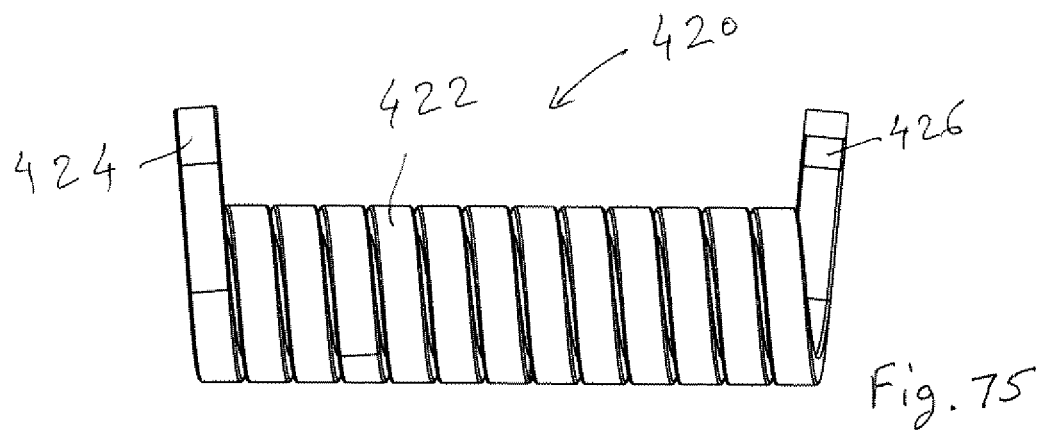
Figure 76:
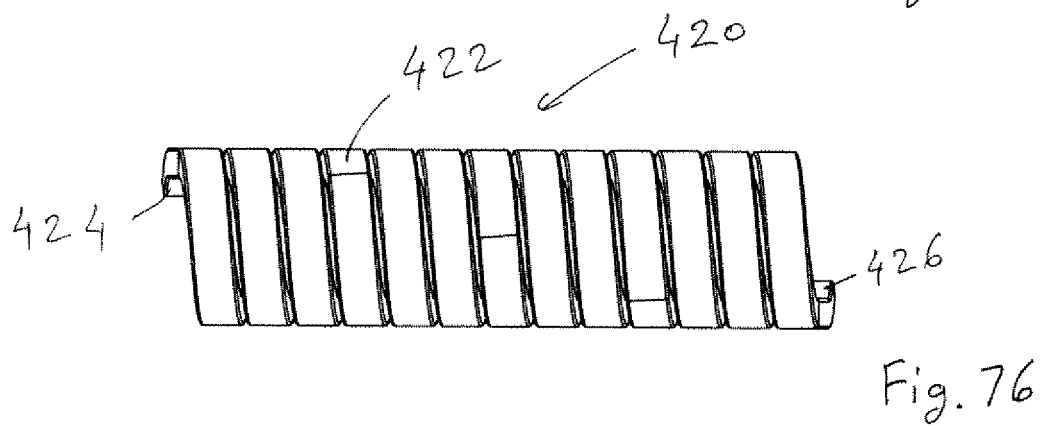
Figure 77:
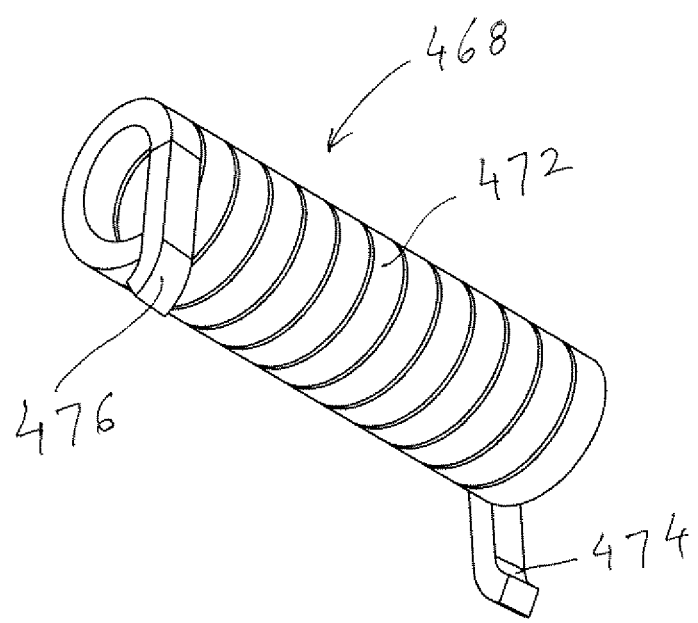
FIGS. 77-80 are views of the left torsion spring of the counterbalancing hinge of the display mounting apparatus according to the present invention.
Figure 78:
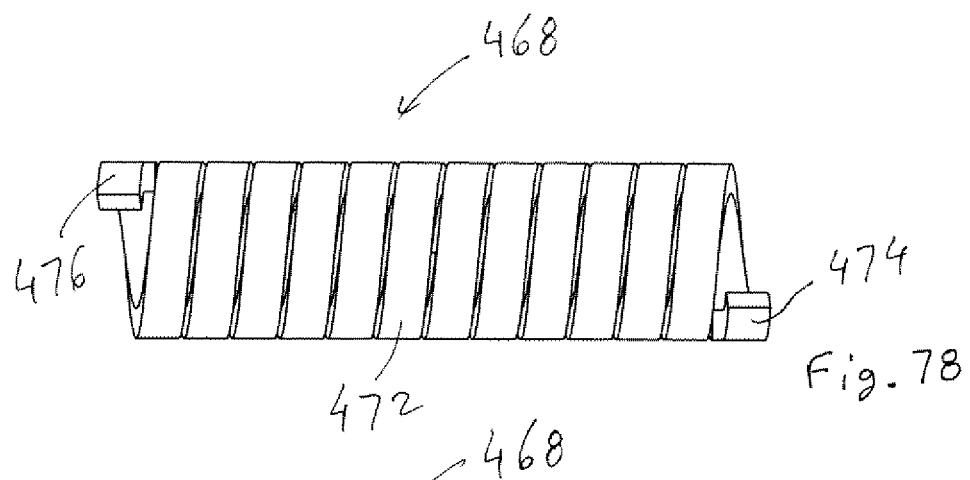
Figure 79:
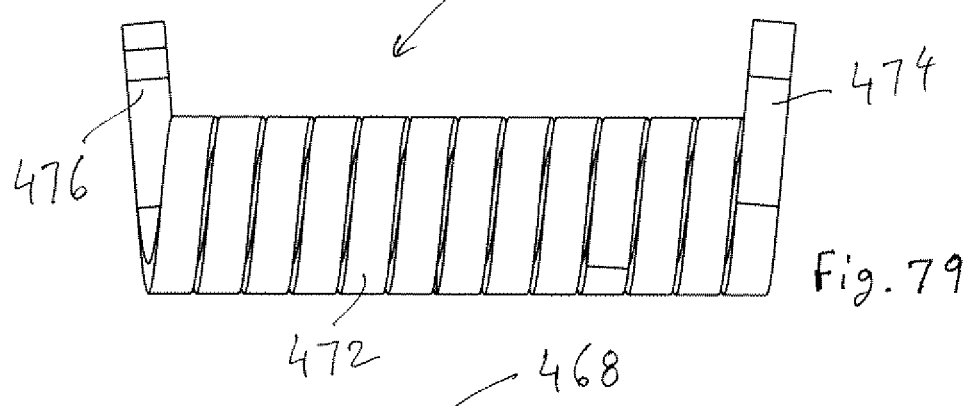
Figure 80:
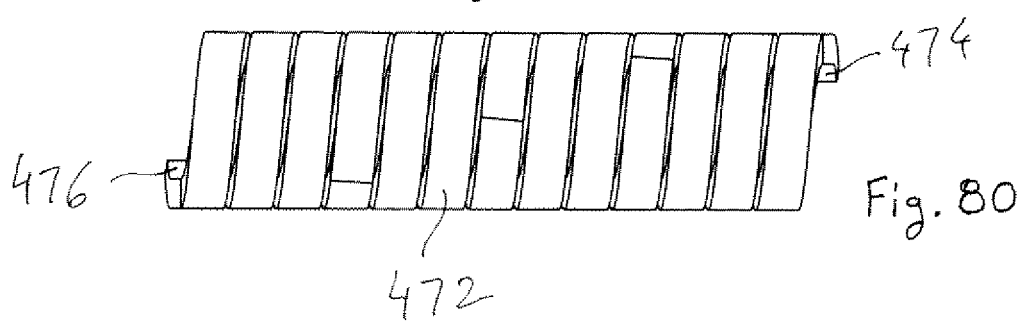
Figure 81:
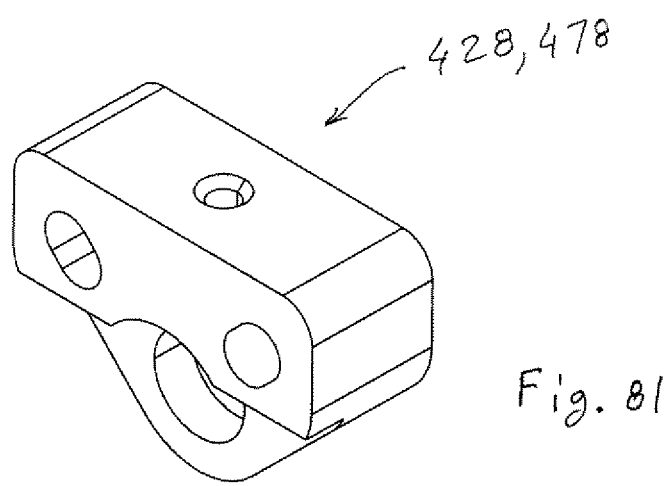
FIGS. 81-84 are views of the adapter of the counterbalancing hinge of the display mounting apparatus according to the present invention.
Figure 82:
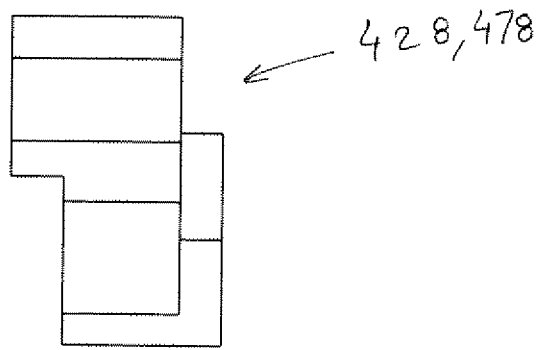
Figure 83:
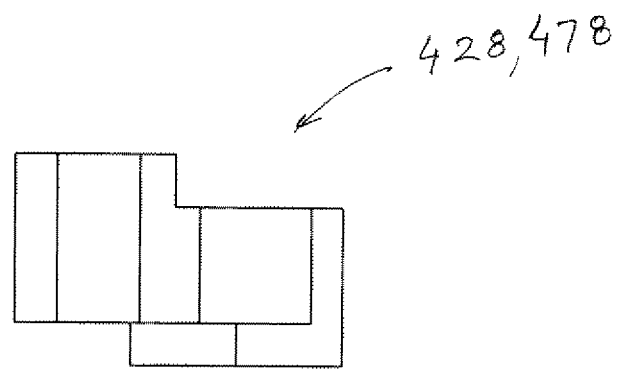
Figure 84:
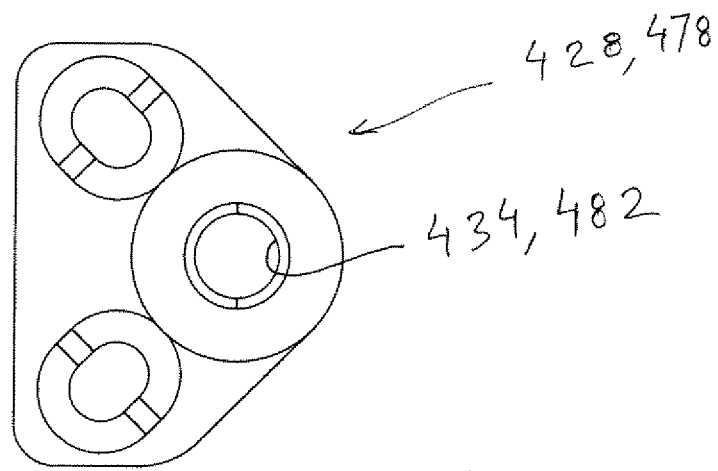
Figure 89:
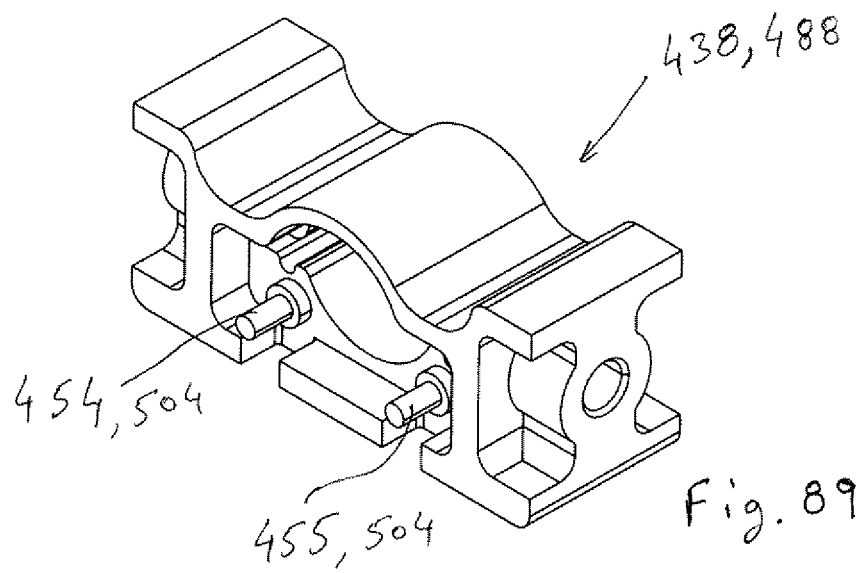
FIGS. 89-93 are views of the friction clip housing of the frictional damping mechanism of the counterbalancing hinge of the display mounting apparatus according to the present invention.
Figure 90:
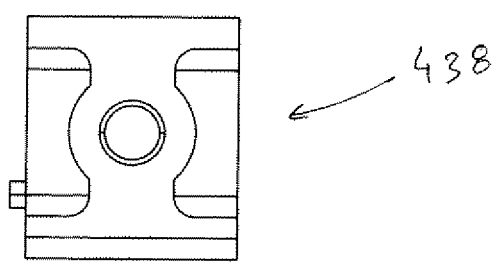
Figure 91:
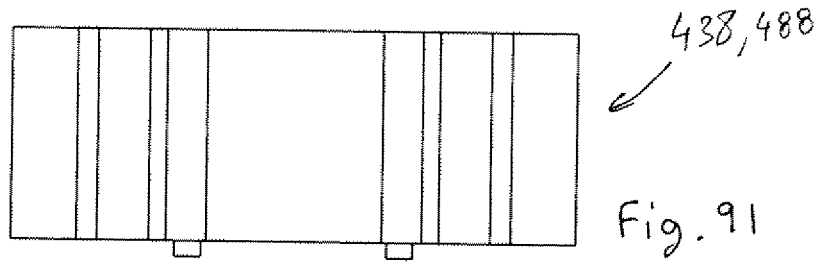
Figure 92:
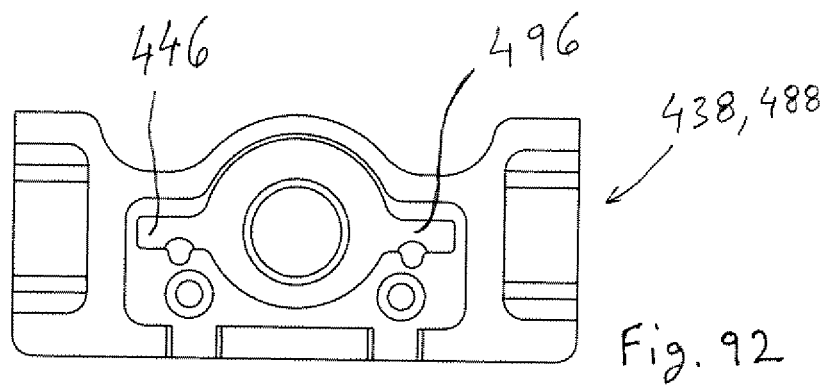
Figure 93:
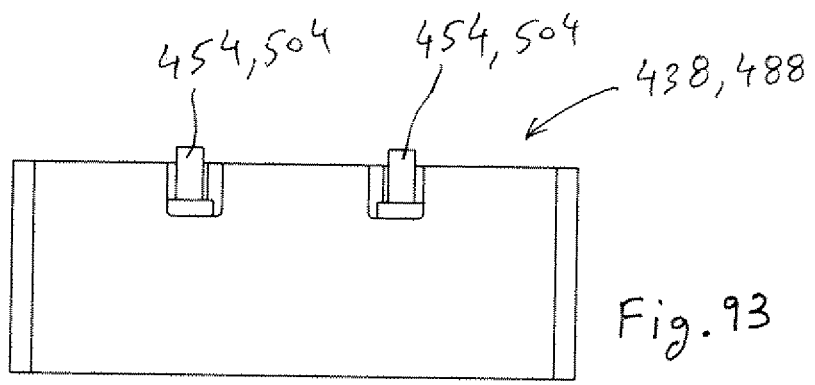
Figure 94:
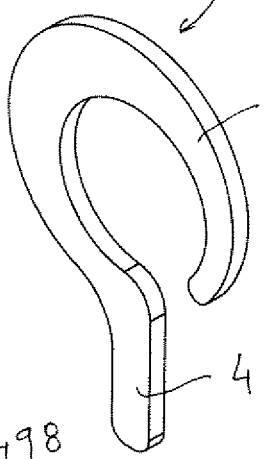
FIGS. 94-95 are views of a friction clip of the frictional damping mechanism of the counterbalancing hinge of the display mounting apparatus according to the present invention.
Figure 95:
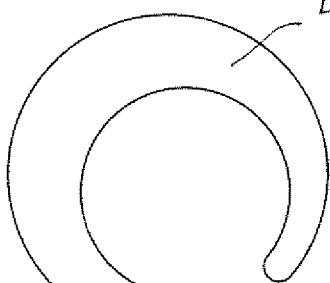
Figure 98:
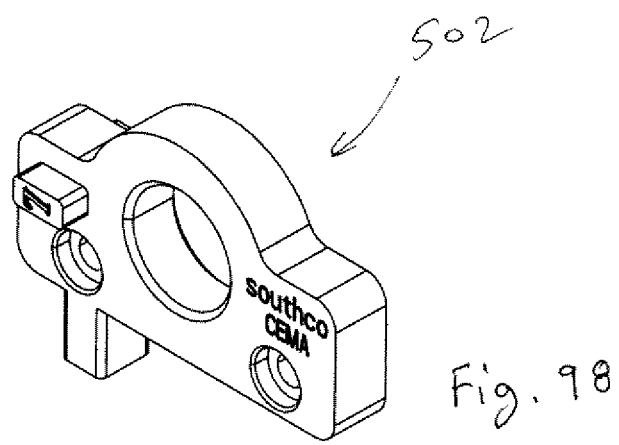
FIGS. 98-99 are views of the left lid of the friction clip housing of the frictional damping mechanism of the counterbalancing hinge of the display mounting apparatus according to the present invention.
Figure 99:
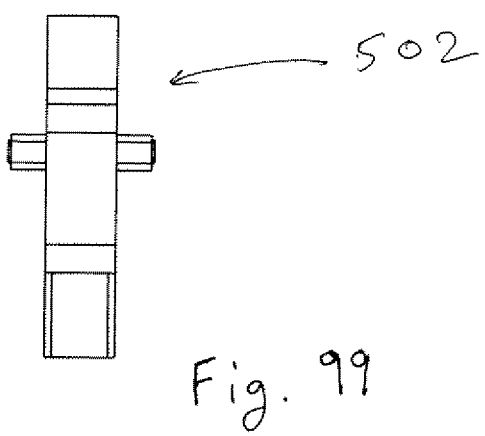
Figure 100:
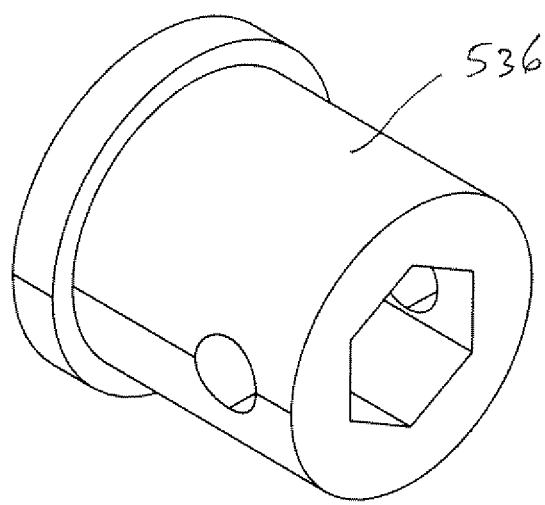
FIGS. 100-104 are views of the pivot pin of the cam for adjusting the torsion spring preload of the counterbalancing hinge of the display mounting apparatus according to the present invention.
Figure 101:
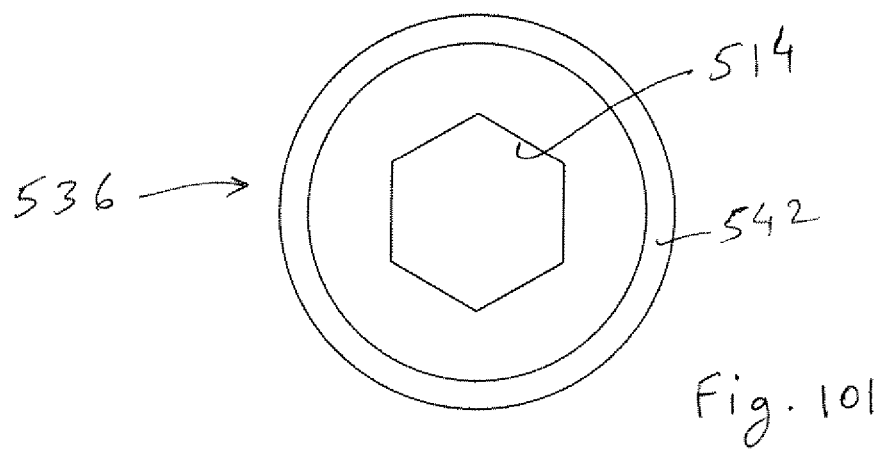
Figure 103:
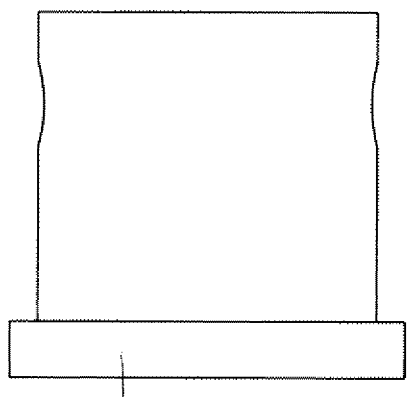
Figure 104:
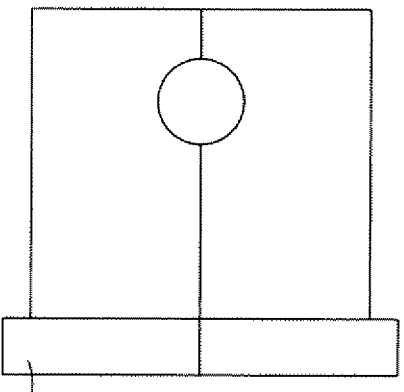
Figure 102:
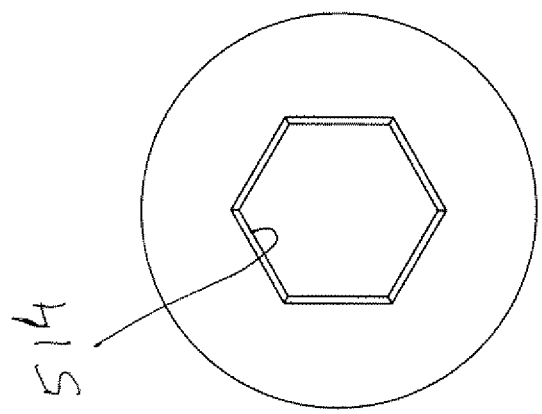
Figure 109:
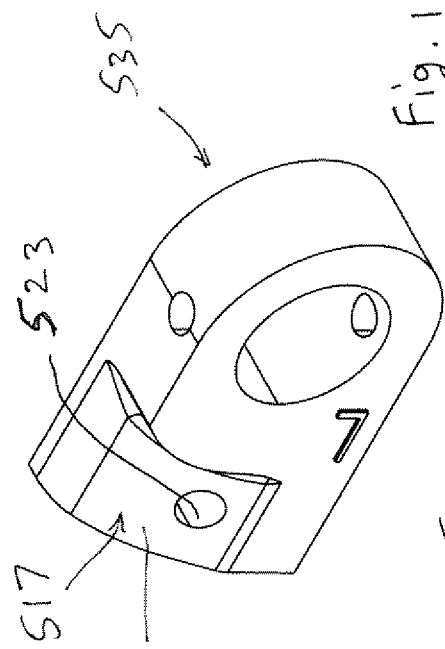
FIGS. 109-112 are views of the left cam for adjusting the torsion spring preload of the counterbalancing hinge of the display mounting apparatus according to the present invention.
Figure 110:
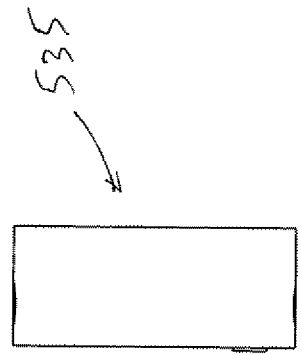
Figure 112:
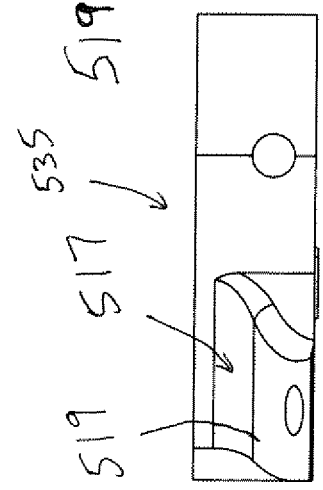
Figure 111:
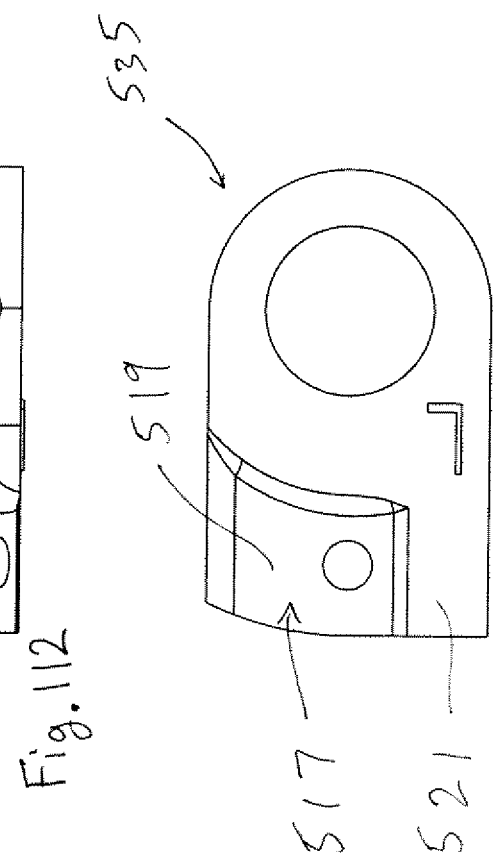
Figure 113:
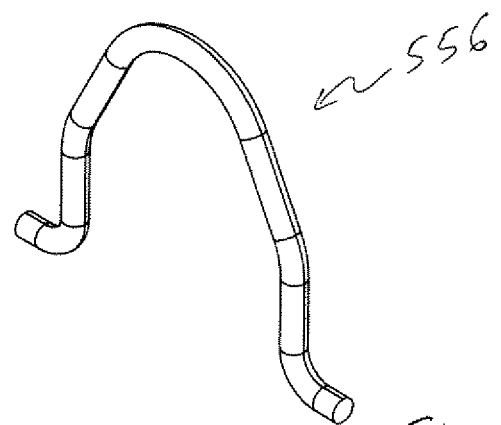
Figure 114:
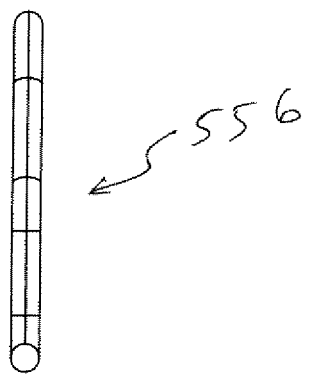
Figure 127:
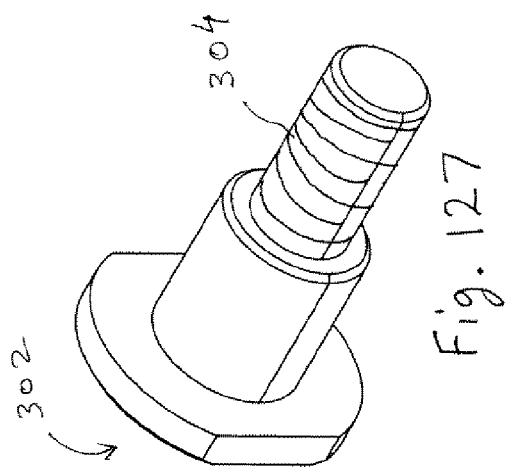
FIGS. 126-130 are views of the threaded pivot bolt of the joints of the two-link arms of the display mounting apparatus according to the present invention for use in those joints where frictional damping is desired.
Figure 130:
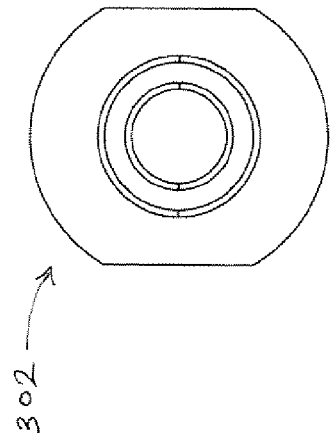
Figure 126:
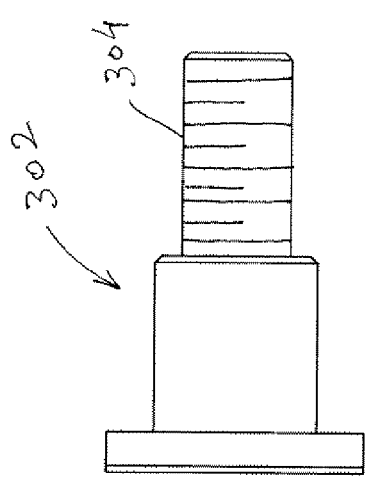
Figure 129:
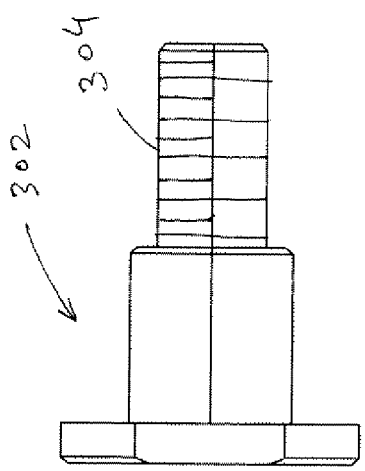
Figure 128:
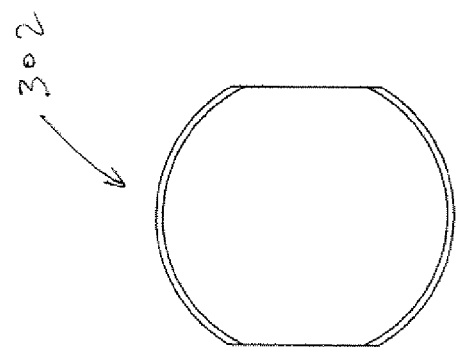
Figure 131:
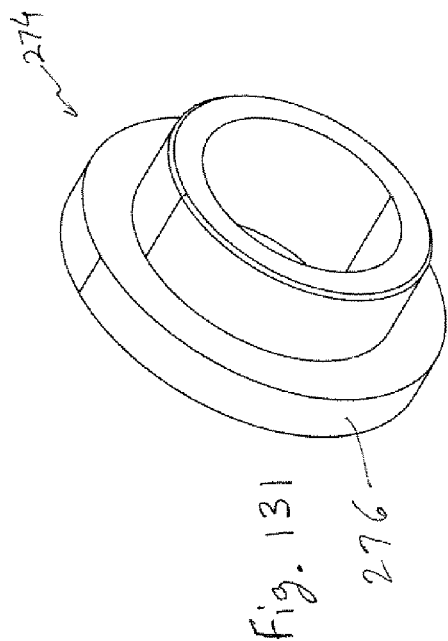
FIGS. 131-134 are views of the bushing used to prevent axial play at the pivot joints in the two-link arms of the display mounting apparatus according to the present invention.

The first and second support brackets 330, 332 move independently of one another until a TV monitor 202 is mounted to the support bracket 330, 332. The first and second tilting mechanisms 322, 324 also operate independently of one another. However, once a TV monitor 202 is supported by the first and second support brackets 330, 332, as the TV monitor 202 is tilted up and down about the horizontal axis then the support brackets 330, 332 and the two tilting brackets 382, 384 all move together in unison. The friction clips 442, 492 only act to damp the pivotal motion of the support brackets 330, 332 and the tilting brackets 382, 384. In the event that there is some slight discrepancy between the torque due to the force of gravity on the TV monitor 202 and the torque generated by the torsion springs 420, 468 the friction clips 442, 492 prevent the support brackets 330, 332 and hence the TV monitor 202 from moving spontaneously. Furthermore, the friction due to the friction clips 442, 492 prevents over rotation and banging of the TV monitor 202 into the wall 204 after a user has initiated the tilting or swiveling motion of the TV monitor 202 by pushing on one side of the TV monitor. Another feature of the tilting mechanisms 322, 324 is that the torque of the tilting mechanisms 322, 324 can be adjusted to match the weight, for example, of either a 50 inch flat panel TV monitor or a 42 inch flat panel TV monitor. The adjustment is provided by a rotary cam 510, 512 that is pivotally supported by the back plate 386, 388 of the tilting bracket 382, 384. The rotary cam 510, 512 can be rotated by inserted by inserting an Allen-type wrench into a hexagonal hole 514 in the rotary cam. The rotary cam 510, 512 has a helical ramp-type surface 516, 517 that moves under the arm 424, 476 of the torsion spring 420, 468 that operates against the back plate 386, 388 of the tilting bracket 382, 384. When the cam 510, 512 is rotated to bring the cam surface 516, 517 under the arm 424, 476 of the torsion spring 420, 468, the arms 424, 426 or 474, 476 of the torsion spring 420, 468, respectively, are pushed closer together thereby increasing the torque exerted against the respective tilting bracket 382, 384 by the torsion spring 420, 468. The cam surface 516, 517 has a ramp 518, 519 that leads to a somewhat flattened surface 520, 521 that can keep the arm 424, 476 of the torsion spring 420, 468 at a distance from the back plate 386, 388 of the tilting bracket 382, 384. To re-adjust the torque due to the torsion spring 420, 468 to a lower level the cam 510, 512 can be rotated back to its original position so that that torsion spring arm 424, 476 will contact and act against the back plate 386, 388 of the tilting bracket 382, 384 directly. Once the arm 424, 476 of the torsion spring 420, 468 is in contact with the back plate 386, 388 of the tilting bracket 382, 384, the two arms 424, 426 or 474, 476 of the torsion spring 420, 468 will be spaced farther apart thus decreasing the force and corresponding torque exerted by the torsion spring 420, 468 on the tilting bracket 382, 384. Accordingly, the cam 510, 512 is rotatable between the first position shown in FIGS. 15 and 17, corresponding to the setting for a lighter display 202, and the second position shown in FIGS. 16 and 18, corresponding to the setting for a heavier display 202. The figures only show cam 512, the arrangement for cam 510 being a mirror image of that for the cam 512. In the first position the cam 510, 512 does not contact the arm 424, 476 of the torsion spring 420, 468 and the torsion spring 420, 468 exerts a lower torque on the tilting bracket 382, 384. In the second position the cam 510, 512 provides the maximum lift to the arm 424, 476 of the torsion spring 420, 468 away from the back plate 386, 388 of the tilting bracket 382, 384, and accordingly the torsion spring 420, 468 exerts a higher torque on the tilting bracket 382, 384 and the arm 424, 476 of the torsion spring 420, 468 is in contact with the slightly flattened surface 520, 521 of the cam 510, 512. The cam 510, 512 has a threaded hole 522, 523 at a location spaced apart from the hole 514 for the engagement of the Allen-type wrench. A pair of holes, 524, 526 or 528, 530, is provided in the back plate 386, 388 of the tilting bracket 382, 384 corresponding to the first and second positions. When the cam 510, 512 is in the first position the threaded hole 522, 523 in the cam 510, 512 registers with the first hole 526, 528. When the cam 510, 512 is in the second position the threaded hole 522, 523 in the cam 510, 512 registers with the second hole 524, 530 in the tilting bracket 382, 384. A screw 532, one provided for each cam 510, 512, can be positioned through one of the holes, 526, 528 or 524, 530, in the back plate 386, 388 of the tilting bracket 382, 384 and engaged to the threaded hole 522, 523 in the cam 510, 512 to fix the position of the cam 510, 512 in either the first position or the second position once the torque of the tilting mechanism 322, 324 has been adjusted to the desired value.

Each of the cams 510, 512 is fabricated in two pieces, a cam portion 534, 535 and a pivot pin 536. The hexagonal hole 514 is provided in the pivot pin 536. The cam portion 534, 535 provides the ramp 516, 517 and carries the threaded hole 522, 523. Each back plate 386, 388 of the tilting brackets 382, 384 is provided with a hole 538, 540, respectively, for the attachment of the cam 510, 512. The pivot pin 536 is placed through the hole 538, 540 and then the cam portion 534, 535 is attached to the pivot pin 536 by a pin to pivotally attach the cam 510, 512 to the respective tilting bracket 382, 384. The pivot pin 536 has an annular flange 542 that prevents the pivot pin 536 from passing completely through the hole 538 or 540. The cam portion 534 of the cam 510 is a mirror image of the cam portion 535 of the cam 512.

By extending the ramp 516, 517 along a longer circular arc about the pivot axis of the cams 510, 512 and providing a number of threaded holes 522, 523 distributed along an arc about the pivot axis of the cams, the degree of counterbalancing provided by the tilt mechanisms 322 and 324 can be more closely matched to a greater variety of monitor weights.

The rods 362, 364 of the tilting mechanisms 322, 324 are located along the support bracket 330, 332 such that the center of gravity of the TV monitor 202 will always be above and forward of the axis of rotation of the support brackets 330, 332. Also, because the center of gravity of the display 202 is always positioned forward of the axis of rotation of the support brackets 330, 332 relative to the wall, the torque due to the force exerted by gravity on the center of gravity of the TV monitor 202 is at all times acting against the torque exerted on the support brackets 330, 332 by the torsion springs 420, 468. The torsion springs 420, 468 counter balance the weight of the TV monitor 202 so that once the wall mounting apparatus 200 is installed to the wall 204 and it is supporting the TV monitor 202, the TV monitor 202 can be tilted about a horizontal axis, essentially aligned with the longitudinal axes of the rods 362 and 364, with very little effort on the part of the user.

As the support brackets 330, 332 are pivoted or tilted downward the arms of the torsion springs 420, 468 are brought closer together thus exerting a greater torque opposing the downward tilting or pivoting of the support brackets. Because the center of gravity of the TV monitor 202 is above and forward of the axis of pivot of the support brackets 330, 332, as the support brackets pivot downward the length of the moment arm associated with the force of gravity on the TV monitor 202 is increased and hence the moment due to the weight of the monitor 202 increases. Accordingly, the torque due to the weight of the TV monitor that has to be counter balanced by the torsion springs 420, 468 is also increased as the support brackets are pivoted downward. Accordingly, the torque exerted by the torsion springs 420, 468 always almost perfectly counter balances the torque due to gravity acting on the TV monitor 202. Therefore, very little effort is required on the part of the user to tilt or pivot the TV monitor 202 about the horizontal axis as defined by the rods 362, 364 of the tilting mechanisms 322, 324. Furthermore, because the weight of the TV monitor 202 is at all times very nearly perfectly counterbalanced by the torque due to the torsion springs 420, 468, there is very little tendency for the TV monitor 202 to move on its own after it is tilted or pivoted to desired position by the user, and whatever tendency there may be for the TV monitor 202 to move on its own such tendency is weak enough that it is not sufficient to overcome the frictional resistance due to the friction clips 442, 492.

Once the wall mounting apparatus 200 is mounted to a wall 204 and a TV Monitor 202 is hung on the support brackets 330, 332 such that the hooks 544 in the back of the TV monitor 202 engage the slots in the support brackets 330, 332, a user can push the TV monitor such that is lies flat very close to the wall. Also the user can move the TV monitor away from the wall through the action of the two two-link arms 248, 250 by pulling the TV monitor away from the wall. The user can then tilt the TV monitor about a horizontal axis defined by the rods 362, 364 of the tilting mechanisms 322, 324 by simply pushing or pulling on a corner of the TV monitor. Also, the user can push one side of the TV monitor 202 toward the wall 204 to cause the TV monitor to swivel or pivot about a vertical axis by collapsing one of the two two-link arms 248, 250 to some degree greater than the other two-link arm.

Safety clips 556 in the form of spring wire loops are pivotally attached to the support brackets 330, 332 near their top ends. The safety clips 556 can be positioned over the hooks 544 to prevent the display 202 from being accidentally disengaged from the support brackets 330, 332 and falling to the floor.

The rods 362, 364 are provided with a retaining ring groove 546 near one end. The retaining groove 546 of each rod 362, 364 is positioned behind the respective flange 368, 370 opposite the side of the flange 368, 370 that faces the respective spacer bracket 418, 470. A retaining ring is engaged to each groove 546 in each rod 362, 364 to keep each rod 362, 364 from being pulled out of the respective tilt mechanism 322, 324. A bushing 274, made of a relatively soft metal such as copper or of a plastic or other suitable polymeric material, is provided at each bearing supporting the rods 362, 364 or at any hole through which the rods 362, 364 extend in order to provide a tight, play-free fit while maintaining ease of assembly. The mounting bracket 206, the links 252, 254, 256, 258, the support beam 300, the rods 362, 364, the spacer brackets 418, 470, the tilting brackets 382, 384, and the support brackets 330, 332 may, for example, be made of steel or aluminum.

The sidewalls 318, 320 of the support beam 300 are provided with openings 548, 550 and 552, 554, respectively. The sidewalls 318, 320 of the support beam 300 fits between the sidewalls 288, 290 of each of the second links 254, 258 such that the holes 294, 298 of the second link 254 of the first arm 248 register with the holes 548, 552, respectively, of the support beam 300, and such that the holes 298, 294 of the second link 258 of the second arm 250 register with the holes 550, 554, respectively, of the support beam 300. The pivotal joint between the Support beam 300 and the second links of both of the first and second two-link arms 248, 250 are provided with means to produce a frictional drag on the relative pivotal movement in a pivotal joint.

The holes 548, 552 of the support beam 300 are larger than the holes 294, 298, respectively, of the second link 254 of the first two-link arm 248. Similarly, the holes 550, 554 of the support beam 300 are larger than the holes 298, 294, respectively, of the second link 258 of the second two-link arm 250. One bushing 274 is inserted into the hole 548 of the support beam 300 such that the flange 276 of the bushing is positioned between the first sidewall 288 of the second link 254 of the first two-link arm 248 and the first sidewall 318 of the support beam 300 and the bore of the bushing registers with the hole 294. Then a pivot pin 278 is positioned through the bore of the bushing 274 and the hole 294 and a retaining ring 284 is engaged to the retaining ring groove of the pivot pin to secure the pivot pin in place.

Another bushing 274 is inserted into the hole 552 of the support beam 300 such that the flange 276 of this bushing is positioned between the second sidewall 290 of the second link 254 of the first two-link arm 248 and the sidewall 320 of the support beam 300 and the bore of this bushing registers with the hole 298. Then a pivot bolt 302 is positioned through the bore of the bushing 274 and the hole 298. The bolt 302 has a threaded portion 304. A concavo-convex spring washer 306, known as a "belville" washer, is placed around the threaded portion of the bolt. A threaded nut 308 is engaged to the threaded portion of the bolt and tightened to produce an axial load with the help of the spring washer just described in order to generate friction in the pivot joint. A second threaded nut 310 is used as a jam nut to lock the nut 308 in place. The means to produce a frictional drag on the relative pivotal movement in a pivotal joint comprises the spring washer 306, the bolt 302 and the nuts 308, 310. The bolt 302 has a large diameter portion that completely fills the bore of the bushings 274 and the holes 296, 298 and thus eliminates any play in the pivot joint just like the pivot pin 278. Thus, one end of the second link 254 of the first two-link arm 248 is pivotally joined to the support beam 300. Using the same procedure and construction one end of the second link 258 of the second arm 250 is pivotally joined to the support beam 300.

The first opening 548 in the first sidewall 318 of the support beam 300 is elongated somewhat to form a slot, while the second opening 550 can be circular. Similarly, the first opening 552 in the second sidewall 320 of the support beam 300 is elongated somewhat to form a slot, while the second opening 554 can be circular. Some of the openings used for making pivot joints between the arms 248, 250 and the mounting bracket 206 or the support beam 300, and between the links in the arms, may be elongated to account for variations in the dimensions of the parts of the wall mounting apparatus 200 due to the finite manufacturing tolerances. Accordingly, by making the holes 548 and 552 elongated, final assembly of the wall mounting apparatus 200 will not be hindered even when there are variations in the dimensions of various parts of the wall mounting apparatus 200 due to the finite manufacturing tolerances. Here the means to produce a frictional drag on the relative pivotal movement in a pivotal joint also helps keep the bolt 302 and pin 278 stationary within the slots 552, 548 such the bolt 302 and the pin 278 will not move along the slots 552, 548, respectively.

In conclusion, a counterbalanced wall mounting apparatus that has four degrees of freedom of movement, including linear translation, tilt, swivel, and pan is provided by the present invention. All movements and positions are easily controlled by a user from the front of the display with easy hand pressure, no tools being required and accessing the back of the display not being necessary. The sickle-shaped friction clips provide asymmetrical frictional resistance and they are oriented within the friction clip housings to provide less frictional resistance when the display is being tilted upward so that it is easier to tilt the screen up to accommodate ergonomic differences that make it easier for humans to push down with arms extended at chest level than to push up. Thus the sickle-shaped friction clips provide asymmetrical tilt torque control. The fact that the friction clips are isolated from the weight bearing function of the tilting mechanisms means that the friction clips do not carry any weight load, which is an optimal design for consistent tilt control torque and long life tilt position control. Also, the frictional resistance provided in some joints of the two-link arms using the compressed belville spring washers provides for swivel positioning control. Also, the mounting apparatus 200 provides for adjustable counterbalancing to accommodate various TV screen weights, which it can still counterbalance effectively. The mounting apparatus 200 provides for good uniform counter-balancing even with varying tilt angle by positioning the center of gravity of the display above and forward of the tilt hinge centerline in combination with the unique torsion spring counterbalancing mechanism. Also, the mounting apparatus 200 provides for ease of manufacture by using some slotted openings in the arm joints to accommodate manufacturing stack-up tolerances of all the arm linkages, in order to insure that the arms will always fold flat against the wall in their nested positions.

It should be noted that the present invention is not limited to the disclosed embodiment, but that it includes all embodiments within the scope of the appended claims.

The invention claimed is:

1. A display mounting apparatus for movably supporting a display on a stationary support, the display having a weight and a center of gravity, the display mounting apparatus comprising:
    means for mounting the display mounting apparatus to the stationary support;
    a support beam;
    means for movably attaching said support beam to said means for mounting the display mounting apparatus;
    at least one counterbalancing tilt mechanism supported by said support beam, said counterbalancing tilt mechanism including a torsion spring;
    a first display support bracket supported by said counterbalancing tilt mechanism for tilting rotation relative to said support beam;
    a second display support bracket supported by said counterbalancing tilt mechanism for tilting rotation relative to said support beam, said first and second display support brackets being adapted to cooperatively support the display for tilting rotation about a tilt axis relative to said support beam; and
    a frictional damping mechanism for damping the tilting rotation of the display relative to said support beam,
    wherein said counterbalancing tilt mechanism includes a load carrying structure, and wherein said frictional damping mechanism is isolated from a load due to the weight of the display by placing said damping mechanism outside said load carrying structure of said counterbalancing tilt mechanism.

2. The display mounting apparatus according to claim 1, wherein said first and second display support brackets are adapted to cooperatively support the display such that the center of gravity of the display is always positioned above and forward of said tilt axis, such that a moment due to the weight of the display is always increasing as the display is tilted downward when the display is mounted to the display mounting apparatus, and such that a counterbalancing moment generated by said torsion spring matches increases in the moment due to the weight of the display as the display supported by the display supporting apparatus is tilted downward relative to said support beam.

3. The display mounting apparatus according to claim 2, wherein said frictional damping mechanism comprises one or more friction clips.

4. The display mounting apparatus according to claim 1, the display mounting apparatus further comprising a weight adjustment mechanism to adjust a preload of said torsion spring to match the weight of the display supported by the display mounting apparatus.

5. The display mounting apparatus according to claim 4, wherein said weight adjustment mechanism comprises a cam shaped as a wedge which allows for said preload adjustment of said torsion spring.

6. The display mounting apparatus according to claim 1, the display mounting apparatus further comprising safety clips that prevent the display from being accidentally dislodged from said display support brackets.

7. The display mounting apparatus according to claim 1, wherein said means for movably attaching said support beam to said means for mounting the display mounting apparatus comprises:
    a first arm capable of assuming any position between a fully collapsed position and a fully extended position; and
    a second arm capable of assuming any position between a fully collapsed position and a fully extended position, said first arm being pivotally attached to said support beam and said second arm being pivotally attached to said support beam.

8. The display mounting apparatus according to claim 7, wherein said frictional damping mechanism comprises one or more friction clips.

9. The display mounting apparatus according to claim 7, the display mounting apparatus further comprising a weight adjustment mechanism to adjust a preload of said torsion spring to match the weight of the display supported by the display mounting apparatus.

10. The display mounting apparatus according to claim 9, wherein said weight adjustment mechanism comprises a cam shaped as a wedge which allows for said preload adjustment of said torsion spring.

11. The display mounting apparatus according to claim 7, the display mounting apparatus further comprising safety clips that prevent the display from being accidentally dislodged from said display support brackets.

12. The display mounting apparatus according to claim 7, wherein said means for mounting the display mounting apparatus to the stationary support comprises a wall mounting bracket adapted for being mounted to a wall, wherein said first arm is pivotally attached to said wall mounting bracket, and wherein said second arm is pivotally attached to said wall mounting bracket.

13. The display mounting apparatus according to claim 7, wherein said first arm is a first two-link arm and wherein said second arm is a second two-link arm.

14. The display mounting apparatus according to claim 13, wherein said frictional damping mechanism comprises one or more friction clips.

15. The display mounting apparatus according to claim 13, the display mounting apparatus further comprising a weight adjustment mechanism to adjust a preload of said torsion spring to match the weight of the display supported by the display mounting apparatus.

16. The display mounting apparatus according to claim 15, wherein said weight adjustment mechanism comprises a cam shaped as a wedge which allows for said preload adjustment of said torsion spring.

17. The display mounting apparatus according to claim 13, the display mounting apparatus further comprising safety clips that prevent the display from being accidentally dislodged from said display support brackets.

18. The display mounting apparatus according to claim 13, wherein said means for mounting the display mounting apparatus to the stationary support comprises a wall mounting bracket adapted for being mounted to a wall, wherein said first two-link arm is pivotally attached to said wall mounting bracket, and wherein said second two-link arm is pivotally attached to said wall mounting bracket.

19. The display mounting apparatus according to claim 13, wherein at least one joint in one of said first and second two-link arms is equipped with openings in the form of slots to allow compensation for stacked tolerances of multiple components.

20. The display mounting apparatus according to claim 13, wherein at least one of said first and second two-link arms is provided with at least one pivot pin that is axially loaded by use of friction devices to maintain position during operation.

21. The display mounting apparatus according to claim 7, wherein said first arm includes at least two links and wherein said second arm includes at least two links.

22. The display mounting apparatus according to claim 21, wherein said frictional damping mechanism comprises one or more friction clips.

23. The display mounting apparatus according to claim 21, the display mounting apparatus further comprising a weight adjustment mechanism to adjust a preload of said torsion spring to match the weight of the display supported by the display mounting apparatus.

24. The display mounting apparatus according to claim 23, wherein said weight adjustment mechanism comprises a cam shaped as a wedge which allows for said preload adjustment of said torsion spring.

25. The display mounting apparatus according to claim 21, the display mounting apparatus further comprising safety clips that prevent the display from being accidentally dislodged from said display support brackets.

26. The display mounting apparatus according to claim 21, wherein said means for mounting the display mounting apparatus to the stationary support comprises a wall mounting bracket adapted for being mounted to a wall, wherein said first two-link arm is pivotally attached to said wall mounting bracket, and wherein said second two-link arm is pivotally attached to said wall mounting bracket.

27. The display mounting apparatus according to claim 21, wherein at least one joint in one of said first and second arms is equipped with openings in the form of slots to allow compensation for stacked tolerances of multiple components.

28. The display mounting apparatus according to claim 21, wherein at least one of said first and second arms is provided with at least one pivot pin that is axially loaded by use of friction devices to maintain position during operation.

29. The display mounting apparatus according to claim 1, wherein said at least one torsion spring is a first torsion spring and wherein said counterbalancing tilt mechanism comprises:
a first counterbalancing tilt mechanism supported by said support beam and including said first torsion spring; and
a second counterbalancing tilt mechanism supported by said support beam and including a second torsion spring,
said first display support bracket being supported by said first counterbalancing tilt mechanism for tilting rotation relative to said support beam, and
said second display support bracket being supported by said second counterbalancing tilt mechanism for tilting rotation relative to said support beam.

30. A counterbalancing tilt mechanism for allowing tilting rotation relative to a support beam capable of use in a display mounting apparatus for movably supporting a display on a stationary support, the display having a weight and a center of gravity, the counterbalancing tilt mechanism comprising:
a torsion spring; and
a display support bracket supported for tilting rotation relative to the support beam, said display support bracket being adapted to cooperatively support the display for tilting rotation about a tilt axis relative to said support beam; and
a weight adjustment mechanism comprising a cam shaped as a wedge which allows for preload adjustment of said torsion spring,
wherein said display support bracket is adapted to support the display such that the center of gravity of the display is always positioned above and forward of said tilt axis, such that a moment due to the weight of the display is always increasing as the display is tilted downward when the display is mounted to the display support bracket, and such that a counterbalancing moment generated by said torsion spring increases as the moment due to the weight of the display increases as the display supported by the display mounting apparatus is tilted downward relative to the support beam.

31. The counterbalancing tilt mechanism according to claim 30, further comprising a frictional damping mechanism for damping the tilting rotation of the display relative to said support beam.

32. The counterbalancing tilt mechanism according to claim 31, wherein said frictional damping mechanism comprises one or more friction clips.

33. The counterbalancing tilt mechanism according to claim 31, wherein the counterbalancing tilt mechanism includes a load carrying structure, and wherein said frictional damping mechanism is isolated from a load due to the weight of the display by placing said damping mechanism outside said load carrying structure of said counterbalancing tilt mechanism.

34. A display mounting apparatus comprising:
a wall mounting bracket adapted for being mounted to a wall;
a first two-link arm pivotally attached to said wall mounting bracket;
a second two-link arm pivotally attached to said wall mounting bracket;
a support beam having a first end portion and a second end portion, said first two-link arm being pivotally attached to said support beam and said second two-link arm being pivotally attached to said support beam;
at least a first pivot pin and a second pivot pin, said first pivot pin being positioned to extend through a hole in said first two-link arm and a first hole in said support beam, and said second pivot pin being positioned to extend through a hole in said second two-link arm and a second hole in said support beam;
a first counterbalancing tilt mechanism supported by said support beam and including a first torsion spring and a first tilting bracket, said first tilting bracket being pivotally supported at said first end portion of said support beam;
a second counterbalancing tilt mechanism supported by said support beam and including a second torsion spring and a second tilting bracket, said second tilting bracket being pivotally supported at said second end portion of said support beam;
a first display support bracket supported by said first counterbalancing tilt mechanism for tilting rotation relative to said support beam, said first display support bracket being attached to said first tilting bracket such that said first display support bracket and said first tilting bracket pivotally move together as a unit; and
a second display support bracket supported by said counterbalancing tilt mechanism for tilting rotation relative to said support beam, said second display support bracket being attached to said second tilting bracket such that said second display support bracket and said second tilting bracket pivotally move together as a unit, said first and second display support brackets being adapted to cooperatively support the display for tilting rotation about a tilt axis relative to said support beam.

35. The display mounting apparatus according to claim 34, further comprising a frictional damping mechanism for damping the tilting rotation of the display relative to said support beam.

36. The display mounting apparatus according to claim 35, wherein said frictional damping mechanism comprises one or more friction clips.

37. The display mounting apparatus according to claim 34, further comprising a weight adjustment mechanism including a cam shaped as a wedge which allows for preload adjustment of said torsion spring.

38. The display mounting apparatus according to claim 34, wherein said first and second display support brackets are adapted to support the display such that the center of gravity of the display is always positioned above and forward of said tilt axis, such that a moment due to the weight of the display is always increasing as the display is tilted downward when the display is mounted to the first and second display support brackets, and such that a counterbalancing moment generated by said first and second torsion springs matches increases in the moment due to the weight of the display as the display supported by the display mounting apparatus is tilted downward relative to the support beam.

39. The display mounting apparatus according to claim 35, wherein each of the first and second counterbalancing tilt mechanisms includes a load carrying structure, and wherein said frictional damping mechanism is isolated from a load due to the weight of the display by placing said damping mechanism outside said load carrying structure of each of said first and second counterbalancing tilt mechanisms.

40. A display mounting apparatus for movably supporting a display on a stationary support, the display having a weight and a center of gravity, the display mounting apparatus comprising:
means for mounting the display mounting apparatus to the stationary support;
a support beam;
means for movably attaching said support beam to said means for mounting the display mounting apparatus, wherein said means for movably attaching said support beam to said means for mounting the display mounting apparatus comprises:
a first arm capable of assuming any position between a fully collapsed position and a fully extended position; and
a second arm capable of assuming any position between a fully collapsed position and a fully extended position, said first arm being pivotally attached to said support beam and said second arm being pivotally attached to said support beam, each of said first and second arms having at least one joint;
at least one counterbalancing tilt mechanism supported by said support beam, said counterbalancing tilt mechanism including a torsion spring;
a first display support bracket supported by said counterbalancing tilt mechanism for tilting rotation relative to said support beam; and
a second display support bracket supported by said counterbalancing tilt mechanism for tilting rotation relative to said support beam, said first and second display support brackets being adapted to cooperatively support the display for tilting rotation about a tilt axis relative to said support beam,
wherein at least one joint in one of said first and second arms is equipped with openings in the form of slots to allow compensation for stacked tolerances of multiple components.

41. The display mounting apparatus according to claim 40, wherein said first and second display support brackets are adapted to cooperatively support the display such that the center of gravity of the display is always positioned above and forward of said tilt axis, such that a moment due to the weight of the display is always increasing as the display is tilted downward when the display is mounted to the display mounting apparatus, and such that a counterbalancing moment generated by said torsion spring matches increases in the moment due to the weight of the display as the display supported by the display supporting apparatus is tilted downward relative to said support beam.

42. The display mounting apparatus according to claim 40, further comprising a frictional damping mechanism for damping the tilting rotation of the display relative to said support beam.

43. The display mounting apparatus according to claim 42, wherein said counterbalancing tilt mechanism includes a load carrying structure, and wherein said frictional damping mechanism is isolated from a load due to the weight of the display by placing said damping mechanism outside said load carrying structure of said counterbalancing tilt mechanism.

44. The display mounting apparatus according to claim 42, wherein said frictional damping mechanism comprises one or more friction clips.

45. The display mounting apparatus according to claim 40, further comprising a weight adjustment mechanism including a cam shaped as a wedge which allows for preload adjustment of said torsion spring.

46. A display mounting apparatus for movably supporting a display on a stationary support, the display having a weight and a center of gravity, the display mounting apparatus comprising:
- means for mounting the display mounting apparatus to the stationary support;
- a support beam;
- means for movably attaching said support beam to said means for mounting the display mounting apparatus, wherein said means for movably attaching said support beam to said means for mounting the display mounting apparatus comprises:
- a first arm capable of assuming any position between a fully collapsed position and a fully extended position; and
- a second arm capable of assuming any position between a fully collapsed position and a fully extended position, said first arm being pivotally attached to said support beam and said second arm being pivotally attached to said support beam;
- at least one counterbalancing tilt mechanism supported by said support beam, said counterbalancing tilt mechanism including a torsion spring;
- a first display support bracket supported by said counterbalancing tilt mechanism for tilting rotation relative to said support beam; and
- a second display support bracket supported by said counterbalancing tilt mechanism for tilting rotation relative to said support beam, said first and second display support brackets being adapted to cooperatively support the display for tilting rotation about a tilt axis relative to said support beam,
- wherein at least one of said first and second arms is provided with at least one pivot pin that is axially loaded by use of friction devices to maintain position during operation.

47. The display mounting apparatus according to claim 46, wherein said first and second display support brackets are adapted to cooperatively support the display such that the center of gravity of the display is always positioned above and forward of said tilt axis, such that a moment due to the weight of the display is always increasing as the display is tilted downward when the display is mounted to the display mounting apparatus, and such that a counterbalancing moment generated by said torsion spring matches increases in the moment due to the weight of the display as the display supported by the display supporting apparatus is tilted downward relative to said support beam.

48. The display mounting apparatus according to claim 46, further comprising a frictional damping mechanism for damping the tilting rotation of the display relative to said support beam.

49. The display mounting apparatus according to claim 48, wherein said counterbalancing tilt mechanism includes a load carrying structure, and wherein said frictional damping mechanism is isolated from a load due to the weight of the display by placing said damping mechanism outside said load carrying structure of said counterbalancing tilt mechanism.

50. The display mounting apparatus according to claim 48, wherein said frictional damping mechanism comprises one or more friction clips.

51. The display mounting apparatus according to claim 46, further comprising a weight adjustment mechanism including a cam shaped as a wedge which allows for preload adjustment of said torsion spring.

52. A display mounting apparatus for movably supporting a display, the display mounting apparatus comprising:
- a wall mounting bracket for mounting the apparatus to a wall;
- a support beam;
- a first two-link arm and a second two-link arm connecting said wall mounting bracket to said support beam, each of said first and second two-link arms being coupled at one end thereof to said wall mounting bracket and each of said first and second two-link arms being coupled at another end thereof to said support beam, to allow said support beam to swivel about a vertical axis, and each of said first and second two-link arms having at least one pivot joint,
- wherein said first two-link arm is connected to said wall mounting bracket near one end of said wall mounting bracket, said first two-link arm is connected to said support beam near one end of said support beam, said second two-link arm is connected to said wall mounting bracket near another end of said wall mounting bracket at a distance from said first two link arm, and said second two-link arm is connected to said support beam near another end of said support beam,
- wherein said first two-link arm includes a first link and a second link, said second two-link arm includes a first link and a second link, said first link of said first two-link arm has a first end pivotally connected to said wall mounting bracket to pivot about a vertical axis, said first link of said second two-link arm has a first end pivotally connected to said wall mounting bracket to pivot about a vertical axis, a first end of said second link of said first two-link arm is pivotally connected to a second end of said first link of said first two-link arm for pivotal movement about a vertical axis, a first end of said second link of said second two-link arm is pivotally connected to a second end of said first link of said second two-link arm for pivotal movement about a vertical axis, a second end of said second link of said first two-link arm is pivotally connected to said support beam for pivotal movement about a vertical axis, and a second end of said second link of said second two-link arm is pivotally connected to said support beam for pivotal movement about a vertical axis;
- first and second tilting brackets rotationally connected to respective ends of said support beam, said first and second tilting brackets being connected to said support beam to rotate relative to the wall about a horizontal axis while being connected to a rear side of the display and while the wall mounting bracket is fixed to the wall; and first and second display support brackets attached to said first and second tilting brackets, respectively, said first and second display support brackets each having upper and lower portions that are capable of being secured to upper and lower portions of a rear side of the display.

53. The display mounting apparatus according to claim 52, wherein each of the first and second display support brackets has slots formed at upper and lower portions thereof to which studs on the rear side of the display can be secured.

54. The display mounting apparatus according to claim 52, wherein said wall mounting bracket, said first and second links of said first two-link arm, said first and second links of said second two-link arm, and said support beam are in the form of steel members having a cross section in the form of an open rectangular channel such that said first link of said first two-link arm and said first link of said second two-link arm can nest into said wall mounting bracket, said second link of said first two-link arm and said second link of said second two-link arm can nest into said first link of said first two-link arm and said first link of said second two-link arm, respectively, and said support beam can nest into said second link of said first two-link arm and said second link of said second two-link arm.

55. The display mounting apparatus according to claim 52, wherein the display has a weight and the display mounting apparatus further comprises:
a first torsion spring and a second torsion spring acting on said first and second tilting brackets, respectively, to aid in counterbalancing the weight of the display.

56. A display mounting apparatus for movably supporting a display, the display mounting apparatus comprising:
a wall mounting bracket for mounting the apparatus to a wall;
a support beam;
a first two-link arm and a second two-link arm connecting said wall mounting bracket to said support beam, each of said first and second two-link arms being coupled at one end thereof to said wall mounting bracket and each of said first and second two-link arms being coupled at another end thereof to said support beam, to allow said support beam to swivel about a vertical axis, and each of said first and second two-link arms having at least one pivot joint,
wherein said first two-link arm is connected to said wall mounting bracket near one end of said wall mounting bracket, said first two-link arm is connected to said support beam near one end of said support beam, said second two-link arm is connected to said wall mounting bracket near another end of said wall mounting bracket at a distance from said first two link arm, and said second two-link arm is connected to said support beam near another end of said support beam,
wherein said first two-link arm includes a first link and a second link, said second two-link arm includes a first link and a second link, said first link of said first two-link arm has a first end pivotally connected to said wall mounting bracket to pivot about a vertical axis, said first link of said second two-link arm has a first end pivotally connected to said wall mounting bracket to pivot about a vertical axis, a first end of said second link of said first two-link arm is pivotally connected to a second end of said first link of said first two-link arm for pivotal movement about a vertical axis, a first end of said second link of said second two-link arm is pivotally connected to a second end of said first link of said second two-link arm for pivotal movement about a vertical axis, a second end of said second link of said first two-link arm is pivotally connected to said support beam for pivotal movement about a vertical axis, and a second end of said second link of said second two-link arm is pivotally connected to said support beam for pivotal movement about a vertical axis;
at least one tilting bracket connected to said support beam to rotate relative to the wall about a horizontal axis while being connected to a rear side of the display and while the wall mounting bracket is fixed to the wall,
wherein said wall mounting bracket, said first and second links of said first two-link arm, said first and second links of said second two-link arm, and said support beam are in the form of steel members having a cross section in the form of an open rectangular channel such that said first link of said first two-link arm and said first link of said second two-link arm can nest into said wall mounting bracket, said second link of said first two-link arm and said second link of said second two-link arm can nest into said first link of said first two-link arm and said first link of said second two-link arm, respectively, and said support beam can nest into said second link of said first two-link arm and said second link of said second two-link arm.

57. A display mounting apparatus for movably supporting a display, the display mounting apparatus comprising:
a wall mounting bracket for mounting the apparatus to a wall;
a support beam;
a first two-link arm and a second two-link arm connecting said wall mounting bracket to said support beam, each of said first and second two-link arms being coupled at one end thereof to said wall mounting bracket and each of said first and second two-link arms being coupled at another end thereof to said support beam, to allow said support beam to swivel about a vertical axis, and each of said first and second two-link arms having at least one pivot joint,
wherein said first two-link arm is connected to said wall mounting bracket near one end of said wall mounting bracket, said first two-link arm is connected to said support beam near one end of said support beam, said second two-link arm is connected to said wall mounting bracket near another end of said wall mounting bracket at a distance from said first two link arm, and said second two-link arm is connected to said support beam near another end of said support beam,
wherein said first two-link arm includes a first link and a second link, said second two-link arm includes a first link and a second link, said first link of said first two-link arm has a first end pivotally connected to said wall mounting bracket, said first link of said second two-link arm has a first end pivotally connected to said wall mounting bracket, a first end of said second link of said first two-link arm is pivotally connected to a second end of said first link of said first two-link arm, a first end of said second link of said second two-link arm is pivotally connected to a second end of said first link of said second two-link arm, a second end of said second link of said first two-link arm is pivotally connected to said support beam, and a second end of said second link of said second two-link arm is pivotally connected to said support beam;
first and second tilting brackets rotationally connected to respective ends of said support beam, said first and second tilting brackets being connected to said support beam to rotate relative to the wall about a horizontal axis while being connected to a rear side of the display and while the wall mounting bracket is fixed to the wall; and first and second display support brackets attached to said first and second tilting brackets, respectively, said first and second display support brackets each having upper and lower portions that are capable of being secured to upper and lower portions of a rear side of the display.

58. The display mounting apparatus according to claim 57, wherein each of the first and second display support brackets has slots formed at upper and lower portions thereof to which studs on the rear side of the display can be secured.

59. The display mounting apparatus according to claim 57, wherein said wall mounting bracket, said first and second links of said first two-link arm, said first and second links of said second two-link arm, and said support beam are in the form of steel members having a cross section in the form of an open rectangular channel such that said first link of said first two-link arm and said first link of said second two-link arm can nest into said wall mounting bracket, said second link of said first two-link arm and said second link of said second two-link arm can nest into said first link of said first two-link arm and said first link of said second two-link arm, respectively, and said support beam can nest into said second link of said first two-link arm and said second link of said second two-link arm.

60. The display mounting apparatus according to claim 57, wherein the display has a weight and the display mounting apparatus further comprises:

a first torsion spring and a second torsion spring acting on said first and second tilting brackets, respectively, to aid in counterbalancing the weight of the display.

61. A display mounting apparatus for movably supporting a display, the display mounting apparatus comprising:

a wall mounting bracket for mounting the apparatus to a wall;

a support beam;

a first two-link arm and a second two-link arm connecting said wall mounting bracket to said support beam, each of said first and second two-link arms being coupled at one end thereof to said wall mounting bracket and each of said first and second two-link arms being coupled at another end thereof to said support beam, to allow said support beam to swivel about a vertical axis, and each of said first and second two-link arms having at least one pivot joint, wherein said first two-link arm is connected to said wall mounting bracket near one end of said wall mounting bracket, said first two-link arm is connected to said support beam near one end of said support beam, said second two-link arm is connected to said wall mounting bracket near another end of said wall mounting bracket at a distance from said first two link arm, and said second two-link arm is connected to said support beam near another end of said support beam, wherein said first two-link arm includes a first link and a second link, said second two-link arm includes a first link and a second link, said first link of said first two-link arm has a first end pivotally connected to said wall mounting bracket, said first link of said second two-link arm has a first end pivotally connected to said wall mounting bracket, a first end of said second link of said first two-link arm is pivotally connected to a second end of said first link of said first two-link arm, a first end of said second link of said second two-link arm is pivotally connected to a second end of said first link of said second two-link arm, a second end of said second link of said first two-link arm is pivotally connected to said support beam, and a second end of said second link of said second two-link arm is pivotally connected to said support beam; and at least one tilting bracket connected to said support beam to rotate relative to the wall about a horizontal axis while being connected to a rear side of the display and while the wall mounting bracket is fixed to the wall, wherein said wall mounting bracket, said first and second links of said first two-link arm, said first and second links of said second two-link arm, and said support beam are in the form of steel members having a cross section in the form of an open rectangular channel such that said first link of said first two-link arm and said first link of said second two-link arm can nest into said wall mounting bracket, said second link of said first two-link arm and said second link of said second two-link arm can nest into said first link of said first two-link arm and said first link of said second two-link arm, respectively, and said support beam can nest into said second link of said first two-link arm and said second link of said second two-link arm.

62. The display mounting apparatus according to claim 61, wherein the display has a weight and the display mounting apparatus further comprises:

at least one torsion spring acting on said tilting bracket to aid in counterbalancing the weight of the display.

63. A display mounting apparatus for movably supporting a display, the display having a weight, and the display mounting apparatus comprising:

a wall mounting bracket for mounting the apparatus to a wall;

a support beam;

a first arm and a second arm connecting said wall mounting bracket to said support beam;

first and second tilting brackets rotationally connected to respective ends of said support beam, said first and second tilting brackets being connected to said support beam to rotate relative to the wall about a horizontal axis while being connected to a rear side of the display and while the wall mounting bracket is fixed to the wall;

first and second display support brackets attached to said first and second tilting brackets, respectively; and a first torsion spring and a second torsion spring acting on said first and second tilting brackets, respectively, to aid in counterbalancing the weight of the display, wherein said wall mounting bracket, said first and second arms, and said support beam comprise steel members having a cross section in the form of an open rectangular channel such that said first and second arms and said support beam can nest into said wall mounting bracket when the display mounting apparatus is in a collapsed state.

64. The display mounting apparatus according to claim 63, wherein said first arm is a first two-link arm and said second arm is a second two-link arm, wherein said first two-link arm includes a first link and a second link, said second two-link arm includes a first link and a second link, said first link of said first two-link arm has a first end pivotally connected to said wall mounting bracket, said first link of said second two-link arm has a first end pivotally connected to said wall mounting bracket, a first end of said second link of said first two-link arm is pivotally connected to a second end of said first link of said first two-link arm, a first end of said second link of said second two-link arm is pivotally connected to a second end of said first link of said second two-link arm, a second end of said second link of said first two-link arm is pivotally connected to said support beam, and a second end of said second link of said second two-link arm is pivotally connected to said support beam, and wherein said wall mounting bracket, said first and second links of said first two-link arm, said first and second links of said second two-link arm, and said support beam are in the form of steel members having a cross section in the form of an open rectangular channel such that said first link of said first two-link arm and said first link of said second two-link arm can nest into said wall mounting bracket, said second link of said first two-link arm and said second link of said second two-link arm can nest into said first link of said first two-link arm and said first link of said second two-link arm, respectively, and said support beam can nest into said second link of said first two-link arm and said second link of said second two-link arm.

65. A supporting device of a display unit, comprising:
a stationary bracket securable to a wall;
a body coupling device to mount a body of the display unit thereto; and
a plurality of connecting devices to connect the stationary bracket with the body coupling device, each connecting device having first and second ends thereof coupled to the stationary bracket and the body coupling device, respectively, to rotate in left and right directions, and having at least one point between the first and second ends thereof to bend in the left and right directions,
wherein the plurality of connecting devices comprises: a first connecting device coupled to a left side of the stationary bracket and a left side of the body coupling device; and a second connecting device coupled to a right side of the stationary bracket and a right side of the body coupling device and spaced apart from the first connecting device,
wherein each of the first and second connecting devices comprises:
a first link having a first end coupled to the stationary bracket to rotate in the left and right directions and having a second end; and
a second link having a first end coupled to the second end of the first link to rotate in the left and right directions and a second end coupled to the body coupling device to rotate in the left and right directions,
wherein the body coupling device comprises:
a supporting member coupled to the first and second connecting devices; and
an upward-downward rotation member coupled to the supporting member to rotate in upward and downward directions while being coupled to a rear side of the display unit,
wherein the supporting device further comprises:
a first receipt part formed in the stationary bracket to receive the first link;
a second receipt part formed in the first link to receive the second link; and
a third receipt part formed in the second link to receive the supporting member,
wherein the stationary bracket, the first link, the second link, and the supporting member are C-shaped steel members; and the first link has an external width-narrower than an inner width of the stationary bracket, the second link has an external width narrower than an inner width of the first link, and the supporting member has an external width narrower than an inner width of the second link.

66. A display mounting apparatus for movably supporting a display, the display having a weight, and the display mounting apparatus comprising:
a wall mounting bracket for mounting the apparatus to a wall;
a support beam having at least a first flange having at least one opening and a second flange having at least one opening;
a first arm and a second arm connecting said wall mounting bracket to said support beam;
first and second tilting brackets rotationally connected to respective ends of said support beam, said first and second tilting brackets being connected to said support beam to rotate relative to the wall about a horizontal axis while being connected to a rear side of the display and while the wall mounting bracket is fixed to the wall;
a first display support bracket attached to said first tilting bracket to rotate with said first tilting bracket as a unit, said first display support bracket having at least one opening and said first tilting bracket having at least one opening in registry with said at least one opening of said first display support bracket;
a second display support bracket attached to said second tilting bracket to rotate with said second tilting bracket as a unit, said second display support bracket having at least one opening and said second tilting bracket having at least one opening in registry with said at least one opening of said second display support bracket;
a first rod positioned to extend through said opening of said first flange of said support beam, said opening of said first tilting bracket, and said opening of said first display support bracket;
a second rod positioned to extend through said opening of said second flange of said support beam, said opening of said second tilting bracket, and said opening of said second display support bracket, said first rod defining an axis of rotation of said first display support bracket and said first tilting bracket relative to said support beam, said second rod defining an axis of rotation of said second display support bracket and said second tilting bracket relative to said support beam, said first rod and said second rod being coaxial; and
a first torsion spring and a second torsion spring acting on said first and second tilting brackets, respectively, to aid in counterbalancing the weight of the display.

67. The display mounting apparatus according to claim 66, wherein said first torsion spring has a first arm acting on said support beam, coils and a second arm acting on said first tilting bracket,
wherein said second torsion spring has a first arm acting on said support beam, coils and a second arm acting on said second tilting bracket,
wherein said first rod is positioned such that it extends through said coils of said first torsion spring, and
wherein said second rod is positioned such that it extends through said coils of said second torsion spring.

68. The display mounting apparatus according to claim 66, wherein said wall mounting bracket, said first and second arms, and said support beam comprise steel members having a cross section in the form of an open rectangular channel such that said first and second arms and said support beam can nest into said wall mounting bracket when the display mounting apparatus is in a collapsed state.

69. A display mounting apparatus for movably supporting a display, the display having a weight, and the display mounting apparatus comprising:
a wall mounting bracket for mounting the apparatus to a wall;
a support beam;

a first two-link arm and a second two-link arm connecting said wall mounting bracket to said support beam, each of said first and second two-link arms being coupled at one end thereof to said wall mounting bracket and each of said first and second two-link arms being coupled at another end thereof to said support beam, to allow said support beam to swivel about a vertical axis, and each of said first and second two-link arms having at least one pivot joint, wherein said first two-link arm is connected to said wall mounting bracket near one end of said wall mounting bracket, said first two-link arm is connected to said support beam near one end of said support beam, said second two-link arm is connected to said wall mounting bracket near another end of said wall mounting bracket at a distance from said first two link arm, and said second two-link arm is connected to said support beam near another end of said support beam, wherein said first two-link arm includes a first link and a second link, said second two-link arm includes a first link and a second link, said first link of said first two-link arm has a first end pivotally connected to said wall mounting bracket to pivot about a vertical axis, said first link of said second two-link arm has a first end pivotally connected to said wall mounting bracket to pivot about a vertical axis, a first end of said second link of said first two-link arm is pivotally connected to a second end of said first link of said first two-link arm for pivotal movement about a vertical axis, a first end of said second link of said second two-link arm is pivotally connected to a second end of said first link of said second two-link arm for pivotal movement about a vertical axis, a second end of said second link of said first two-link arm is pivotally connected to said support beam for pivotal movement about a vertical axis, and a second end of said second link of said second two-link arm is pivotally connected to said support beam for pivotal movement about a vertical axis;

at least one tilting bracket rotationally connected to said support beam, said tilting bracket being connected to said support beam to rotate relative to the wall about a horizontal axis while being connected to a rear side of the display and while the wall mounting bracket is fixed to the wall;

at least one display support bracket attached to said tilting bracket to rotate with said tilting bracket as a unit; and a rod rotationally supporting said tilting bracket on said support beam, said rod being positioned to extend through said tilting bracket and through said display support bracket.

70. A supporting device of a display unit, comprising:
a stationary bracket securable to a wall;
a body coupling device to mount a body of the display unit thereto, and including an extension member mounted on the body and a support member connected to the extension member;
a rotation member directly on the support member and rotatable about an axis parallel to the support member to move the extension member with respect to the support member; and
a plurality of connecting devices to connect the stationary bracket with the body coupling device, each connecting device having first and second ends thereof coupled to the stationary bracket and the body coupling device, respectively, to rotate in left and right directions, and having at least one point between the first and second ends thereof to bend in the left and right directions, such that connections between the plurality of connecting devices and the body coupling device occur along multiple axes perpendicular to the axis of the rotation member,
wherein the plurality of connecting devices comprises:
a first connecting device coupled to a left side of the stationary bracket and a left side of the body coupling device; and
a second connecting device coupled to a right side of the stationary bracket and a right side of the body coupling device and spaced apart from the first connecting device,
wherein each of the first and second connecting devices comprises:
a first link having a first end coupled to the stationary bracket to rotate in the left and right directions and having a second end; and
a second link having a first end coupled to the second end of the first link to rotate in the left and right directions and a second end coupled to the body coupling device to rotate in the left and right directions, and
wherein the rotation member is an upward-downward rotation member and the body coupling device further comprises:
the supporting member coupled to the first and second connecting devices; and
the upward-downward rotation member coupled to the supporting member to rotate in upward and downward directions while being coupled to a rear side of the display unit.

71. The supporting device according to claim 70, wherein the extension member is secured to the upward-downward rotation member and extending in a vertical direction, the extension member having upper and lower portions capable of being secured to upper and lower portions of the rear side of the display unit, respectively.

72. The supporting device according to claim 71, wherein the body coupling device further comprises:
a supporting shaft extending through the extension member to couple the upward-downward rotation member to the supporting member, wherein the upward-downward rotation member rotates upward and downward within a predetermined distance range with respect to the supporting member.

73. The supporting device according to claim 70, further comprising:
a first receipt part formed in the stationary bracket to receive the first link;
a second receipt part formed in the first link to receive the second link; and
a third receipt part formed in the second link to receive the supporting member.

74. The supporting device according to claim 73, wherein the stationary bracket, the first link, the second link, and the supporting member are C-shaped steel members; and
the first link has an external width narrower than an inner width of the stationary bracket, the second link has an external width narrower than an inner width of the first link, and the supporting member has an external width narrower than an inner width of the second link.

75. A supporting device of a display unit, comprising:
a stationary bracket securable to a wall;
a body coupling device to mount a body of the display unit thereto, and including an extension member mounted on the body and a support member connected to the extension member, and a rotation member rotatably mounted to the support member to move the extension member with respect to the support member; and a plurality of connecting devices to connect the stationary bracket with the body coupling device,
wherein the plurality of connecting devices comprises:
a first connecting device coupled to a left side of the stationary bracket and a left side of the body coupling device; and
a second connecting device coupled to a right side of the stationary bracket and a right side of the body coupling device and spaced apart from the first connecting device,
each of the first and second connecting devices comprises:
a first link having a first end coupled to the stationary bracket to rotate in the left and right directions and having a second end; and
a second link having a first end coupled to the second end of the first link to rotate in the left and right directions and a second end coupled to the body coupling device to rotate in the left and right directions, and
wherein the rotation member is an upward-downward rotation member and the body coupling device comprises:
the supporting member coupled to the first and second connecting devices; and
the upward-downward rotation member coupled to the supporting member to rotate in upward and downward directions while being coupled to a rear side of the display unit.

76. A supporting device of a display unit, comprising:
a stationary bracket securable to a wall;
a body coupling device mountable to a body of the display unit, and including an extension member mounted on the body and a support member connected to the extension member;
a rotation member directly on the support member and rotatable about an axis parallel to the support member to move the extension member with respect to the support member;
a first connecting device to connect left sides of the stationary bracket and the body coupling device with each other, and having a bending part to bend in left and right directions; and
a second connecting device to connect right sides of the stationary bracket and the body coupling device with each other, and having a bending part to bend in the left and right directions,
such that the first connecting device and second connecting device are connected at separate connecting locations to the body coupling device with the support member between the connecting locations,
wherein the rotation member is an upward-downward rotation member and the body coupling device further comprises: the supporting member coupled to the first and second connecting device; and the upward-downward rotation member coupled to the supporting member to rotate in upward and downward directions to be coupled to a rear side of the display unit.

77. The supporting device according to claim 76, wherein the upward-downward rotation member comprises multiple upward-downward rotation members and all multiple upward-downward rotation members are coupled to the supporting member.

78. A supporting device of a display unit, comprising:
a stationary bracket securable to a wall;
a body coupling device mountable to a body of the display unit, and including an extension member mounted on the body and a support member connected to the extension member;
a rotation member directly on the support member and rotatable about an axis parallel to the support member to move the extension member with respect to the support member;
a first connecting device to connect left sides of the stationary bracket and the body coupling device with each other; and
a second connecting device to connect right sides of the stationary bracket and the body coupling device with each other,
wherein the first and second connecting devices independently adjust a space between a rear side of the display unit and the wall,
such that connections between the first and second connecting devices and the body coupling device occur along multiple axes perpendicular to the axis of the rotation member,
wherein the rotation member is an upward-downward rotation member and the body coupling device further comprises: the supporting member coupled to the first and second connecting device; and the upward-downward rotation member coupled to the supporting member to rotate in upward and downward directions to be coupled to a rear side of the display unit.

79. A supporting device of a display unit, comprising:
a stationary bracket securable to a wall;
a body coupling device mountable to a body of the display unit, and including two separate extension members mounted on the body and a support member connected to the extension members;
a rotation member directly on the support member and rotatable about an axis parallel to the support member to move the extension members with respect to the support member;
connecting devices to connect the stationary bracket with the body coupling device, and having bending parts to bend in left and right directions,
wherein the stationary bracket comprises receipt parts to receive the connecting devices when the connecting devices are folded, and
the rotation member is an upward-downward rotation member and the body coupling device further comprises: the supporting member coupled to the first and second connecting device; and the upward-downward rotation member coupled to the supporting member to rotate in upward and downward directions to be coupled to a rear side of the display unit.

80. A mounting apparatus to mount a display device on a surface, the mounting apparatus comprising:
a stationary unit to be secured to the surface;
a moveable unit to be secured to the display device and moveable along a first rotational axis in first and second directions, and including a first rotating unit and second rotating unit mounted on the display device and a fixed part connected to the first and second rotating units;
a rotatable part directly on the fixed part and rotatable about an axis parallel to the fixed part to move the first rotating unit and second rotating unit with respect to the fixed part; and
a connecting unit to connect the stationary unit and the moveable unit to each other and moveable along a second rotational axis perpendicular to the first rotational axis in third and fourth directions; wherein the connecting unit includes a first linking unit coupled to a left side of the stationary unit and a left side of the moveable unit, and includes a second linking unit coupled to a right side of the stationary unit and a right side of the moveable unit, and wherein the first and second linking units are spaced apart from one another.

81. The mounting apparatus according to claim 80, wherein the connecting unit comprises:
the first linking unit rotatable around a third rotational axis parallel with the second rotational axis; and
the second linking unit rotatable around a fourth rotational axis parallel with the second rotational axis,
wherein the first linking unit and second linking unit independently adjust a first distance between the first sides of the stationary unit and the moveable unit, and a second distance between the second sides of the stationary unit and the moveable unit, respectively.

82. The mounting apparatus according to claim 80, wherein the stationary unit comprises:
a receiving portion to receive the connecting unit and a portion of the moveable unit therein.

83. The mounting apparatus according to claim 80, wherein the stationary unit comprises:
a receiving portion to receive the connecting unit and the moveable unit therein, such that a distance between the display unit and the surface corresponds to a width of the stationary unit when the connecting unit and the moveable unit are disposed in the receiving portion.

* * * * *